(12) United States Patent
Okimoto et al.

(10) Patent No.: US 6,268,926 B1
(45) Date of Patent: Jul. 31, 2001

(54) MAIL TRANSMISSION/RECEPTION SYSTEM

(75) Inventors: Satoshi Okimoto, Komaki; Hiroyuki Funahashi, Nagoya, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/076,811

(22) Filed: May 13, 1998

(30) Foreign Application Priority Data

May 15, 1997 (JP) .................................................... 9-125695

(51) Int. Cl.[7] .............................. B41B 15/00; B41J 15/00; H04N 1/00; H04N 1/387; G06K 9/36
(52) U.S. Cl. ........................ 358/1.15; 358/1.16; 358/400; 358/402; 358/403; 358/450; 382/284; 382/286
(58) Field of Search .................................. 358/1.15, 402, 358/1.16, 450, 453, 451, 468, 400, 403; 707/526; 709/206, 236; 382/284, 286

(56) References Cited

U.S. PATENT DOCUMENTS 5,812,278 * 9/1998 Toyoda et al. ........................ 358/402

FOREIGN PATENT DOCUMENTS

| | | |
|---|---|---|
| 63-237640 | 10/1988 | (JP) . |
| 4-172043 | 6/1992 | (JP) . |
| 5-2541 | 1/1993 | (JP) . |
| 6-149505 | 5/1994 | (JP) . |
| 7-175603 | 7/1995 | (JP) . |
| 8-130554 | 5/1996 | (JP) . |

* cited by examiner

Primary Examiner—Edward Coles
Assistant Examiner—Twyler Lamb
(74) Attorney, Agent, or Firm—Oliff & Berridge, PLC

(57) ABSTRACT

In a mail reception side, it is judged in S994 whether or not the number of sheets required to print the received print mail becomes equal to or higher than a prescribed number. This judgment is performed based on the mail header added to the print mail. When the number of sheets to be printed with the print mail is equal to or higher than the prescribed number, the print data included in the print mail is compacted so that one-fourth the amount of printing paper will be needed. Thus, even if print mail containing a large number of pages for printing is received, the printing side can adjust the number of pages, into which the print mail is printed, without deleting the contents of the print mail. Accordingly, the time required for printing is also reduced to one-fourth the time required for printing at the original ax state. Hence, even if print mail containing a large number of pages for printing is received at an unexpected time, the time required for printing is automatically reduced. As a result, the printer on the receiving end is not occupied for long periods of time printing unimportant mail that can delay the printing of more important documents.

24 Claims, 31 Drawing Sheets

HARDWARE STRUCTURE OF MAIL SERVER

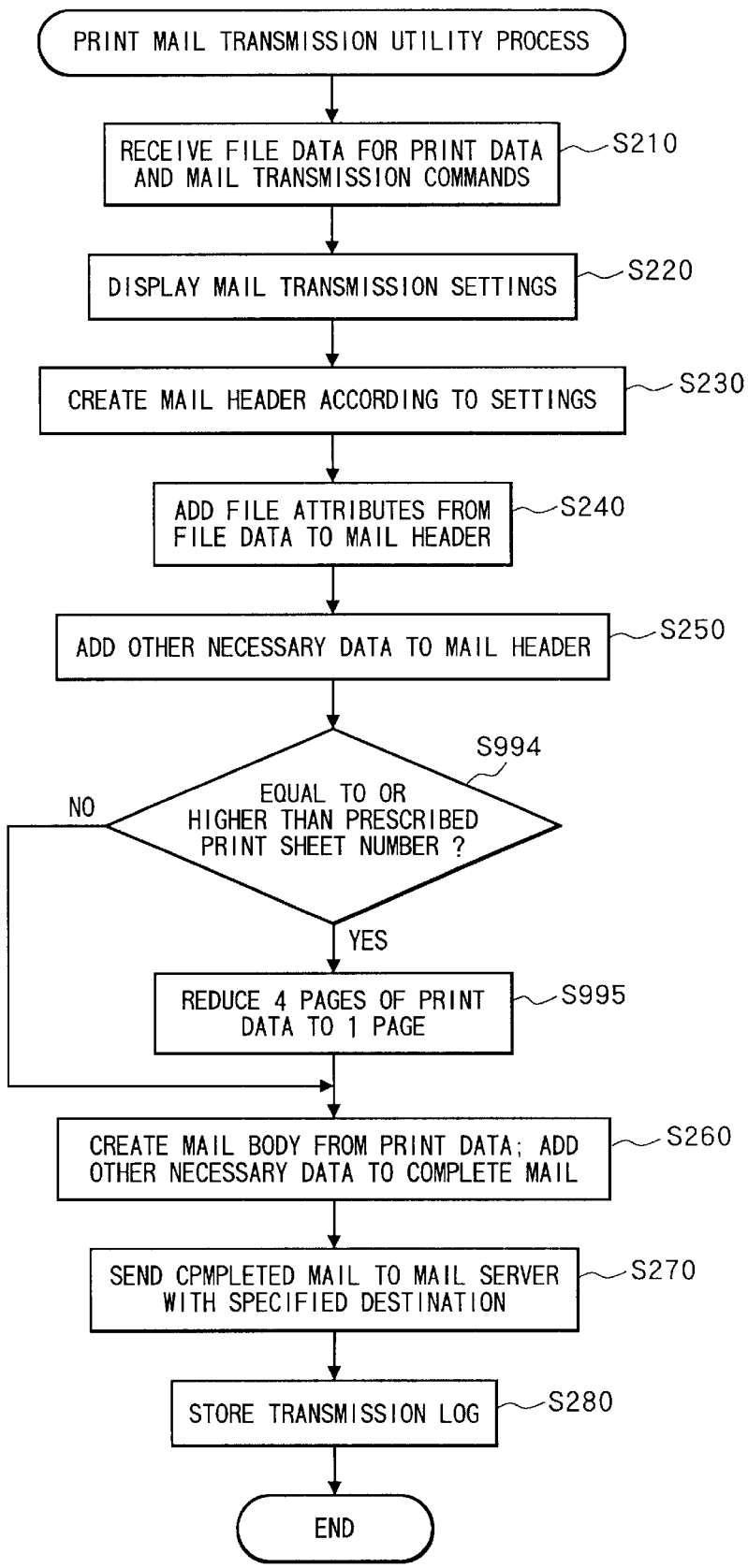

MAIL TRANSMISSION/RECEPTION SYSTEM

BACKGROUND OF THE INVENTION

1. Field of the Invention

The present invention relates to a mail transmission/reception system. More specifically, the present invention relates to a mail reception system provided to a computer system capable of receiving mail from another computer system via a communication line. The present invention also relates to a mail transmission system provided to a computer system capable of transmitting mail to another computer system via a communication line.

2. Description of Related Art

Data in the form of electronic mail is transferred between personal computers via a communication network system such as the Internet.

When mail sent from one computer is received by another computer, the received data is temporarily stored as mail data in a storage device, such as a hard disk drive, provided to the receiving end computer. The user on the receiving end can extract the contents of the received mail. In some cases, the user starts an application program on the computer in order to read data attached to the received mail and then to print the contents of the received mail and the attached file using a printer connected to the computer.

SUMMARY OF THE INVENTION

A user located at one computer can therefore supply printed material to another user at a remote computer through transmitting electronic mail to the remote computer through the communication network and then let the user at the remote computer to control his/her own computer to print out the received mail data.

However, this method of supplying printed material to a remote user via the communication network system is time-consuming. At the receiving end, the user has to start an application program, such as a word processor program, on his/her own personal computer. The user controls the application program to first read data from the electronic mail message and then to print the data by a printer connected to the computer.

According to one conceivable solution, the computer at the transmitting end creates the electronic mail so that the electronic mail includes print data which is prepared by a printer driver or the like. The computer on the receiving end can directly extract the print data from the mail and then output that data directly to the printer. It is possible to eliminate any intermediate processes such as starting an application program or controlling the application program to read in data. By allowing the receiver to directly obtain printed material of the received mail data from the printer, the sender can more effectively provide printed material to the receiver.

However, the printer is ordinarily shared by more than one personal computer at the receiving end. Hence, if unscheduled mail containing a large number of pages that must be printed is received, the printer on the receiving end might be occupied for a long time. As a result, important data which must be printed urgently cannot be printed right away.

In view of the foregoing, it is an object of the present invention to provide a mail reception system capable of adjusting the number of pages to be printed in received mail to suit the needs of the receiving user without deleting any of the data. It is another object of the present invention to provide a mail transmission system capable of adjusting on the transmitting end the number of mail pages to be printed without deleting any of the data.

In order to attain the above and other objects, the present invention provides a mail reception device capable of receiving mail from remote mail transmission device via a communication line, the mail reception device comprising: a printer capable of printing print data on a sheet of paper; mail receiving means capable of receiving mail, including print data at an original state, from remote mail transmission devices via a communication line; sheet number determining means for determining a number of sheets required to print the print data of the received mail at the original state and for determining whether the determined number of the required sheets is equal to or greater than a predetermined number; and print data processing means for, when the sheet number determining means determines that the number of sheets is equal to or greater than the predetermined number, converting the print data from the original state into a reduced state, the number of pages of the print data to be printed in each sheet of paper at the reduced state being greater than the number of page of the print data to be printed in each sheet of paper at the original state, the print data processing means supplying the processed data to the printer, thereby allowing the printer to print the print data on the reduced number of sheets, the print data processing means supplying the print data to the printer without processing the print data when the sheet number determining means determines that the number of sheets is smaller than the predetermined number.

According to another aspect, the present invention provides a mail transmission device capable of transmitting mail to remote mail reception device via a communication line, the mail transmission device comprising: sheet number determining means for determining whether a number of sheets required to print, at an original state, print data to be transmitted with mail is equal to or greater than a predetermined number; and transmission processing means for, when the sheet number determining means determines that the number of sheets is equal to or greater than the predetermined number, converting the print mail into the reduced state so as to increase the number of pages of the print data to be printed on each sheet of paper and transmitting mail including the converted print data, the transmission processing means transmitting mail with the print data of the original state without converting the print data when the sheet number determining means determines that the number of sheets is smaller than the predetermined number.

According to another aspect, the present invention provides a mail reception system provided in a computer system capable of receiving mail from another computer system via a communication line, the mail reception system comprising: a printer capable of printing print data on a sheet of paper and being connected to a computer system for communicating by signals with the computer system; receiving means for receiving mail, including print data, from another computer system via a communication line; sheet number determining means for determining a number of sheets required to print the print data of the received mail at a normal state and determining whether the determined number of the required sheets is equal to or greater than a predetermined number; and print data processing means for controlling the printer to print the print data in the normal state when the sheet number determining means determines that the number of sheets is smaller than the predetermined number, the print data processing means controlling the printer to print the print data in a reduced state when the sheet number determining means determines that the number of sheets is equal to or greater than the predetermined number, the number of pages of the print data to be printed in each sheet of paper at the reduced state being greater than the number of pages of the print data to be printed in each sheet of paper at the normal state, thereby reducing the total number of sheets to print the print data.

According to another aspect, the present invention provides a mail transmission system provided in a computer system capable of transmitting mail to another computer system via a communication line, the mail transmission system comprising: sheet number determining means for determining whether a number of sheets required to print, at a normal state, print data to be transmitted with mail is equal to or greater than a predetermined number; and transmission processing means for transmitting mail including the print data after performing a reducing process onto the print data from the normal state into a reduced state to increase the number of pages of the print data to be printed on each sheet of paper when the sheet number determining means determines that the number of sheets is equal to or greater than the predetermined number, and for transmitting the mail with the print data without performing the reducing process onto the print data when the sheet number determining means determines that the number of sheets is smaller than the predetermined number.

According to another aspect, the present invention provides a program storage medium capable of being read by a computer capable of receiving mail from another computer via a communication line, the program comprising: a program of determining a number of sheets required to print print data included in received mail at a normal state and determining whether the determined number of the required sheets is a greater than a predetermined number; and a program of controlling a printer to print the print data in the normal state when the number of sheets is smaller than the predetermined number, controlling the printer to print the print data in a reduced state when the number of sheets is equal to or greater than the predetermined number, the amount of the print data to be printed in each sheet of paper at the reduced state being greater than the amount of the print data to be printed in each sheet of paper at the normal state, thereby reducing the total number of sheets to print the print data.

According to another aspect, the present invention provides a program storage medium capable of being read by a computer capable of transmitting mail to another computer via a communication line, the program comprising: a program of determining whether a number of sheets required to print, at a normal state, print data to be transmitted with mail is equal to or greater than a predetermined number; and a program of transmitting mail including the print data after performing a reducing process onto the print data from the normal state into a reduced state to increase the number of pages of the print data to be printed on each sheet of paper when the number of sheets is equal to or greater than the predetermined number, and for transmitting the mail with the print data without performing the reducing process onto the print data when the number of sheets is smaller than the predetermined number.

BRIEF DESCRIPTION OF THE DRAWINGS

In the drawings:

FIG. 31 is a flowchart of a modification of the print mail transmission utility process and corresponds to FIG. 7.

DETAILED DESCRIPTION OF THE INVENTION

Figure 1:
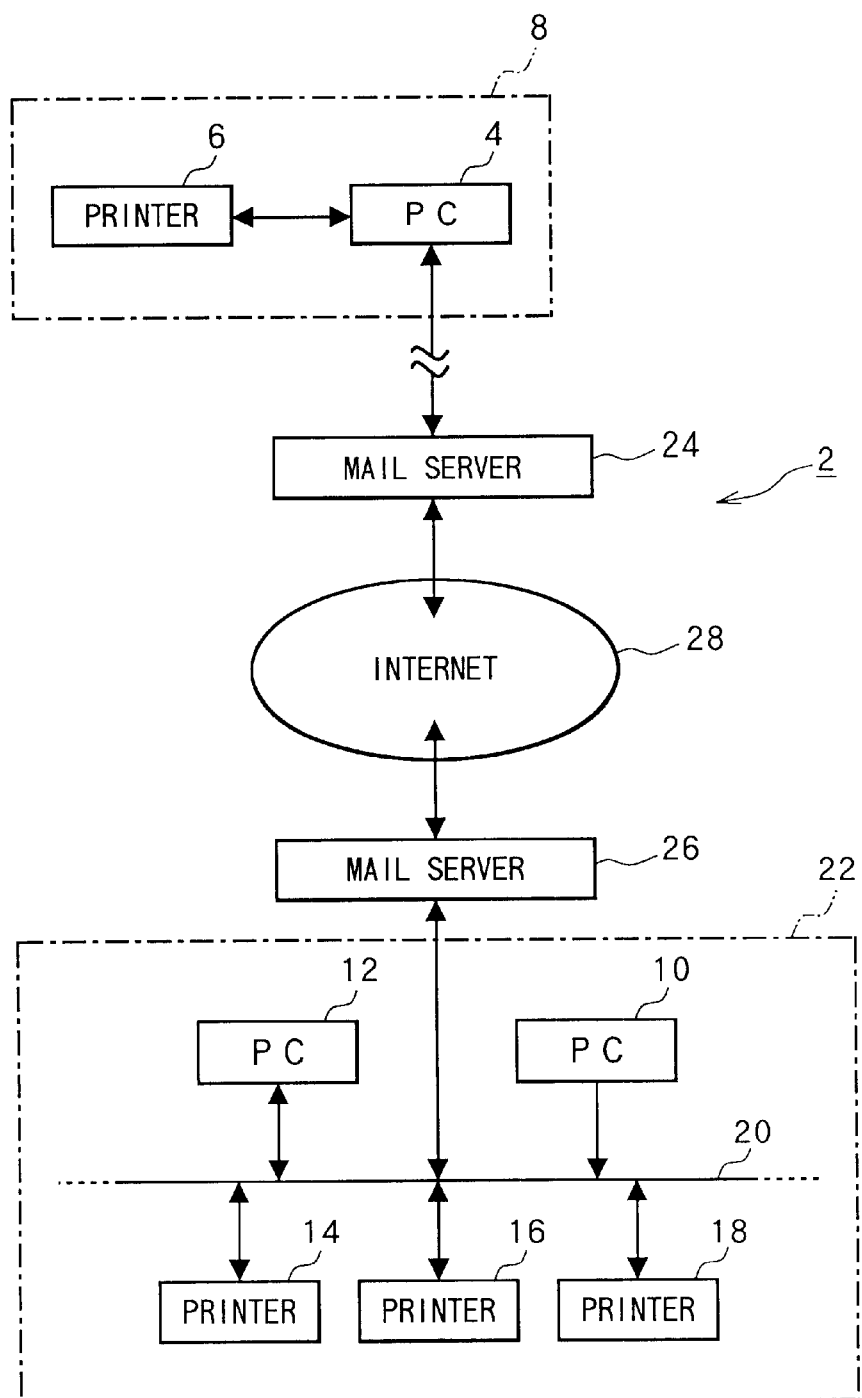
FIG. 1 is a block diagram showing the general configuration of a mail transmission/reception system according to an embodiment of the present invention.

The basic structure of the mail transmission/reception system according to the present invention will be first described.

The mail reception system of the present invention is provided in a computer system which is capable of receiving mail from another computer system via a communication line. The mail reception system is comprised of a printer capable of printing print data on a sheet of paper and being connected to the computer system A for communicating by signals with the computer system. The mail reception system determines a number of sheets required to print the print data of the received mail, and determines whether the determined number of the required sheets is equal to or greater than a predetermined number. When the number of sheets is smaller than the predetermined number, the mail reception system controls the printer to print the print data in the original state. When the number of sheets is equal to or greater than the predetermined number, on the other hand, the mail reception system controls the printer to print the print data in a reduced state, the number of pages of the print data to be printed in each sheet of paper at the reduced state being greater than the number of pages of the print data to be printed in each sheet of paper at the original state, thereby reducing the total number of sheets to print the print data.

Hence, even if mail including a large number of pages for printing is received, the mail is printed after first compacting more than one page of print data onto one page. For example, two pages or four pages of data is reduced to one page and printed. As a result, the time required to print all print data is reduced and the printer on the receiving computer system is not occupied for unnecessarily long amounts of time that can delay the printing of more important documents.

When the determined sheet number is equal to or greater than the predetermined number, the mail reception system may not immediately perform the compacting process, but may first urge the operator to input his/her confirmation and then perform the compacting process in response to the inputted confirmation. That is, the mail reception system may control a display device to display a message urging the operator to input confirmation via an input device whether the print data in the mail should be printed in the reduced state. The mall reception system may control the printer to print the print data in the reduced state when the operator inputs confirmation that the print data should be printed in the reduced state. The mail reception system may control the printer to print the print data in the original state when the operator inputs confirmation that the print data should not be printed in the reduced state or when the number of sheets is smaller than the predetermined number.

By being prompted for confirmation when mail instructs printing of more pages than the prescribed number, the user can choose to print the mail at a normal state when, for example, the mail is important and must be printed in the same form as the mail has been transmitted. Accordingly, when mail must be printed at a normal state, it is possible to prevent the mail from being printed at a reduced state.

Various methods can be applied for confirming the state at which to print the received mail. For example, if it is determined that the number of sheets to be printed is equal to or larger than the prescribed number, the display device can be used to prompt the user of the mail reception system to set the number of pages to be printed onto one sheet of paper.

The mail transmission system can be provided in the mail transmission side. The mail transmission system of the present invention is provided in a computer system which is capable of transmitting mail to another computer system via a communication line. The mail transmission system determines whether a number of sheets required to print print data, to be transmitted with mail, is equal to or greater than a predetermined number. When the number of sheets is equal to or greater than the predetermined number, the mail transmission system transmits mail, including the print data, after performing a reducing process onto the print data from the original state into a reduced state so as to increase the number of pages of the print data to be printed on each sheet of paper. When the number of sheets is smaller than the predetermined number, on the other hand, the mail transmission system transmits the mail with the print data without performing the reducing process onto the print data.

When the number of sheets is equal to or greater than the predetermined number, the mail transmission system may control a display device to display a message urging an operator of the mail transmission system to input confirmation via an input device whether the print data should be subjected to the reduction process. When the operator inputs confirmation via the input device that the print data should be subjected to the reduction process, the mail transmission system transmits the mail with the print data after performing the reduction process onto the print data. When the operator inputs confirmation via the input device that the print data should not be subjected to the reduction process or when the number of sheets is smaller than the predetermined number, the mail transmission system transmits the mail with the print data without performing the reduction process onto the print data.

By regulating the printing state on the transmitting side in this way, it is possible to avoid sending large numbers of pages to be printed on the receiving end. As a result, the printer on the receiving computer system is not occupied for unnecessarily long amounts of time that can delay the printing of more important documents. Accordingly, mail is printed quickly, allowing the user on the receiving end to view the document right away.

The compacting or reducing process is, for example, a process for reducing the size of a print pattern defined by one page's worth of print data so that reduced print patterns defined by more than one pages' worth of print data can be printed onto one sheet of paper. It therefore becomes possible to increase the number of pages of print data to be printed onto one sheet of paper.

A mail transmission/reception system according to a preferred embodiment of the present invention will be described while referring to the accompanying drawings.

As shown in FIG. 1, the mail transmission/reception system 2 of the present embodiment includes a computer system 8, another computer system 22, and an Internet (communication network) 28. The computer system 8 and the computer system 22 are connected by the Internet 28 via two mail servers 24 and 26, respectively. The computer system 8 includes a personal computer 4 and a printer 6. The computer system 22 includes personal computers 10 and 12, and printers 14, 16, and 18, and a LAN (Local Area Network) 20 connected to the components 10 and 12 and the printers 14, 16, and 18.

The mail server 24 on one side of the Internet 28 is a service offered by an Internet provider, while the mail server 26 on the other side of the Internet 28 is a LAN specific mail server connected to the LAN 20 provided within a specific company.

In the mail transmission/reception system 2, several types of electronic mail can be transmitted between the computer systems 8 and 22. The several types of electronic mail include: ordinary mail; print mail according to the present invention; and cancel mail also according to the present invention. The ordinary mail is transmitted to a receiving end (transfer destination) for being freely processed by a receiver according to his/her desire. The print mail is transmitted to a receiving end (transfer destination) as specifically desired by a sender to be printed at the transfer destination. The cancel mail is transmitted to the receiving end (transfer destination) of the print mail as instructed by the sender to cancel printing of the print mail.

Figure 18:
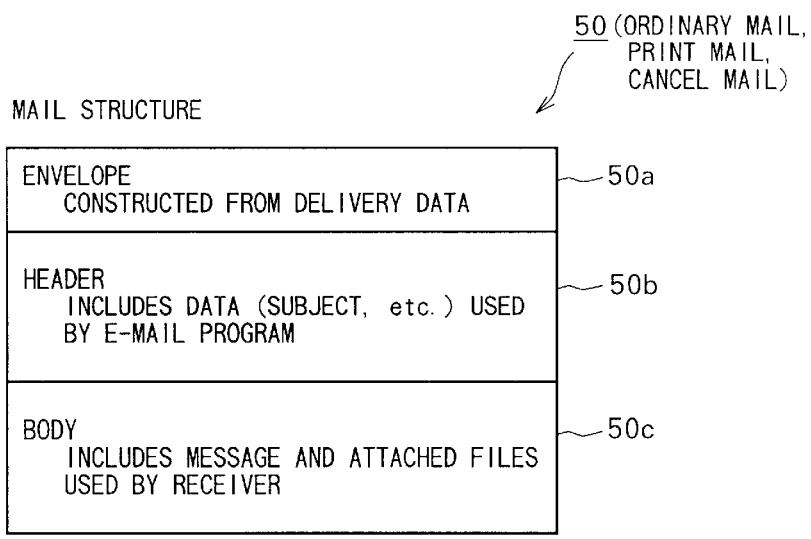
FIG. 18 is an explanatory diagram showing the structure of electronic mail.

Each mail (ordinary mail, print mail, and cancel mail) 50 has the mail structure shown in FIG. 18. That is, each mail data set 50 has: data of an envelope 50*a* constructed from delivery data; data of a header 50*b* including data to be used by an electronic mail program executed by the Internet 28, and data of a body section 50*c* including mail contents to be used by a receiver at the transfer destination.

The body 50*c* of the ordinary mail includes a sender's message. The body 50*c* is also attached with a data file if necessary. The header 50*b* of the ordinary mail includes: a message ID identifying that mail; an address of a mail server (24 or 28) connected to the sender; an address of the transfer destination; a subject of the mail; and the like.

The body 50*c* of the print mail does not include any messages. The body 50*c* is merely attached with a print data file including print data desired to be printed at the transfer destination. Similarly to the ordinary mail, the header 50*b* of the print mail includes: a message ID identifying that print mail; an address of a mail server (24 or 28) connected to the sender; an address of the transfer destination; a subject of the print mail; and the like. The header 50*b* of the print mail further includes print information (processing format data) indicative of how the print data included in the attached file is desired to be printed at the transfer destination. The print information includes: date and time when the print data in the attached file is desired to be printed; and file attributes such as a page description language (emulation), at which the print data is described, and the number of sheets, onto which the print data is desired to be printed.

The body 50*c* of the cancel mail is prepared blank. Similarly to the ordinary mail and the print mail, the header 50*b* of the cancel mail includes: a message ID identifying that cancel mail; an address of a mail server (24 or 28) connected to the sender; an address of the transfer destination; and the like. The header 50*b* of the cancel mail does not include data of any subject, but includes cancel message ID(s) designating message ID(s) of one or more sets of print mail data which the sender has already transmitted to the transfer destination and which the sender desires to prevent the transfer destination from printing. The header 50*b* further includes data of an instruction to cancel printing of the print data designated by the cancel message ID.

Figure 2:
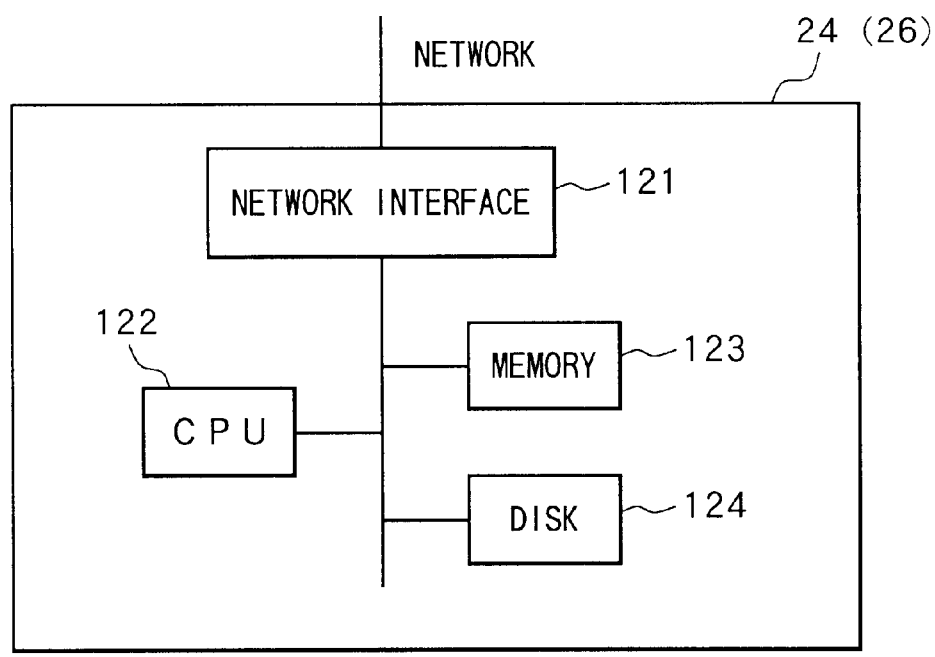
FIG. 2(a) is a block diagram showing a hardware structure of a mail server provided in the mail transmission/reception system.
FIG. 2(b) is a block diagram showing a hardware structure of a personal computer provided in the mail transmission/reception system.
Figure 2:
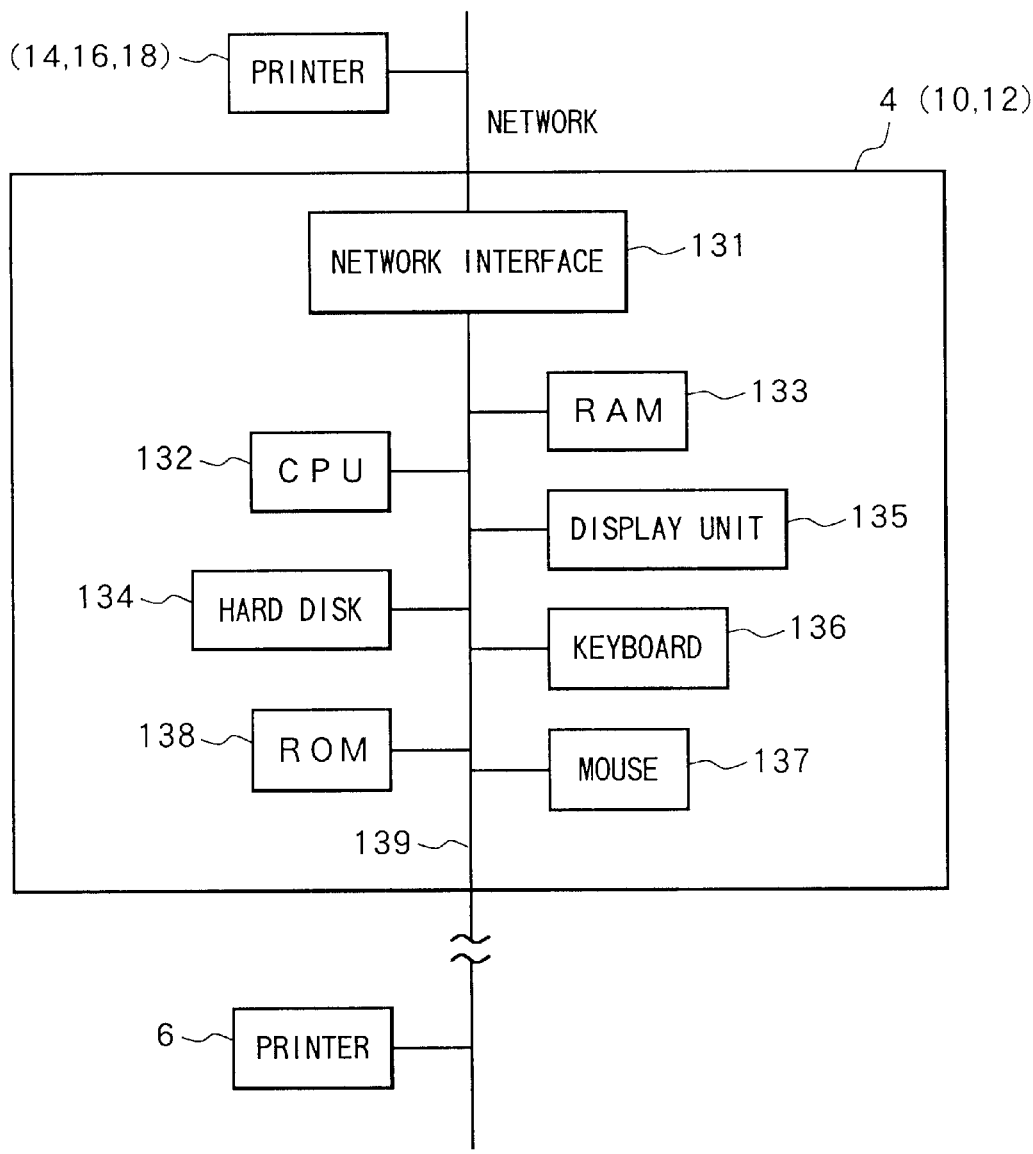

A hardware arrangement of each of the mail servers 24 and 26 will be described below with reference to FIG. 2(*a*). The mail server 24 (26) includes a network interface 121 serving to communicate with the corresponding personal computer system 8 (22) and the Internet 28, a central processing unit (CPU) 122, a memory 123 storing necessary data, and a disk 124 preparing a mail spool 34 for storing received mail. The mail server 24 (26) serves as a SMTP (Simple Mail Transfer Protocol) server 32 and a POP (Post Office Protocol) server 38 shown in FIG. 3.

A hardware arrangement of each of the personal computers 4, 10 and 12 will be described below with reference to FIG. 2(*b*). The personal computer 4 (10 or 12) includes a network interface 131 serving to communicate with the corresponding mail server 24 (26), a CPU 132 performing control operation, a RAM 133 for preparing a storage area for temporarily storing print data to be transmitted to a transfer destination, a mail log storage area, a cancel mail data storage area, and the like, a display unit 135, such as a CRT, serving to display various screen images such as those shown in FIGS. 6, 19, and 20, a keyboard 136 and a mouse-type input device 137 serving to input operator's instructions, a hard disk 134 for preparing therein a transmission log storage area and a mail box 40, and a ROM 138 storing a program of a printer driver 30 shown in FIGS. 4 and 5, a program of a print mail transmission utility 31*a* shown in FIG. 7, and a program of a print mail reception utility 31*b* shown in FIGS. 8–17. It is noted that all the elements in the personal computer 4 (10, 12) are connected via a bus 139.

It is noted that in the case of the computer system 8, the printer 6 is connected directly to the bus 139 of the computer 4. On the other hand, in the computer system 22, the personal computers 10 and 12 are connected to the printers 14, 16, and 18 via the network interface 131 and the LAN 20.

Figure 3:
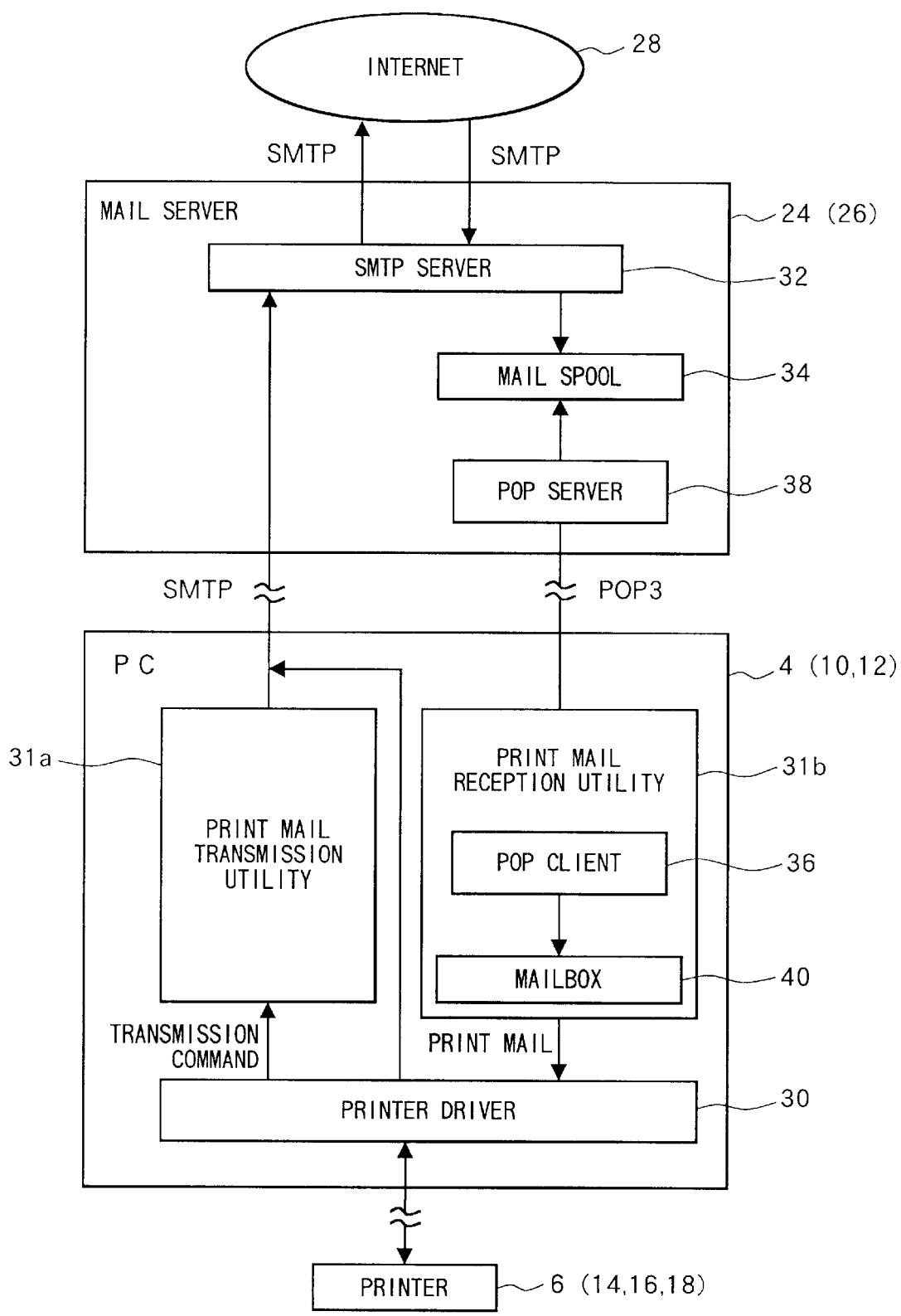
FIG. 3 is a block diagram showing a software structure of the mail server and the personal computer provided in the mail transmission/reception system.

FIG. 3 shows the software arrangement of the personal computer 4 and the mail server 24 connected to the personal computer 4. It is noted that the personal computers 10 and 12 have the same software arrangement with the personal computer 4. The mail server 26 has the same software arrangement with the mail server 24.

The personal computer 4 can execute the programs of the printer driver 30, the print mail transmission utility 31*a*, and the print mail reception utility 31*b*.

The printer driver 30 is capable of creating print data, outputting the print data to the printer 6 to print the print data, starting executing the print mail transmission utility 31*a*, and creating cancel mail and transmitting the cancel mail to the mail server 24. The printer driver 30 is executed by the CPU 132 when a print instruction is issued from some application programs (not shown) executing on the personal computer 4.

The print mail transmission utility 31*a* is for creating print mail based on the print data supplied from the printer driver 30 and for transmitting the print mail to the mail server 24. The print mail transmission utility 31a is executed by the CPU 132 when a print mail transmission instruction is issued from the printer driver 30.

The print mail reception utility 31b is for receiving electronic mail (print mail, cancel mail, and ordinary mail) addressed to the personal computer 4 and for executing processing operations in correspondence with the contents of the mail. The print mail reception utility 31b prints the print data included in the file attached to the print mail if needed. If necessary, the print mail reception utility 31b also prints the contents of the ordinary mail, that is, the message included in the ordinary mail and the file attached to the mail. The print mail reception utility 31b cancels printing of print mail designated by the cancel mail through deleting the print mail from the mail server 24. The print mail reception utility 31b may stop printing of the print mail in the middle of the printing. The print mail reception utility 31b is executed by the CPU 132 when the personal computer 4 is turned ON.

Although not shown in FIG. 3, the computer 4 can also execute: an ordinary mail transmission utility for creating and transmitting ordinary mail to the mail server 24; and an ordinary mail reception utility for receiving ordinary mail addressed to the computer 4 from the mail server 24.

The mail server 24 operates as the SMTP (Simple Mail Transfer Protocol) server 32 for receiving print mail from the print mail transmission utility 31a at the personal computer 4, for transmitting the print mail to the Internet 28, for receiving electronic mail (print mail, cancel mail, and ordinary mail) from the Internet 28 and for storing, in the mail spool 34, the mail addressed to the subject mail server 24. The mail server 24 also operates as the POP (Post Office Protocol) server 38 for transferring the mail stored in the mail spool 34 to the personal computer 4 when the personal computer 4 requests transmission of the mail.

The printer driver 30 will be described below in greater detail.

The printer driver 30 is for creating print data based on document data prepared and designated by some application programs executed on the computer 4. The printer driver 30 can supply the print data to the printer 6 thereby allowing the printer 6 to print the print data. The printer driver 30 is also for issuing a print mail transmission command to the print mail transmission utility 31a.

The print mail transmission utility 31a will be described below in greater detail.

The print mail transmission utility 31a is executed upon receipt of the print mail transmission command from the print driver 30. The print mail transmission utility 31a is for creating a print mail based on the print data created by the printer driver 30. The print mail is desired to be transmitted to a target computer 10 or 12 so that the print data included in the print mail will be printed thereat. In order to send the print mail to the target computer 10 or 12, the print mail transmission utility 31a transmits the print mail to the SMTP server 32 by Simple Mail Transfer Protocol (SMTP).

It is noted that the printer driver 30 is also for creating cancel mail for instructing the target computer not to print the print mail that has been supplied to the target computer prior to the cancel mail. In order to transmit the cancel mail to the transfer destination where the print mail, desired to be canceled, has been transmitted, the printer driver 30 transmits the cancel mail to the SMTP server 32 also by Simple Mail Transfer Protocol (SMTP).

It is also noted that the ordinary mail transmission utility (not shown in FIG. 3) can create ordinary mail and transmit the ordinary mail to the SMTP server 32 by Simple Mail Transfer Protocol (SMTP).

The SMTP server 32 will be described below in greater detail.

The SMTP server 32 is for transferring, to the Internet 28, electronic mail (print mail, cancel mail, and ordinary mail) received by SMTP from the computer 4. The Internet 28 transmits the received mail so that the mail will finally reach the target computer. It is noted that the Internet 28 is capable of transmitting, by SMTP, all of the print mail, the cancel mail, and the ordinary mail.

The SMTP server 32 can also receive, by SMTP, all the print mail, the cancel mail, and the ordinary mail from the Internet 28. The SMTP server 32 is for storing, on the mail spool 34, mail (print mail, cancel mail, and print mail) addressed to the subject mail server 24. The SMTP server 32 transfers all other mail again to the Internet 28.

The print mail reception utility 31b will be described below in greater detail.

The print mail reception utility 31b starts executing when the personal computer 4 is turned ON. The print mail reception utility 31b serves as a Post Office Protocol (POP) client 36. The print mail reception utility 31b prepares a mailbox 40 at a specific directory in an external memory, such as the hard disk drive 134, provided to the personal computer 4. The mall box 40 may be prepared in the RAM 133 provided In the personal computer 4. When the print mail reception utility 31b starts executing, the print mail reception utility 31b starts repeatedly requesting, at predetermined time intervals, the POP server 38 to transfer mail (print mail, cancel mail, and ordinary mail) addressed to the POP client 36 from the mail spool 34.

The POP server 38 is for transferring, from the mail spool 34, all the sets of mall data (print mail, cancel mall, and ordinary mail), addressed to the POP client 36, to the corresponding mailbox 40 with using the Post Office Protocol Version 3 (POP3). As described later, according to a certain condition, the print mall reception utility 31b will output the contents of the print mail and the ordinary mail to the corresponding printer 6 for printing. When receiving cancel mail, however, the print mail reception utility 31b will prevent the printer 6 from printing print mail designated by the cancel mail. The print mail reception utility 31b can control the printer 6 to stop printing the print mail during the middle of the printing.

The ordinary mail reception utility (not shown in FIG. 3) serves as a POP client, the same as or different from the POP client 36, to request the POP server 38 to transfer, by Post Office Protocol Version 3 (POP3), ordinary mail addressed to the POP client and stored in the mail spool 34.

With the above-described structure, the mail transmission/reception system 2 operates as described below.

It is now assumed that an operator at the personal computer 4 completes preparing document data through some application program, and desires to obtain printed matter of the prepared document or desires to supply printed matter of the document to the computer 10 in the remote computer system 22. In this case, the operator inputs his/her instruction to print the document. As a result, the application program issues a print command, whereupon the printer driver 30 is executed. The printer driver 30 creates print data based on the document data designated by the application program. When the user desires to obtain the printed matter at his/her end, the printer driver 30 supplies the print data to the printer 6, which in turn prints the print data on sheets of paper. When the user desires to supply the printed matter to either the computer 10 or 12, the printer driver 30 issues a mail transmission command to start the print mail transmission utility 31*a*. The print mail transmission utility 31*a* creates a print mail, including the print data desired to be printed at the destination computer, and transmits the print mail to the SMTP server 32 by Simple Mail Transfer Protocol (SMTP). The SMTP server 32 then transfers the received print mail using SMTP to the Internet 28 with the corresponding transfer destination.

When the operator at the computer 4 desires to stop printing of the print mail that has been transmitted already to the destination end, the operator controls the printer driver 30 to create cancel mail. The cancel mail designates the print mail that is desired to be canceled. The printer driver 30 transmits the cancel mail to the SMTP server 32 by Simple Mail Transfer Protocol (SMTP). The SMTP server 32 then transfers the received cancel mail using SMTP to the Internet 28 with the corresponding transfer destination.

Mail transferred in the Internet 28 by SMTP, whether ordinary mail, print mail, or cancel mail, is received by the SMTP server 32 at the mail server 26. Of this received mail, mail addressed to the mail server 26 is stored on the mail spool 34. All other mail is again transferred to the Internet 28.

When the personal computer 10 is turned ON, the print mail reception utility 31*b* starts being executed, and requests the POP server 38 to send the mail addressed to the POP client 36. In response to this request, the POP server 38 uses Post Office Protocol Version 3 (POP3) to transfer mail from the mail spool 34 to the mailbox 40 prepared for the print mail reception utility 31*b*. According to the setting by the user of the computer 10, the print mail reception utility 31*b* outputs the contents (print data) of the print mail and the contents (message and attached files) of the ordinary mail to an appropriate printer 14, 16, or 18 for printing. When receiving cancel mail, on the other hand, the print mail reception utility 31*b* requests the POP server 38 to delete from the mail spool 34 the print mail designated by the cancel mail. The print mail reception utility 31*b* may stop printing of the print mail when printing of the print mail has already been started.

Next, the process of the printer driver 30, the print mail transmission utility 31*a*, and the print mail reception utility 31*b* will be described below in greater detail.

The process of the printer driver 30 will be first described with reference to FIG. 4.

In the example described below, the printer driver 30 will be described as a program executing on the computer 4. However, the processes of the printer drivers 30 operating on the computers 10 and 12 are exactly the same.

The process of the printer driver 30 is started when an application program, executing on the personal computer 4, such as a word processor program, a spreadsheet program, a database program, or the like issues a print command. It is noted that the application program issues the print command when the operator of the computer system 8 designates document data, desired to be printed, and then inputs, via the mouse-type input device 137 or the key board 136, his/her instruction to print the document data. The application program issues the command to start the printer driver 30 also when the operator inputs his/her desire to create cancel mail.

At the beginning of the process, a print process setting screen is displayed in S102 on the display 135 provided to the computer 4. Although not shown in the drawings, the print process setting screen shows a "print execution" button and a "cancel mail" button. The operator clicks the mouse-type input device 137 while specifying with a mouse cursor the "print execution" button or the "cancel mail" button. When the operator desires to obtain printed matter of the document data at the computer system 8 or 22, the operator selects the "print execution" button. The operator can set, on the print process setting screen, the number of copies desired to be obtained on the document data. When the operator desires to create cancel mail, on the other hand, the operator selects the "cancel mail" button. Then, the setting operation is completed on the print process setting screen. The program determines in S104 whether or not the "cancel mail" button has been clicked.

When the operator selects the "print execution" button ("No" in S104), the process in S120 is immediately executed to convert the document data, designated by the application program for printing, into print data of a predetermined format. In this example, the document data is converted into print data which is described by a predetermined page description language (emulation) capable of being interpreted by the printer 6. Representative examples of the page description language include PCL, PostScript, GDI, and the like.

At this time, the print process setting screen displays two selection items "print" and "mail" in an item of "output". When desiring to print the print data at the printer 6 in this computer system 8, the user selects the item "print". When desiring to transmit the print data as print mail to be printed in the remote computer system 22, on the other hand, the user selects the item "mail".

In S130, the printer driver program determines whether "print" or "mail" has been checked in the "output" item of the print process setting screen. When "print" is selected in the "output" item in S130, then the print data is outputted in S140 to the printer 6 in this computer system 8, producing printed matter from the printer 6. It is noted that a default setting of the "output" item is set to "print". Accordingly, the process of S140 is executed even when the "output" item is not set in S130. After the printing process of S140 is executed, the process of the printer driver 30 ends.

On the other hand, when "mail" is selected for the "output" selection in the print process setting screen in S130, the print data is transferred as a set of file data in S150 to a predetermined storage area in the RAM 133 of the personal computer 4 so that the print data will be transferred to the print mail transmission utility 31*a*.

Figure 7:
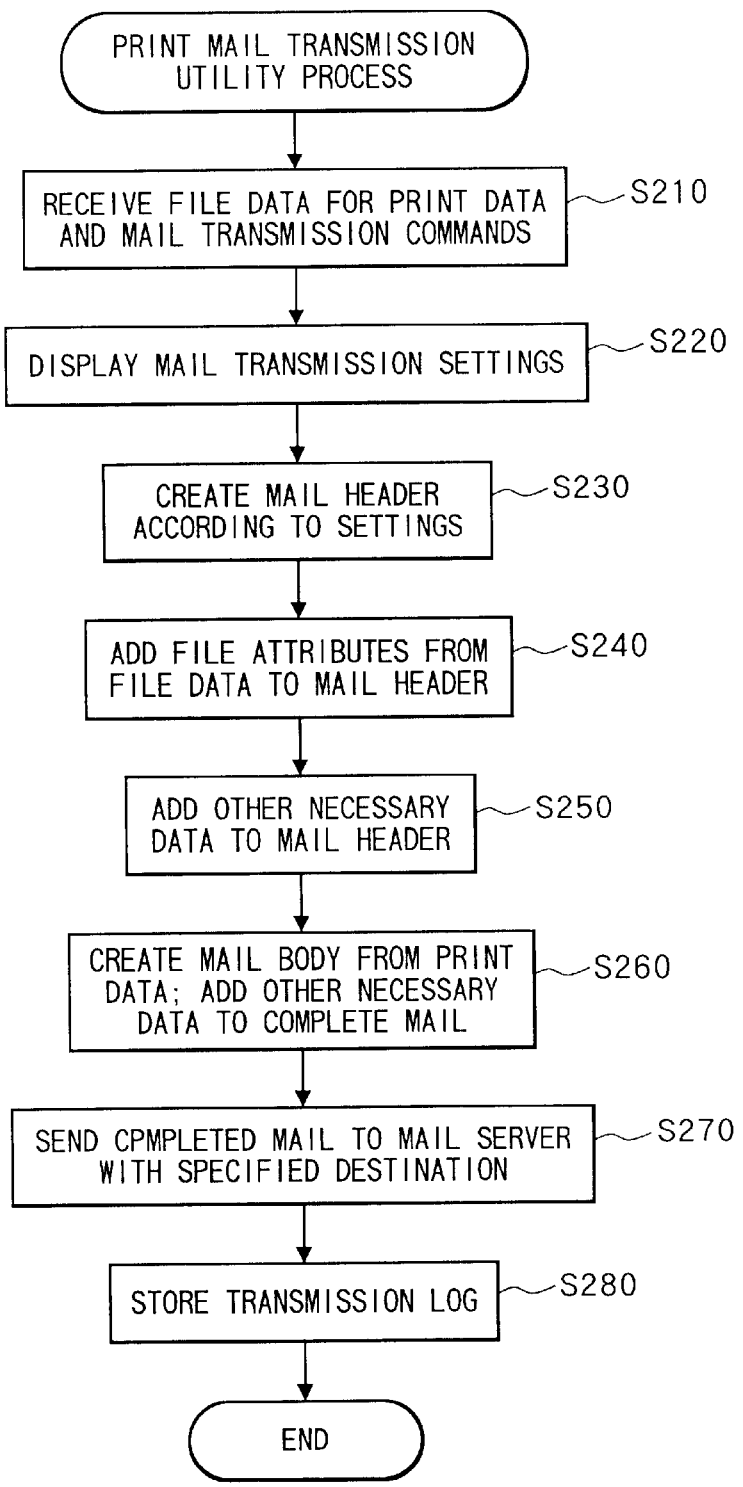
FIG. 7 is a flowchart showing a print mail transmission utility process executed by the mail transmission/reception system.

Next, in S160, the printer driver program starts executing the print mail transmission utility 31*a* of FIG. 7. Then, in S170, the printer driver program transmits, to the print mail transmission utility 31*a*, a mail transmission command and file data (file information) of the print data presently being stored in the RAM 133. The file data includes: data of file attributes of the subject print data; and data of the storage area in the RAM 133 where the subject print data is stored. The file attributes include: data of a file type of the print data; and data of the number of sheets, onto which the print data is desired to be printed. The file type data includes a code indicative of the page description language (emulation) at which the print data has been prepared in S120. The data of the sheet number includes: the number of pages into which the print data has been edited or prepared; and the number of copies into which the print data is desired to be copied. After sending the file data and the mail transmission command to the mail transmission utility 31*a*, the printer driver process ends.

On the other hand, if the program determines that the "cancel mail" button has been clicked ("yes" in S104), then a cancel mail issuing process of S110 is executed.

Figure 5:
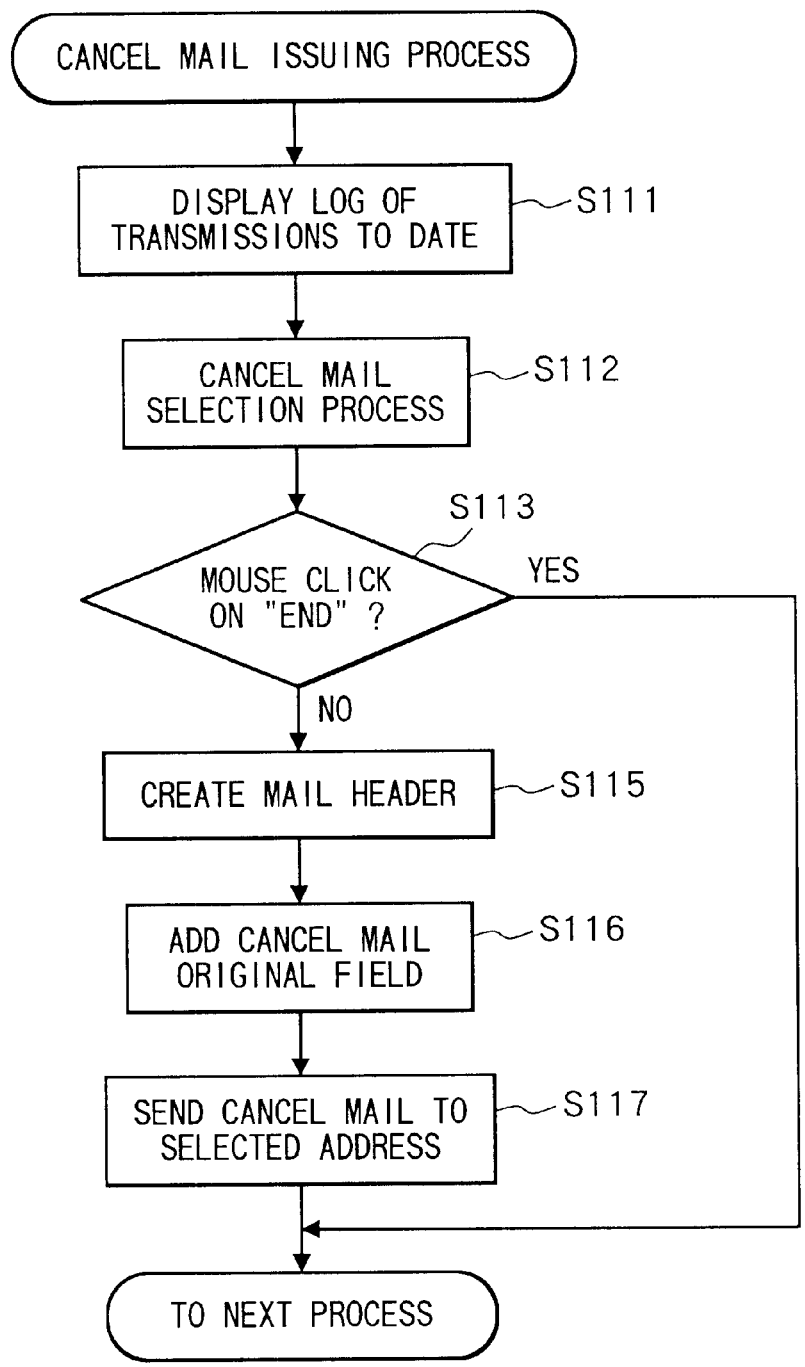
FIG. 5 is a flowchart showing a cancel mail issuing process, a part of the printer driver process.

The cancel mail issuing process of S110 will be described below with reference to FIG. 5.

Figure 6:
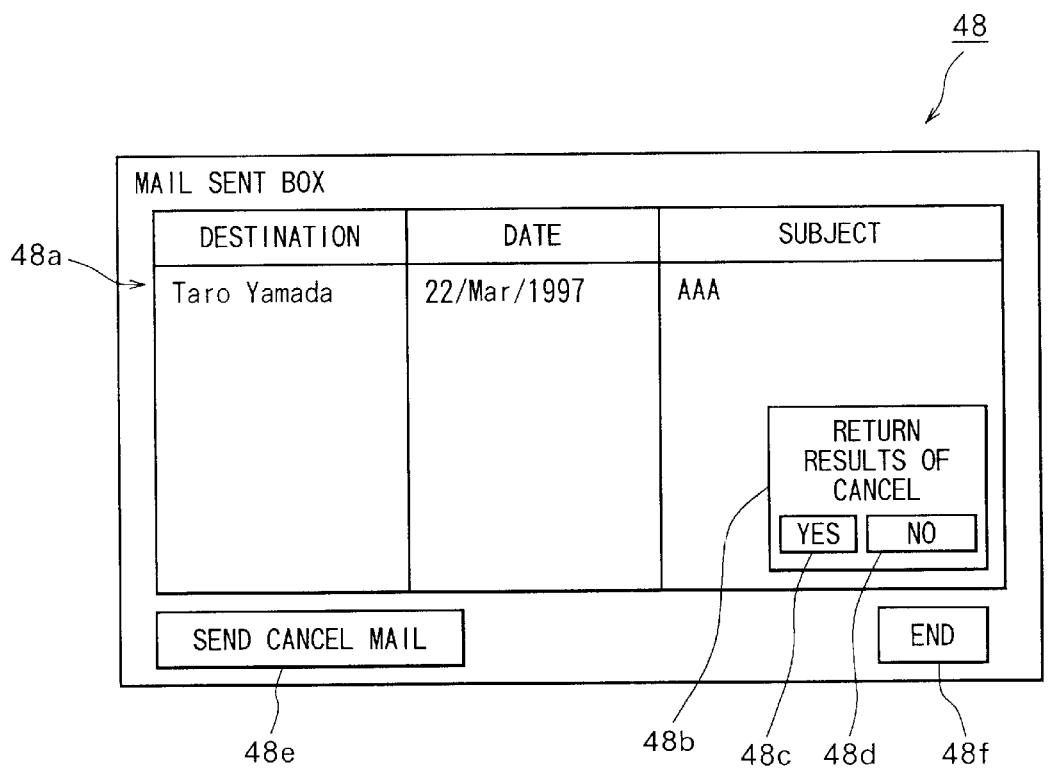
FIG. 6 illustrates a transmitted mail box displayed during the cancel mail setting operation.

At the beginning of the cancel mail issuing process, in S111, log data of all the sets of print mail, that have been transmitted from the present personal computer 4 to remote users before the click of the "cancel mail" button, is read from the transmission log storage area prepared in the hard disk 134. It is noted that as will be described later, the transmission log storage area stores a record of each print mail in S280 of the print mail transmission utility 31a after the print mail is transmitted to a corresponding remote user. Then, a mail sent box 48 is displayed on the display unit 135 as shown in FIG. 6 to show a print mail transmission list 48a listing logs of all the transmitted print mail.

Then, the operator performs a cancel mail selection process of S112 while viewing the mail sent box 48. In this process, the operator can select, among the plurality of sets of print mail displayed on the list 48a, one or more sets of print mail that the user wishes to cancel and therefore that the user wishes to remote-control the transfer destination not to print. The operator performs his/her mail selection operation by using the mouse-type input device 137 to click on the mail, desired to be canceled, on the print mail transmission list 48a. The printer driver 30 detects the mouse click operation by the operator over a certain set of print mail, and indicates that the print mail is targeted for cancellation by highlighting the same on the mail sent box 48. The printer driver 30 then displays a popup menu 48b on the mail sent box 48. The popup menu 48b is for urging the user to click on a "Yes" button 48c or a "No" button 48d to indicate whether or not the user wishes to receive, from the destination computer, return mail indicating the results of the cancel operation.

The cancel mail selection process of S112 ends when the user clicks on either a "send cancel mail" button 48e or an "end" button 48f displayed on the mail sent box 48. It is noted that clicking on the "send cancel mail" button 48e will have no effect if no mail has been selected from the transmission list 48a.

Next, the program determines in S113 whether or not the user has clicked on the "end" button 48f. When the user has clicked on the "end" button 48f ("yes" in S113), then the cancel mail issue process of S110 ends, and the printer driver process of FIG. 4 also ends.

When the user has not yet clicked on the "end" button 48f ("no" in S113), on the other hand, the program determines that the user has clicked on the "send cancel mail" button 48e. Then, the program creates a normal mail header 50b in S115. That is, the mail header 50b is created to indicate a message ID identifying the subject cancel mail; an address of the mail server 24 connected to the present computer 4; an address of the transfer destination, to which the print mail, selected by the user in S112 for cancellation, has been transmitted; and the like. It is noted that the address of the transfer destination of the selected print mail is determined based on the transmission log in the hard disk 134.

Next, in S116, the program adds a cancel mail original field to the mail header 50b. This cancel mail original field includes a message ID (cancel message ID) indicative of the print mail selected by the user in S112 for cancellation. Data of this cancel message ID is created based on the message ID of the selected print mail stored in the transmission log stored in the hard disk 134.

The cancel mail original field further includes data of an instruction to cancel printing of the print mail designated by the cancel message ID. The cancel mail original field also includes data of an instruction for whether or not the user (sender) wishes to receive return mail indicative of the results of the cancellation. This instruction is created based on the user's selection made in the popup menu 48b also during the process of S112. Data of the cancel mail original field will be used in the print mail reception utility 31b at the receiving end as will be described later. It is noted that the body 50c of the cancel mail is blank, and therefore creation of the cancel mail is completed once the mail header 50b is completed.

Thus, the body 50c of the cancel mail is prepared blank. The header 50b of the cancel mail is prepared to include: the message ID identifying the subject cancel mail; the address of the mail server 24 connected to the present computer 4; the cancel message ID indicative of the message ID of the print mail selected for cancellation; data of the instruction to cancel printing of the print data designated by the cancel message ID; data of instruction about return mail; and the address of the transfer destination, at which the selected print mail has been transmitted.

Next, the thus completed cancel mail is sent to the mail server 24 in S117, as addressed to the destination of the print mail selected to be canceled. Then, the cancel mail issuing process of S110 ends, and the printer driver process of FIG. 4 also ends.

The processes of S115–S117 are executed repeatedly for all the sets of print mail that the user has selected in S112 for cancellation from the print mail transmission list 48a. Accordingly, cancel mail is created for each of the selected print mail, and the cancel mail is transmitted to the mail server 24.

It is noted that if the destination address is the same for more than one set of the print mail selected in S112, only one cancel mail may be created for the more than one sets of print mail. The cancel mail is created to contain more than one cancel message IDs indicative of those more than one sets of print mail, and is transmitted to the corresponding single destination.

Subsequently, the cancel mail is transmitted by the mail server 24 to the Internet 28, along which the cancel mail is transferred until eventually arriving at the a destination. As described later, the computer system at the destination address will attempt to prevent the printing of the print mail indicated by the one or more cancel message IDs included in the cancel mail. The computer system will delete data of the print mail.

Next, the process of the print mail transmission utility 31a will be described with reference to FIG. 7. The process of the print mail transmission utility 31a is executed when the operator wishes to supply printed matter of the print data to a remote user.

In the example described below, the print mail transmission utility 31a will be described as a program executing on the computer 4. However, the processes of the print mail transmission utilities 31a operating on the computers 10 and 12 are exactly the same.

Figure 4:
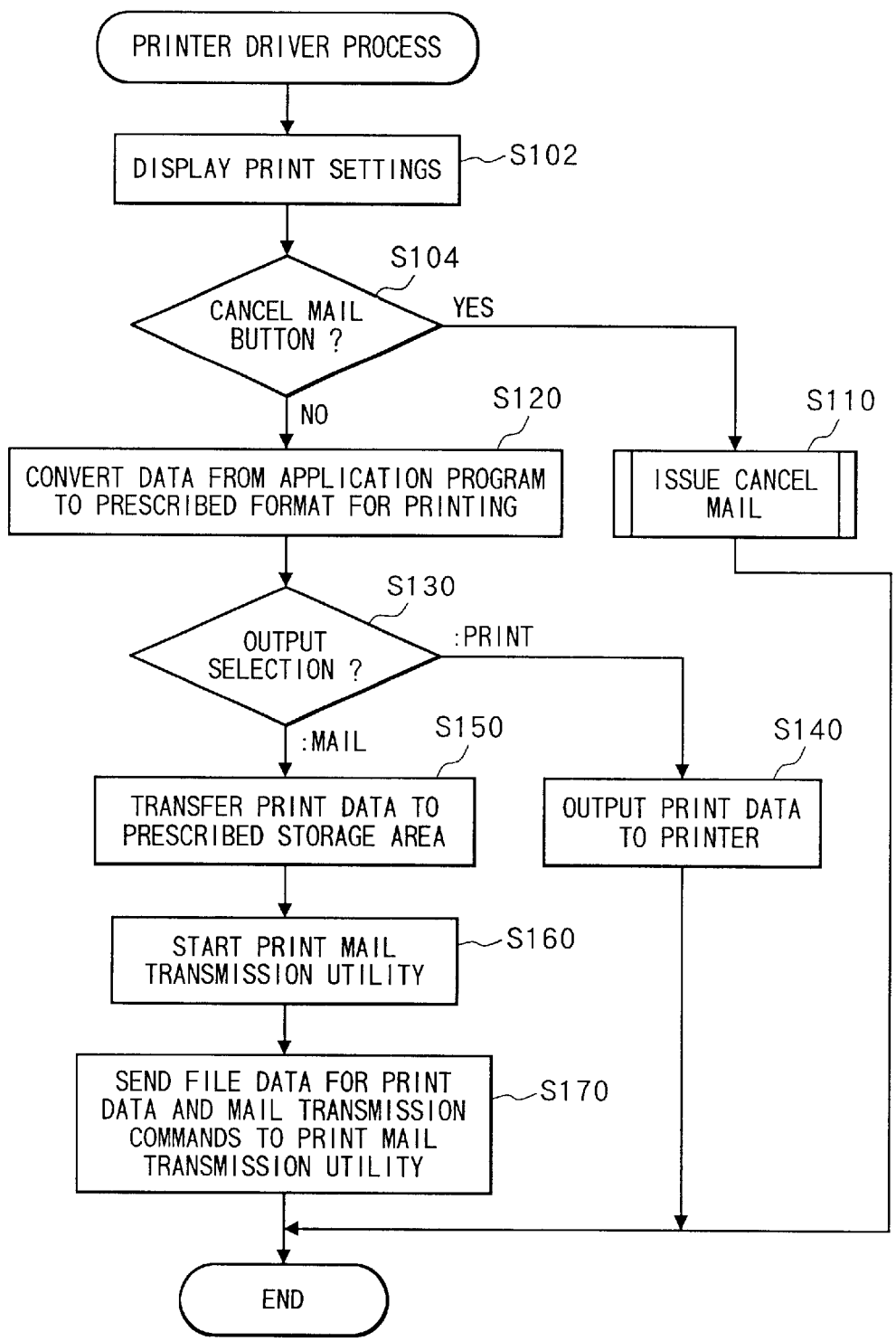
FIG. 4 is a flowchart showing a printer driver process executed by the mail transmission/reception system.

The process of the print mail transmission utility 31a is started in S160 of the print driver process of FIG. 4. At the beginning of this process, in S210, the program receives the mail transmission command and the file data of the print data to be transmitted, which is sent from the printer driver process in S170.

Next, in S220, a print mail transmission settings screen is displayed on the display 135 provided in the computer system 8. Although not shown in the drawings, the print mail transmission settings screen requests the user of a the computer system 8 to set information necessary for transmitting mail. The data necessary for the mail transmission includes the SMTP type employed for this transmission, address of the mail server 24, destination to which the print data is desired to be transmitted, a subject of the mail, and indication whether or not the user wishes to receive a return mail from a destination computer. In this example, it is assumed that the print data is desired to be transmitted to the personal computer 10 in the computer system 22. The print mail transmission settings screen further requests the user to input settings for date and time when the print data is desired to be printed at the destination. The print mail transmission settings screen can allow the user to input the number of copies desired to be outputted at the transfer destination.

In S230, a mail header 50b is created according to the information set by the user in S220. A message ID identifying the subject mail is also created and included in the mail header 50b. Then, in S240, the file attributes included in the file data, which is received in S210 from the printer driver 30, are added to the mail header 50b. In S250, all other necessary data, which is set in S220 as needed, is added to the mail header 50b.

Then, in S260, print data is read from the RAM 133 at the storage area indicated by the file data received from the printer driver 30 in S210. The print data is included in the mail body 50c as an attached file. Finally, all other necessary data, such as the envelope data 50a, is added to complete a set of print mail data. As a result, the set of print mail data 50 is created as shown in FIG. 18.

Accordingly, the body 50c of the print mail is constructed from the attached file including print data desired to be printed at the transfer destination. The header 50b of the print mail includes: the message ID identifying the subject print mail; an address of the mail server 24 connected to the computer 4; an address of the transfer destination; the subject of the print mail; and the like. The header 50b further includes indication whether or not the sender wishes to receive a return mail from a destination computer. The header 50b of the print mail further includes print information (processing format data) indicative of how the print data included in the attached file is desired to be printed at the transfer destination. The print information includes the file attributes such as: a code indicative of the page description language, at which the print data has been prepared; the number of sheets, onto which the print data should be printed, that is, the number of pages, onto which the print data has been edited, and the number of copies of the print data desired to be outputted at the transfer destination. The print information also includes data of "date and time" when the print mail is desired to be printed if this "date and time" data is set by the sender in S220.

In S270, the thus completed set of print mail data 50 is transmitted to the mail server 24 with the destination set in S220. A log of this transmission is stored in S280 in the transmission log storage area prepared in the hard disk drive 134 or the like. Then, the mail transmission utility process ends.

The print mail is then transmitted via the mail server 24 to the Internet 28 side, where the print mail 50 is transferred until arriving at its final destination, the computer 10 in this example.

The process of the print mail reception utility 31b will be described below with reference to the flowcharts in FIGS. 8–17. In the example described below, the print mail reception utility 31b is executed on the personal computer 10. It is noted that the print mail reception utility 31b executed on other personal computers 4 and 12 execute the same processes as those of FIGS. 8–17.

The print mail reception utility 31b can print not only print mail, which has been created by the print mail transmission utilities 31a provided on remote computers, but also ordinary mail which has been created by ordinary mail transmission utilities provided also on the remote computers.

The process of the print mail reception utility 31b is started when the personal computer 10 is turned ON. At the initial start up timing of this process, an interrupt timer is set. Then, the process of the print mail reception utility 31b will be repeatedly executed from S310 at a prescribed interval, for example, every 10 seconds.

At the beginning of the process, the program accesses, in S310, the POP server 38 in the mail server 26 via the LAN 20 to check for mail newly arrived at that mail spool 34. If one or more newly-arrived sets of mail data 50 (print mail, ordinary mail, and cancel mail) is stored in the mail spool 34 as destined for the personal computer 10, then the POP server 38 responds to the personal computer 10 while sending information of the new mail to the print mail reception utility 31b.

In S320, the program checks the response from the POP server 38 to determine whether one or more sets of newly-arrived mail data (print mail, ordinary mail, or cancel mail) exists in the mail spool 34. When it is determined that there is no new mail ("no" in S320), then a timer counter value for the next timer interrupt is initialized in S330. In S340, the timer is started. Accordingly, as long as the timer is not stopped, the print mail reception utility process will be repeatedly executed from S310 at the predetermined interval.

Then, in S350, an initialization screen is displayed on a display 135 for allowing a user of the computer 10 to set his/her desire to modify a setting of the print mail reception utility process. In S360, the program determines whether the user has indicated his/her desire to modify the setting. If the user wishes to modify the setting ("yes" in S360), then the timer for the timer interrupt is stopped in S370. Next, in S380, a setting screen is displayed on the display 135 for allowing the user to set his/her desired setting conditions to be used during the print mail reception utility process. In S380, the program receives input from the user for modifying the setting conditions.

These setting conditions include: a condition to be utilized in S840 (FIG. 12) for judging whether received mail should be printed; a condition to be utilized in S999 (FIG. 13) for judging whether the received mail should be printed with a cover page; a condition to be utilized in S1070 (FIG. 16) for judging whether the received mail should be deleted from the mail box 40 after the mail is printed; a condition to be utilized in S1110 (FIG. 17) for judging whether the received mail should be deleted from the mail spool 34 after the mail is printed, or the like. For example, the condition, to be utilized in S840, may be set so that each set of received mail should be printed when at least one of first through third judgments (1)–(3) described below is made affirmative. The first judgment (1) is for judging whether or not the received mail is print mail created by and sent from the print mail transmission utility 31a. The second judgment (2) is for judging whether or not the received mail has been sent from a transmitter specified by the user during the setting process of S380. The third judgment (3) is for judging whether or not the received mail is of a certain subject also set by the user during this setting process of S380.

After the settings in S380 are completed, the process returns to S330, in which the timer counter value is again initialized. The timer is again started in S340.

If no instruction to modify the setting conditions is inputted ("no" in S360), on the other hand, a mail print selection process of S400 is executed.

Figure 19:
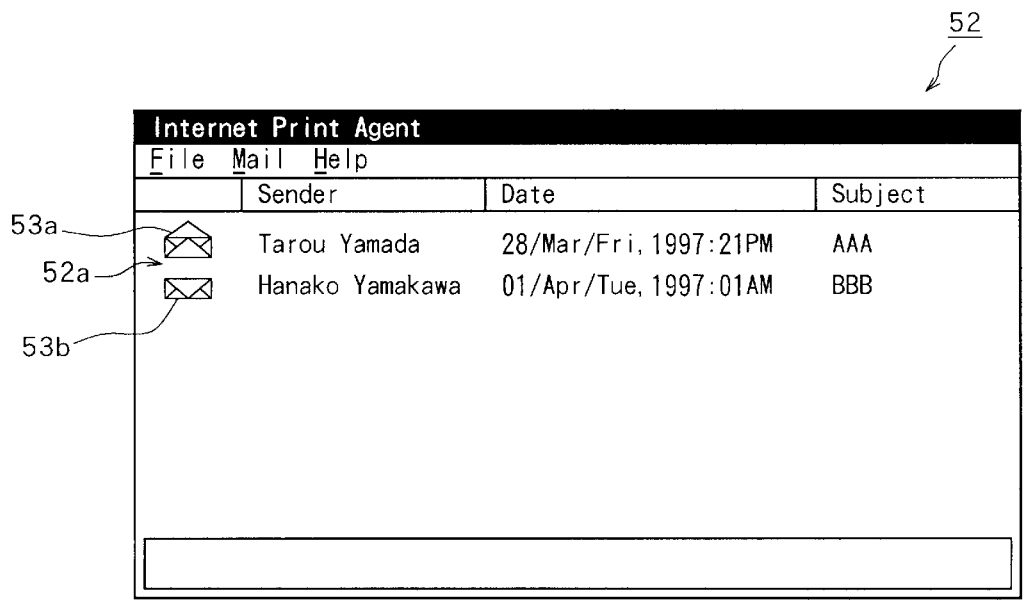
FIG. 19 is an explanatory diagram showing the configuration of a mail log window.

It is noted that although not shown in the drawings, the initialization screen displayed in S350 shows an item "display mail log window" on its menu screen portion. When the user selects the item "display mail log window" with using the mouse-type input device 137, provided to the computer 10, a mail log window 52 shown in FIG. 19 is displayed on the top of the initialization screen. The mail log window 52 is created based on mail log data stored in a mail log data storage area in the RAM 133 of the personal computer 10.

As shown in FIG. 19, the mail log window 52 shows, in a list, one or more sets of mail log data 52a indicative of one or more sets of mail data (print mail and ordinary mail) already received from the mail spool 34. An opened mark 53a is appended to each set of mail log data 52a, whose corresponding mail (print mail and ordinary mail) has already been printed. An unopened mark 53b is appended to each set of mail log data 52a whose corresponding mail (print mail and ordinary mail) has not yet been printed.

The mail print selection process of S400 will be described below with reference to FIG. 9.

At the beginning of the process, the mail log window 52 is displayed on the display 135 of the personal computer 10 if the user has selected the item "display mail log window" on the initialization screen. The mail print selection process therefore first determines in S410 whether the left button of the mouse-type input device 137 has been clicked when a mouse cursor is being positioned over one set of mail log data 52a.

It is noted that if the user has not accessed the initialization screen to display the mail log window 52, on the other hand, the mail log window 52 is not displayed. Accordingly, determinations in the judging process of S410 becomes "No". Because determinations in the following judging processes of S430, S460, and S490 become all "no," and accordingly the process returns to S360. Thus, when the user has not accessed the initialization screen to display the mail log window 52, the mail print selection process of S400 is essentially not executed.

If the left button has been clicked over one set of mail log data 52a on the mail log screen 52 ("yes" in S410), then a line, on which the set of mail log data 52a indicated by the mouse cursor is located at the time of the click, is highlighted in S420 to indicate the selection performed by the user. If the left button has not been clicked over any mail log data 52a ("no" in S410), then the program determines in S430 whether the right button of the mouse-type input device 137 has been clicked over the mail log window 52. If the right button has been clicked ("yes" in S430), then the program determines in S440 whether there exists a highlighted set of mail log data 52a. In other words, the program determines whether one line in the mail log window 52 has been already selected through the user's manipulation of the left button.

Figure 20:
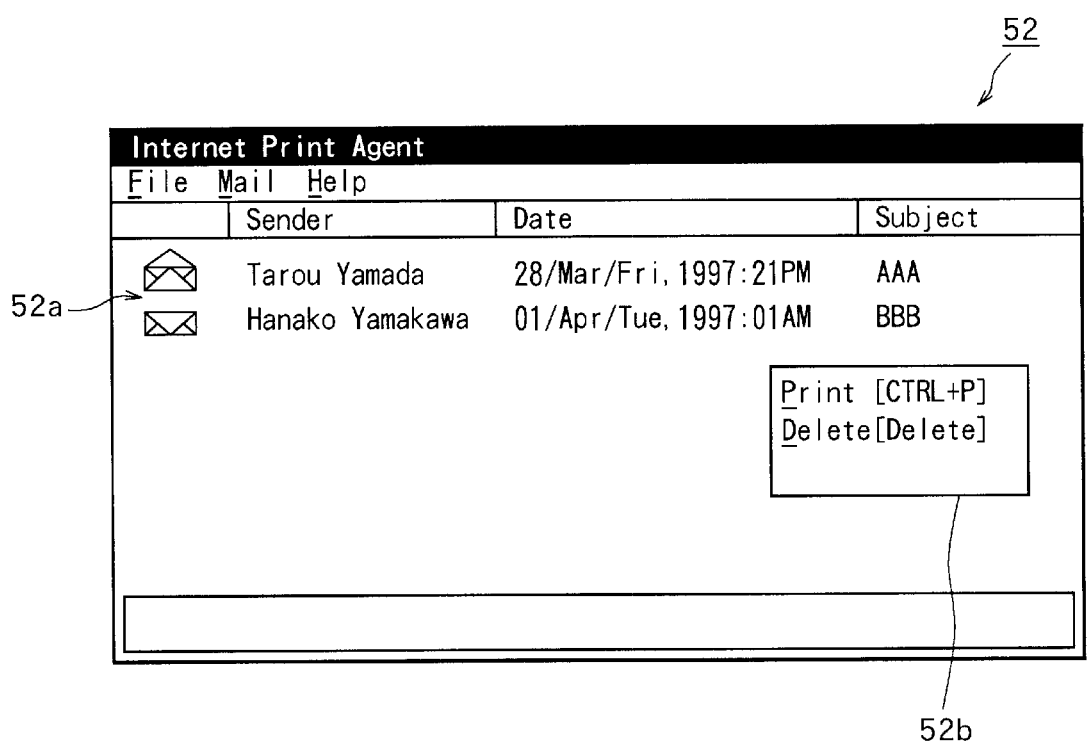
FIG. 20 is an explanatory diagram showing the configuration of the mail log window displaying a popup menu.

If no highlighted mail log data 52a exists ("no" in S440), the process returns to S360. On the other hand, if highlighted mail log data 52a does exist in the mail log window 52 ("yes" in S440), then a popup menu 52b is displayed in S450 on the top of the mail log window 52 as shown in FIG. 20.

The determination processes of S460 and S490 relate to the selection made by the user on the popup menu screen 52b. That is, if "delete" (delete mail) displayed on the popup menu 52b is selected by the user ("yes" in S460), then in S470 the highlighted mail (print mail or ordinary mail) is deleted from the mailbox 40, and corresponding mail log data is deleted from the mail log data storage area in the RAM 133 of the personal computer 10. After the mail log data is thus deleted, the display of the mail log window 52 is updated in S480, reflecting that the mail has been deleted.

If "print" (print mail) has been selected ("yes" in S490) on the popup menu 52b, on the other hand, then the highlighted mail (print mail or ordinary mail) is printed according to the process beginning from S980 (FIG. 13) as will be described later.

Figure 10:
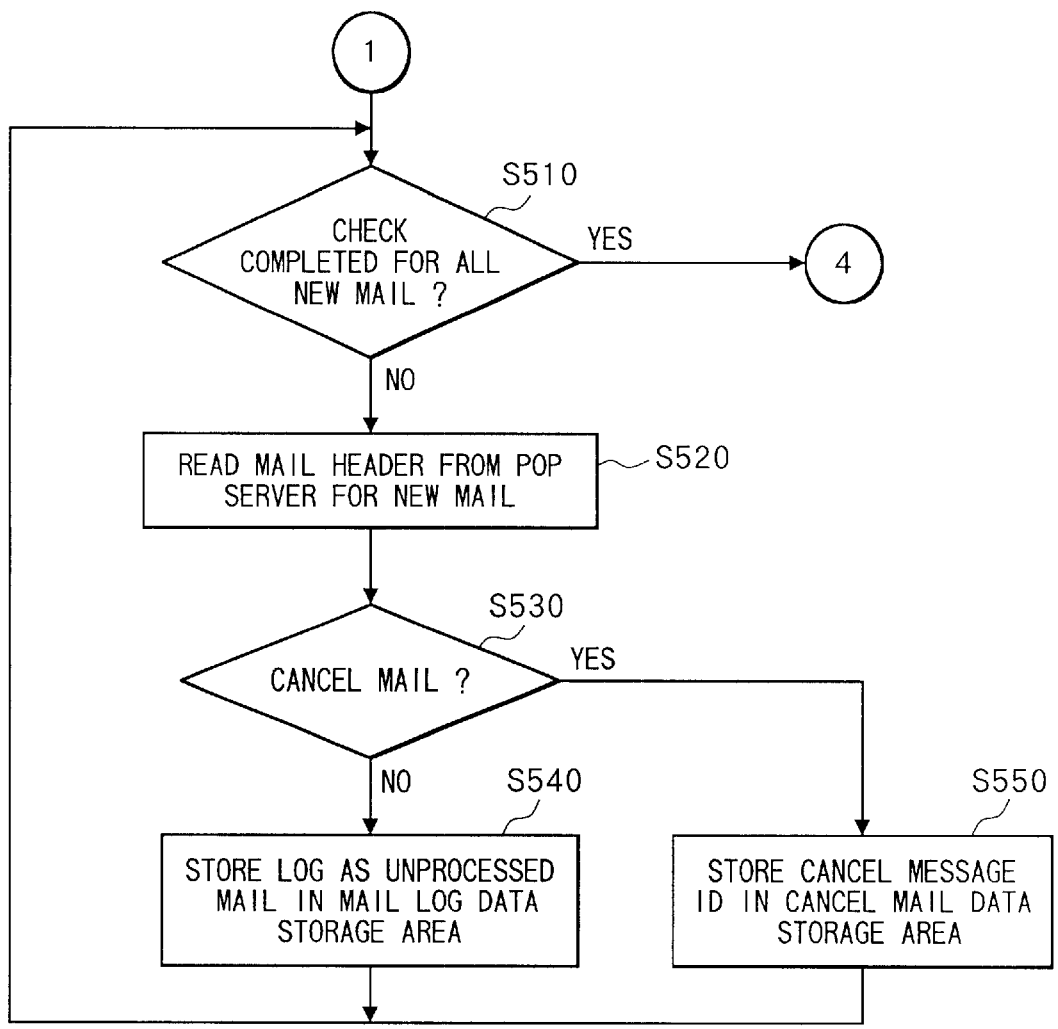
FIG. 10 is a flowchart showing part of the print mail reception utility process executed by the mail transmission/reception system.

On the other hand, when the determination in S320 determines that one or more sets of newly-arrived mail exists in the mail spool 34 of the mail server 26 ("yes" in S320), then the program proceeds to S510 shown in FIG. 10.

The program determines in S510 whether a new mail check process of S520–S550 has been completed for all the newly-arrived sets of mail data (print mail, ordinary mail, and cancel mail).

When the new mail check of S520–S550 has not yet been completed for all the newly-arrived mail ("no" in S510), then in S520, the program requests the POP server 38 to read a mail header of one set of newly-arrived mail (print mail ordinary mail, or cancel mail) from the mail spool 34. Next, the program determines in S530, based on the read out mail header, whether the corresponding mail is cancel mail, which has been sent to the present computer 10 in order to cancel one or more sets of print mail previously sent towards the computer 10.

If the mail header indicates that the corresponding mail is not cancel mail ("no" in S530), mail log of the corresponding mail is recorded in S540 in the mail log data storage area of the RAM 133. Data of this mail log is constructed from data included in the mail header and is designed to indicate that the corresponding mail is unprocessed mail, not yet subjected to mail print processes of S610–S950. As will be described later, a set of mail log data 52a, indicative of this newly-recorded mail log, will be newly added to the mail log window 52 in S880 (FIG. 12) if the corresponding mail is targeted for printing, but is not targeted for cancellation.

If the mail header indicates that the corresponding mail is cancel mail ("yes" in S530), on the other hand, one or more cancel message IDs written in the mail header are stored in S550 in the cancel mail data storage area prepared in the RAM 133 of the personal computer 10. The one or more cancel message IDs indicates one or more sets of print mail that have been sent to the computer 10 prior to the subject cancel mail and that should be deleted so as not to be printed out.

Figure 11:
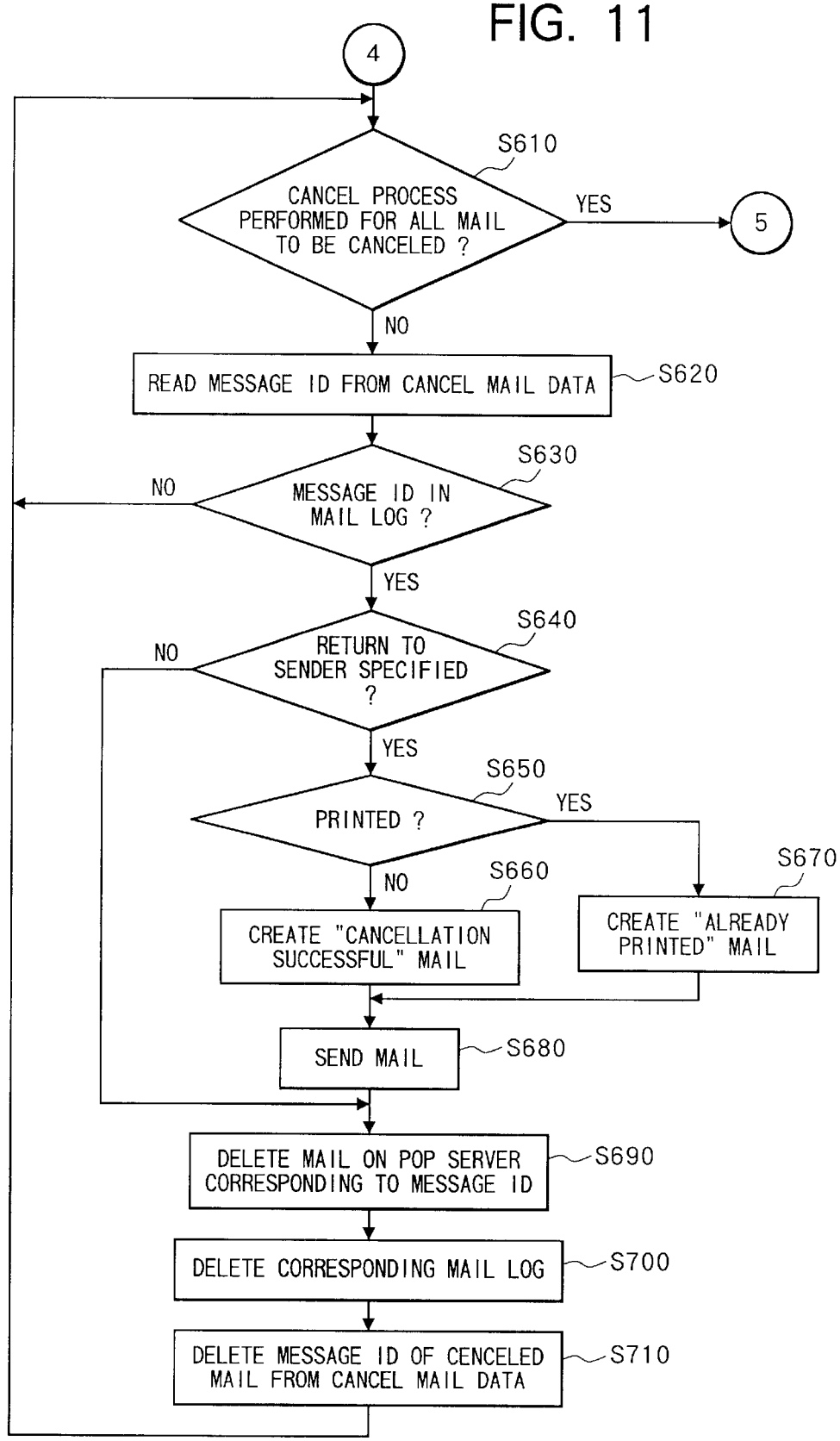
FIG. 11 is a flowchart showing part of the print mail reception utility process executed by the mail transmission/reception system.

When the above-described new mail check processes of S520–S550 have been completed for all the newly-arrived sets of mail data ("yes" in S510), the program proceeds to S610 shown in FIG. 11. The program determines in S610 whether a cancel process of S620–S710 is completed for all the sets of print mail that are indicated by the cancel message IDs newly stored in the cancel mail data storage area in S550.

When this cancel process has not yet been performed for all the cancel message IDs ("no" in S610), then one cancel message ID is read in S620 from the cancel mail data storage area. Next, the program determines in S630 whether print mail, whose message ID corresponds to the cancel message ID, exists in the mail log data storage area. That is, the program determines whether there exists mail log data indicative of an message ID corresponding to the cancel message ID. If no message ID corresponding to the cancel message ID exists ("no" in S630), then the process returns to S610. On the other hand, if mail log data corresponding to the cancel message ID exists in the mail log data storage area ("yes" in S630), then the program determines in S640 whether the mail header of the cancel mail is set with a designation to return a confirmation to a sender. If the cancel mail is not set with the return designation ("no" in S640), then the process jumps to S690.

On the other hand, if the cancel mail is set with the return designation ("yes" in S640), then the program determines in S650 based on the mail log data whether at least a part of print data in print mail indicated by the cancel message ID has already been outputted to be printed. The judgment in S650 becomes affirmative both when the print mail has already been completely printed and when the print mail is presently being printed. The judgment in S650 becomes negative only when any part of the print data has not yet been transferred to any printer, that is, when printing of the print mail has not yet been started. Accordingly, if the mail indicated by the cancel message ID has not yet been started to be printed ("no" in S650), then the program creates in S660 a set of return mail data indicating that cancellation is successful. However, if the print mail indicated by the cancel message ID has already been printed or is in the middle of the printing ("yes" in S650), then the program creates in S670 another set of return mail data indicating that printing has been completed or has been started. This return mail shows that cancellation is failed.

The return mail thus created in S660 or S670 is transmitted back in S680 to the sender of the cancel mail. It is noted that the address of the sender is indicated in the mail header of the cancel mail. By receiving this mail, the sender of the cancel mail can determine whether the cancellation is successfully performed.

The program proceeds to S690 from S680. The program proceeds to S690 also when a negative judgment is achieved in S640. In S690, the personal computer 10 instructs the POP server 38 to delete data of the print mail indicated by the cancel message ID. Upon receiving this instruction, the POP server 38 deletes the corresponding print mail data from the mail spool 34.

Next, in S700, the program deletes, from the mail log data storage area, mail log data including a message ID corresponding to the cancel message ID. Finally, in S710, the program deletes, from the cancel mail data storage area, the cancel message ID indicative of the print mail that has been just canceled in S690.

Then, the program returns to S610. Hence, as long as some cancel mail information (cancel message ID) exists in the cancel mail data storage area ("no" in S610), the processes of S620–S710 are repeatedly executed, thereby canceling from the server 26 all the sets of print mail data indicated by the cancel message IDs included in the newly-received cancel mail and canceling all the corresponding mail log data from the mail log data storage area of the computer 10.

Thus, the computer system 22 at the receiving end deletes data of print mail immediately after receiving cancel mail for requesting cancellation of that print mail. Thus, it is ensured that the print mail be prevented from being printed at the receiving end.

Figure 12:
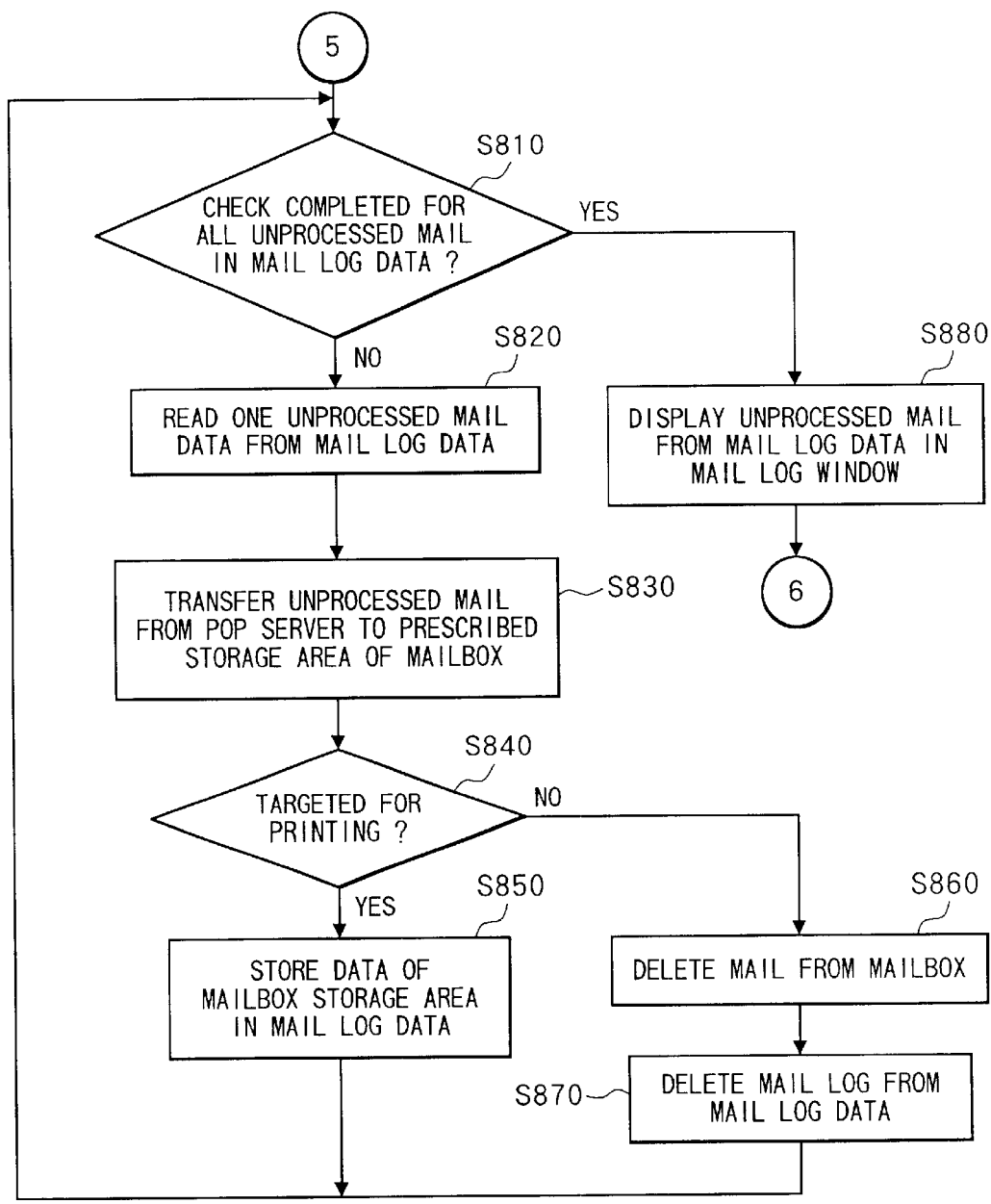
FIG. 12 is a flowchart showing part of the print mail reception utility process executed by the mail transmission/reception system.

When all the sets of print mail data, indicated by the cancel message IDs in all the newly-received cancel mail, and their corresponding log data are canceled, the cancel process of S620–S710 is completed ("yes" in S610), and the program proceeds to S810 shown in FIG. 12.

In S810, the program determines whether print check process of S820–S870 has been completed for all the sets of unprocessed mail data (print mail data and ordinary mail data) whose mail log data is presently stored in the mail log data storage area as indicating that the corresponding mail is unprocessed. If the print check process has not yet been completed for all the unprocessed mail data sets ("no" in S810), then in S820, the program reads, from the mail log data storage area, one set of mail log data (mail header data) indicative of one set of unprocessed and not-yet checked mail data. Then, in S830, the program requests the POP server 38 to transfer one set of mail data, corresponding to the read mail log data, from the mail spool 34. The set of mail data is then stored in a predetermined storage area of the mailbox 40.

In S840, the program determines whether the set of mail data, newly stored in the predetermined storage area of the mailbox 40, should be printed. This judgment is performed based on the setting conditions already set by the user during the process of S380. More specifically, the contents of the corresponding mail header (mail log data) are first examined. Then, the following judgments (1)–(3) are performed based on the contents of the mail header. The first judgment (1) is for judging whether or not the mail is print mail which has been created by and sent from the print mail transmission utility 31a of a remote computer. The second judgment (2) is for judging whether or not the mail has been sent from the user's set specified transmitter. The third judgment (3) is for judging whether or not the mail is on a certain subject also set by the user. The mail is determined as targeted for printing when either one of the three judgments (1)–(3) is made affirmative in view of the setting conditions already set during the setting process of S380. The mail may be determined as targeted for printing when a combination of two or all of the three judgments (1)–(3) is made affirmative.

If it is determined that the mail should be printed ("yes" in S840), then in S850 the program stores, in the mail log data storage area, information on the storage area in which the subject mail data is stored. For example, the program stores, in the mail log data storage area, data indicative of a path to the directory of the hard disk 134 in which the mail data is stored. If it is determined that the mail data should not be printed ("no" in S840), on the other hand, the mail data is deleted in S860 from the mailbox 40. Then, in S870, mail log data for the subject mail is deleted from the mail log data storage area.

Then, the process returns to S810. In this way, the print check processes of S820–S870 are repeated for all the unprocessed mail data sets specified by the mail log data presented in the mail log data storage area. When these print check processes have been completed for all the unprocessed mail data sets ("yes" in S810), the program proceeds to S880. In S880, log of all the unprocessed mail data sets, indicated as unprocessed by mail log data presently stored in the mail log data storage area, is newly added to be displayed on the mail log window 52.

Figure 13:
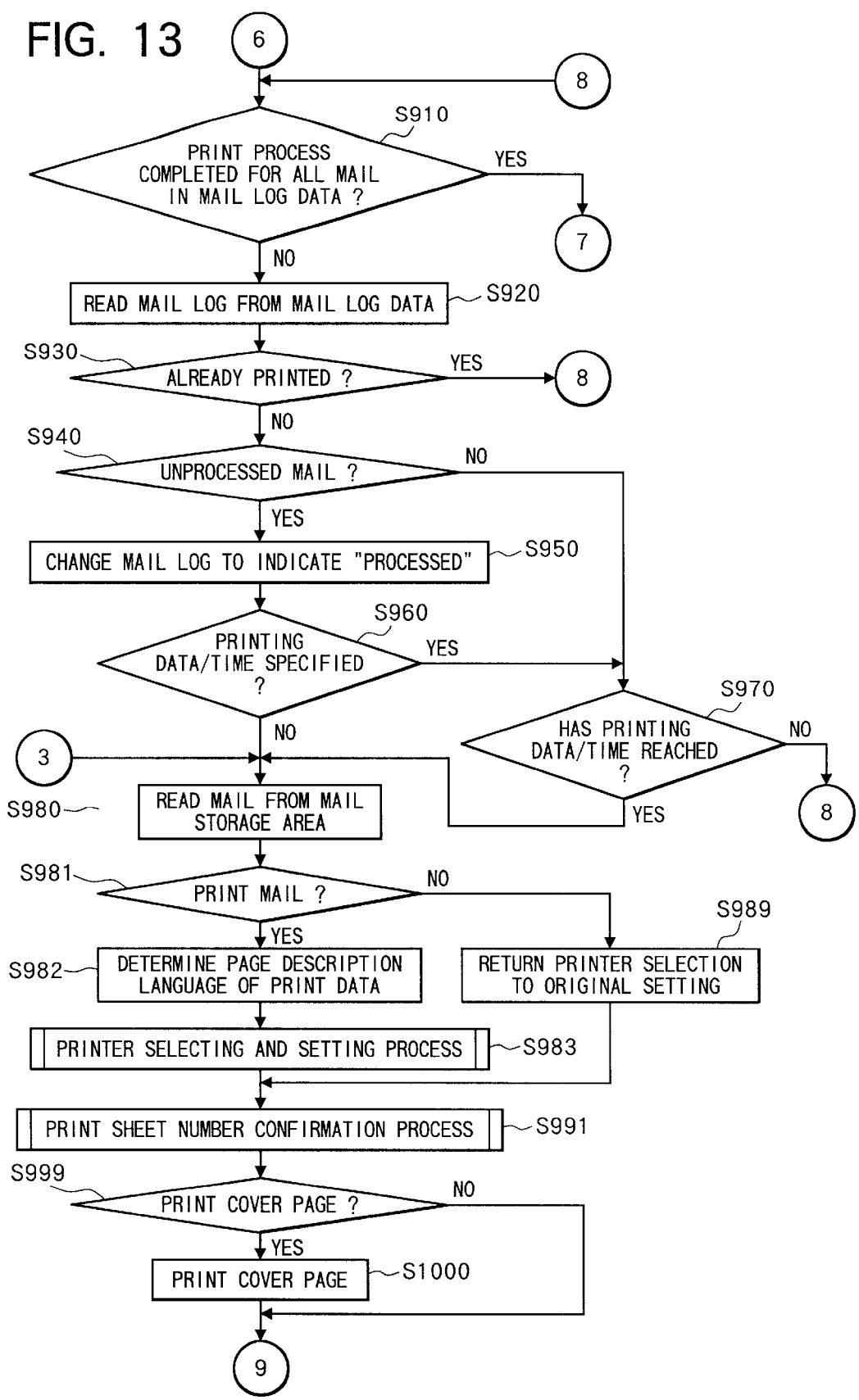
FIG. 13 is a flowchart showing part of the print mail reception utility process executed by the mail transmission/reception system.

Then, the process goes to S910 shown in FIG. 13. In S910, the program determines whether a mail print process of S920–S1170 has been completed for all the mail data sets whose mail log data is presently recorded in the mail log data storage area. In other words, the program determines whether the mail print process of S920–S1170 has been completed for all the mail data sets that are presently registered in the mail log data storage area. When the mail print process has not yet been completed for all the mail data sets registered in the mail log data area ("no" in S910), then one set of mail log data is read from the mail log data storage area in S920. Next, the program determines in S930 whether mail data corresponding to the presently-read mail log data has already been printed. If the mail data has been already printed ("yes" in S930), the process returns to S910.

If the mail data has not yet been printed ("no" in S930), on the other hand, the program determines in S940 whether the mail is unprocessed mail, on which the mail print process of S920–S1170 has not yet been executed. If the mail is unprocessed mail ("yes" in S940), the program proceeds to S950, in which the mail log data for this mail is changed to indicate that the corresponding mail is "processed".

Next, the program determines in S960 whether date and time is designated for printing the subject mail. If the corresponding mail log data (mail header data) includes indication of date and time the mail should be printed ("yes" in S960), then the program determines in S970 whether time has reached the date and time specified in the mail log data. When time has not yet reached the specified date and time ("no" in S970), the process returns to S910.

If the mail log data includes no information on date and time ("no" in S960), the program proceeds to S980. Similarly, when the time has reached the date and time specified by the mail log data ("yes" in S970), the program proceeds to S980. In S980, a set of mail data is read from the mail data storage area in the mailbox 40 at a directory indicated by the mail storage area data included in the mail log data.

Figure 9:
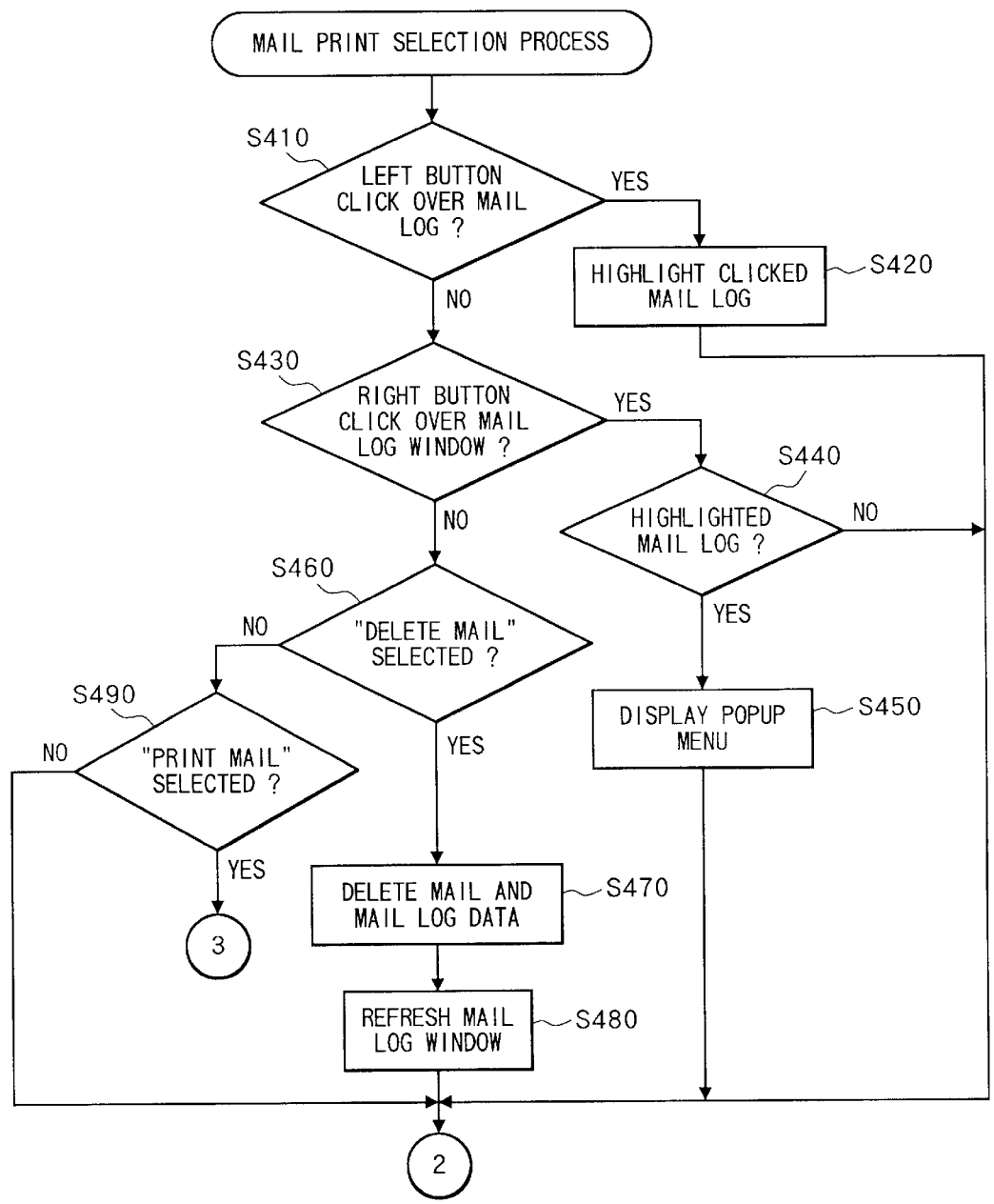
FIG. 9 is a flowchart showing a mail print selection process in the process in FIG. 8.

It is noted that the program directly proceeds to S980 from S490 (FIG. 9) when the user on the computer 10 has selected "Print" in S490 ("Yes" in S490) on the popup menu 52b as shown in FIGS. 9 and 20.

Next, the program determines in S981, based on the contents of the mail log data (mail header), whether the subject mail is print mail, that is, whether the mail has been created by the print mail transmission utility process 31a. This determination is attained through judging whether print information (file attributes) is included in the mail log data (mail header data). If the mail log data includes print information, the corresponding mail is determined as print mail. If the mail log data does not include print information, on the other hand, the corresponding mail is determined as ordinary mail. If the mail is print mail ("yes" in S981), then in S982 the program inspects the file attributes, included in the mail header, to determine page description language (emulation type) of print data included in the print mail. In the present embodiment, the file attributes include a code indicative of the page description language (emulation type) of the print data. That is, the page description language code indicates PCL, PostScript, GDI, or the like, with which the print data is described or defined. Accordingly, the program easily determines the page description language of the print data based on the page description language code.

Thus, according to the present embodiment, the page escription language of the print data is determined in S982 based on the code stored in the mail header. However, the page description language can be determined by checking the print data included in the print mail and determining, from the description itself, what page description language is used.

Next, a printer selecting and setting process of S983 is executed based on the page description language thus determined in S982.

Figure 14:
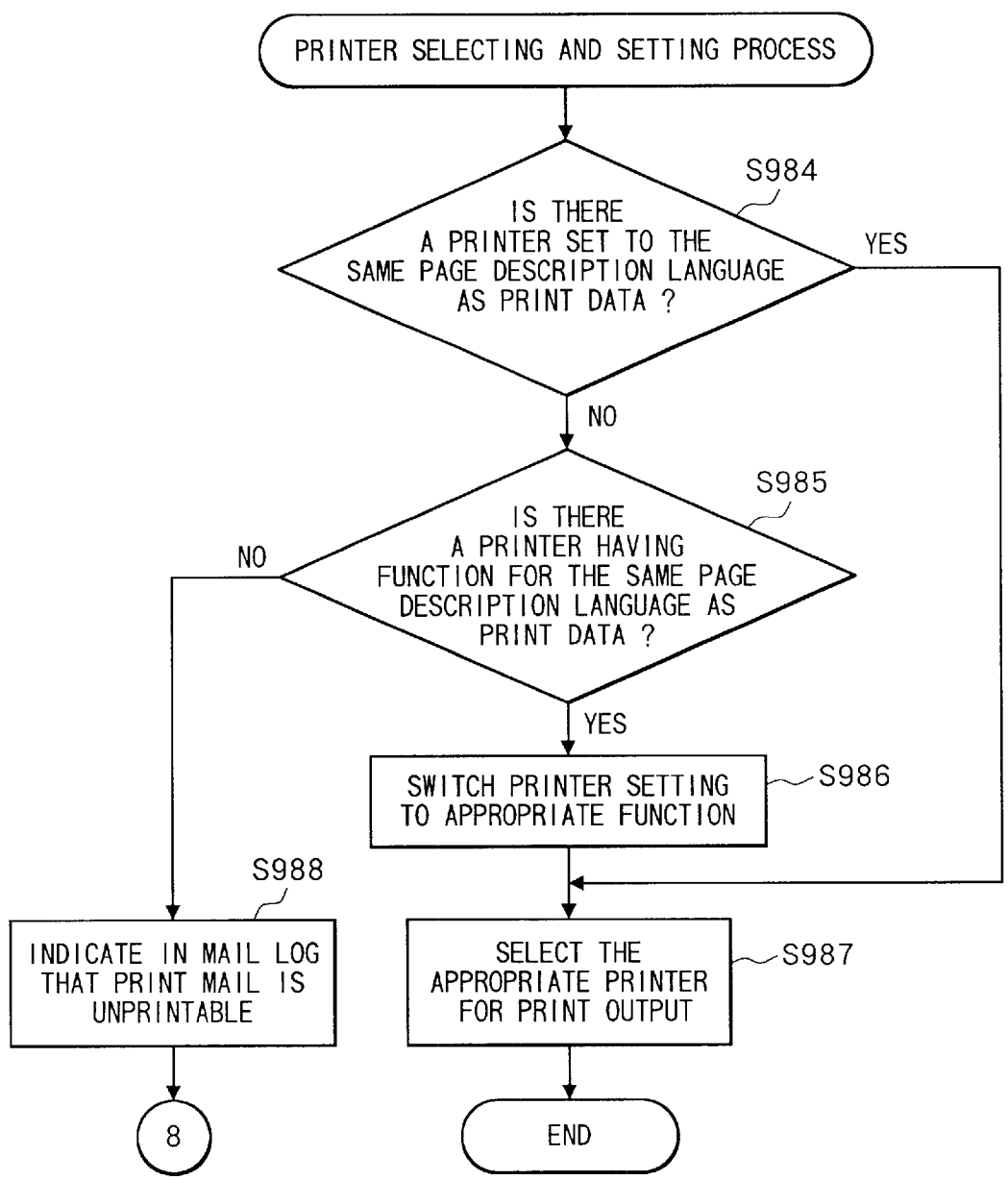
FIG. 14 is a flowchart showing a printer selecting and setting process in the print mail reception utility process.

The printer selecting and setting process of S983 will be described below in more detail with reference to FIG. 14.

First, the program determines in S984 whether at least one of the printers 14, 16, and 18 on the receiving end (computer system 22) is set to the same page description language as determined in S982. This determination is performed based on setting data, of the printers 14, 16, and 18. which has been received via communication from the printers 14, 16, and 18 when the personal computer 10 has been turned ON. Of course, the process of S984 may be designed to access the printers 14, 16, and 18 to receive from the printers 14, 16, and 18 information whether they are set to the same page description language as determined in S982.

It is noted that when the present print mail reception utility process 31b is executed on the computer system 8 side, the process of S984 is executed to, judge whether the printer 6 is set to the page description language as determined in S982, because only the printer 6 is provided in the computer system 8 side.

If at least one of the printers provided in the receiving end is set to the same page description language ("yes" in S984), then that printer, set to the same page description language, is set to be used for printing the current print data in S987.

On the other hand, if there exists no printer set to the same page description language ("no" in S984), the program determines in S985 whether at least one of the printers at the receiving end has a function capable of interpreting the page description language of the print data determined in S982 and capable of printing the print data. This determination is performed also based on the setting data of the printers 14, 16, and 18, previously received from the printers 14, 16, and 18 when the personal computer 10 has been turned ON.

If at least one printer has this function to interpret and print the page description language determined in S982 ("yes" in S985), then that printer determined with this function is switched in S986 into the function mode (operation mode) to interpret and print the page description language of the print data. Then, in S987, that printer is set to be used for printing the current print data.

However, if there exists no printer having this function to interpret the page description language as determined in S982 ("no" in S985), then in S988 a message is displayed in the mail log window 52 indicating that the current print mail is unprintable, and the process returns to S910.

On the other hand, if the program determines that the current mail is not print mail but ordinary mail ("no" in S981), then the process of S989 is executed to return the selection setting of the printer to its initial setting.

Figure 15:
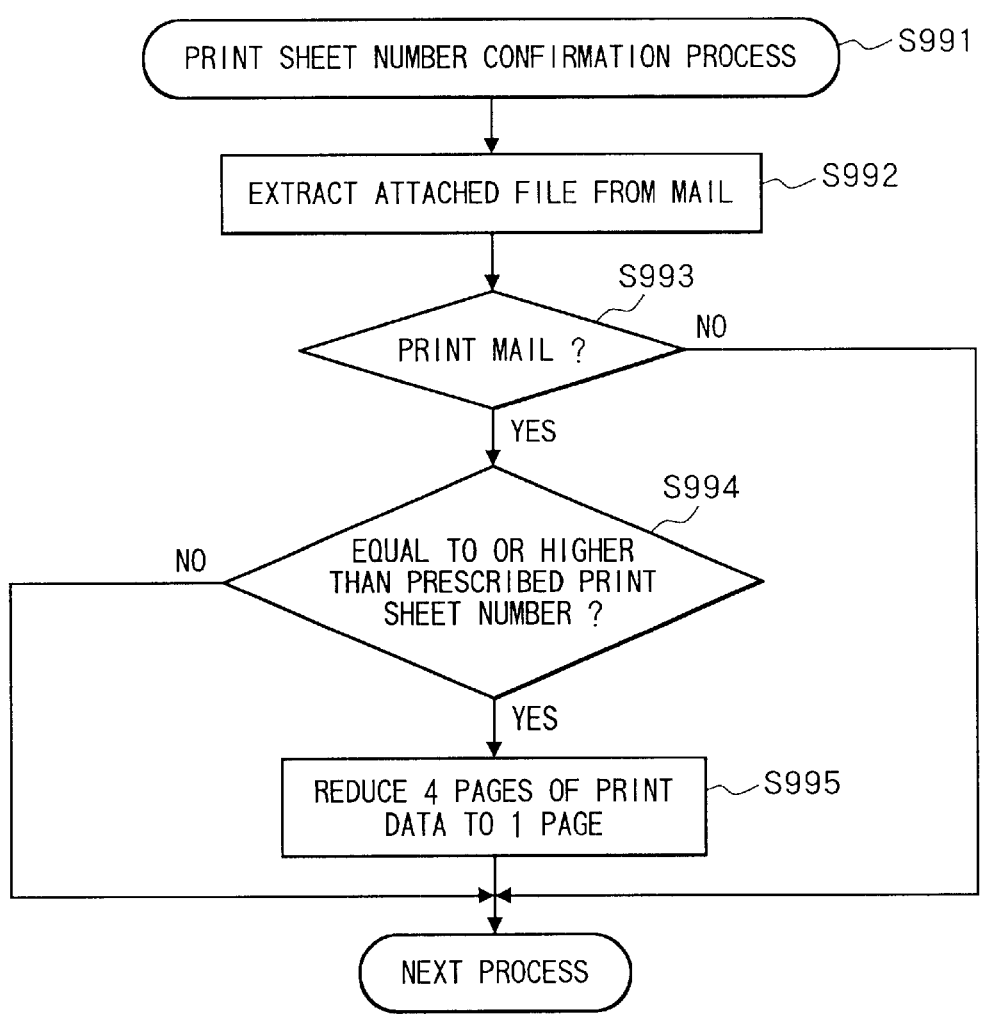
FIG. 15 is a flowchart showing a print sheet number confirmation process in the print mail reception utility process.

Next, a print sheet number confirmation process of S991 is executed. This process is shown in FIG. 15.

First, in S992, all the file(s) attached to and included in the current mail are extracted. Next, the program determines in S993, based on the contents of its mail log data (mail header), whether the mail is print mail which has been created by the print mail transmission utility process 31a. If the mail is not print mail but ordinary mail ("no" in S993), the process directly proceeds to S999 shown in FIG. 13. If the mail is print mail ("yes" in S993), on the other hand, the program checks in S994 the file attributes included in the mail header, and examines the number of pages, into which the print data has been prepared or edited by the printer driver 30, and the number of copies, into which the print data should be copied. The program then determines the total number of sheets required to be printed with the print data. The program determines whether the determined total number of sheets is equal to or higher than a prescribed print sheet number (for example, 100 sheets) which is set as a maximum sheet number.

If the total number of sheets to be printed is less than the prescribed number of print sheets ("no" in S994), then the process directly proceeds to S999. On the other hand, if the total number of sheets to be printed is equal to or greater than the prescribed number of print pages ("yes" in S994), then the page description language describing the subject print data is converted in S995 so that print data equivalent to four pages before conversion is reduced to one page of print data. More specifically, the print data is compacted to be capable of being printed on one-fourth of the total number of sheets. If the print data is comprised of character data, for example, this process decreases spaces between the lines and between characters, as well as the size of the respective characters, and converts four pages' worth of data into a one-page layout. If the print data is comprised of image data (dot data), on the other hand, the dot data is thinned out, and four pages' worth of data is converted into a one-page layout. After this page reduction process of S995 is completed, the process proceeds to S999.

Figure 8:
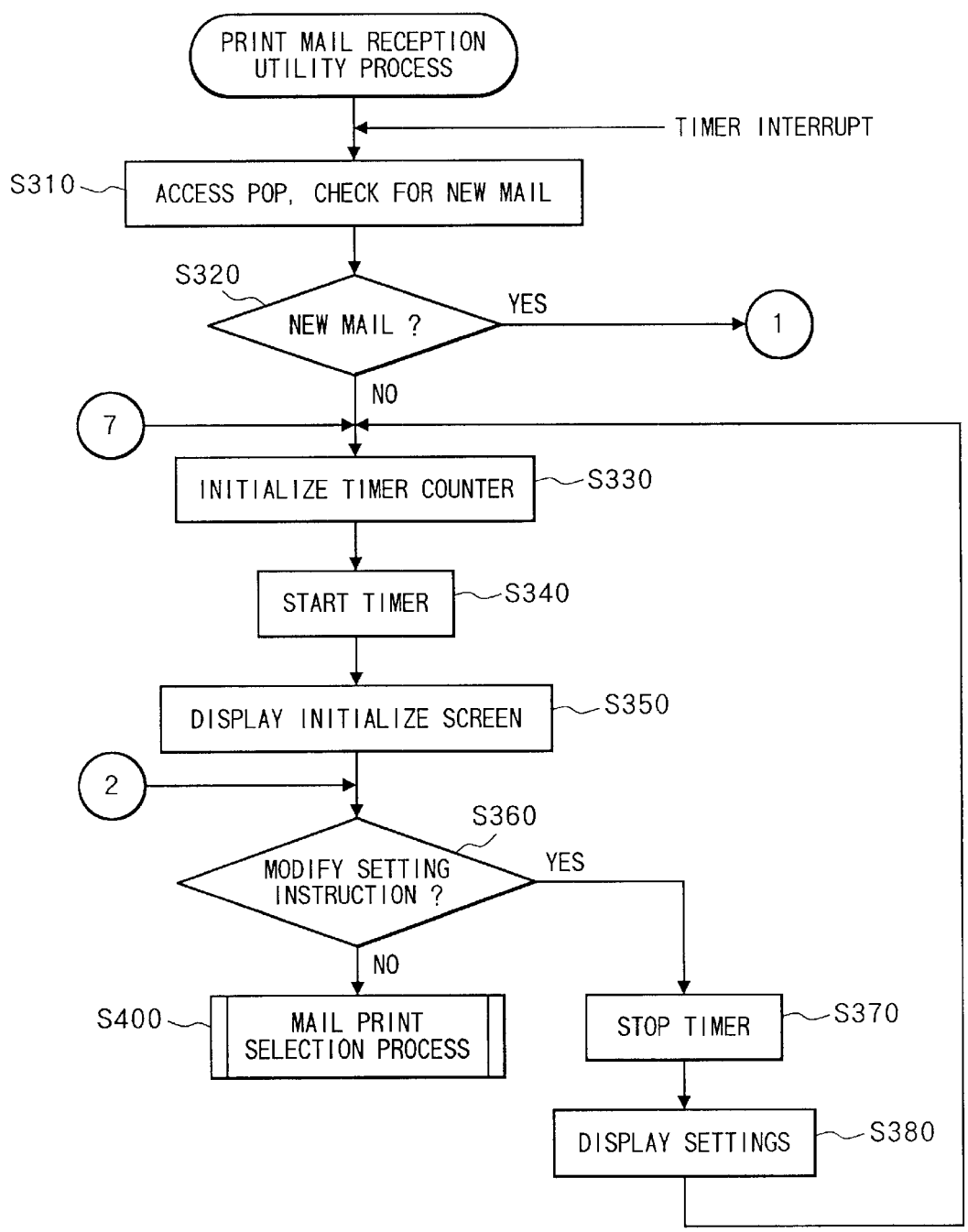
FIG. 8 is a flowchart showing part of a print mail reception utility process executed by the mail transmission/reception system.

In S999, the program determines whether the cover page print setting has been set by the user of the computer 10 (receiving side) during the process of S380 shown in FIG. 8. If the cover page print setting has been set ("yes" in S999), a cover page printing process of S1000 is executed. During this process, when the current mail is print mail, a cover page is printed by the printer selected in S987. If the mail is not print mail but is ordinary mail, on the other hand, a cover page is printed by the initially-set printer which is reset in S989. For example, the print mail is printed by the printer 14 which is selected in S987, while the ordinary mail is printed by the printer 18 when the printer 18 has been initially set to print mail. However, the ordinary mail may be printed by the printer 14 when the printer 14 has been initially set to print mail.

Figure 16:
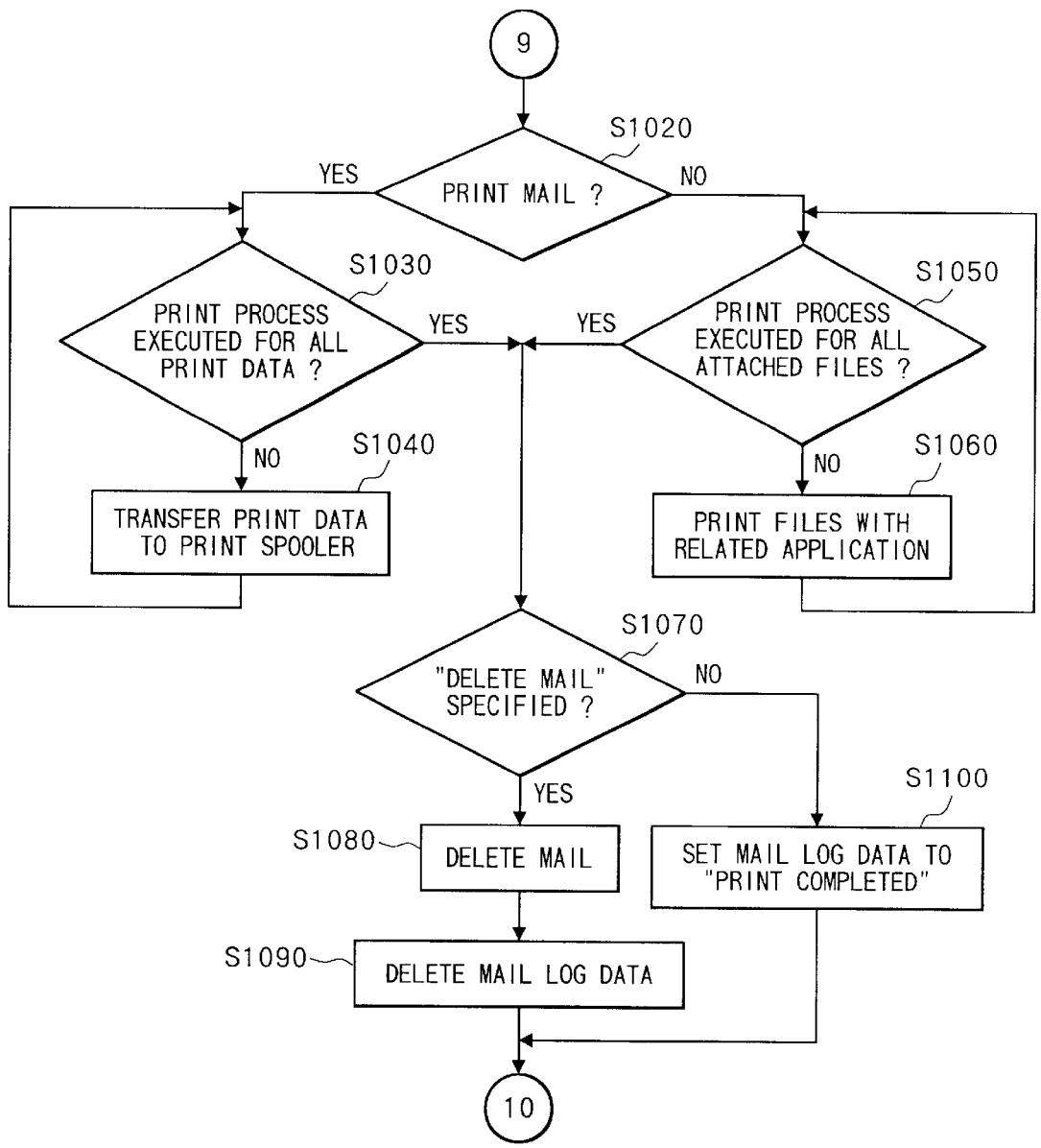
FIG. 16 is a flowchart showing part of the print mail reception utility process executed by the mail transmission/reception system.

When the cover page print process of S1000 is completed, the program proceeds to S1020 shown in FIG. 16. It is noted that if the cover page print setting has not been selected ("no" in S999), the program directly proceeds to S1020.

In S1020, the program determines, based on the mail header (mail log data) of the subject mail, whether the subject mail is print mail which has been created using the print mail transmission utility process 31a. If the mail is print mail ("yes" in S1020), the program proceeds to S1030, wherein the program determines whether a print process of S1040 has been completed for all the print data included in the file attached to the subject mail. If the print process has not yet been completed for all the print data in the attached file ("no" in S1030), one piece of print data from a plurality of pieces of print data constituting the attached file, is transferred in S1040 to a print spooler. The print spooler is a software program executed on the computer 10 to temporarily store print data in the memory or the hard disk provided to the computer 10 and to transfer the print data to a printer according to the printing state of the printer. For example, when an operating system named "Windows", a product of Microsoft Corporation, is being used as an operating system on the personal computer 10, the print data is transferred to a print spooler named "windows print spooler", also a product of Microsoft Corporation. During this process, the operating system executes a process to control the printer 14, selected in S987, via the LAN 20 to print the print mail. The print process of S1040 is executed repeatedly as long as print data not yet printed exists remaining ("no" in S1030).

It is noted that when the reduction process of S995 has been executed prior to S1020, print data that has been compacted from four pages to one page is printed by the printer 14 during the print process of S1040. That is, four pages' worth of print data in the print mail is printed in one sheet of paper. If the reduction process of S995 has not been executed prior to S1020, on the other hand, the print data is printed by the printer 14 in the same condition as it has been sent from the originating computer 4 to the receiving computer 10 without being compacted. Thus, one page's worth of print data in the print mail originally created by and sent from the print mail transmission utility 31a is printed on one sheet of paper.

On the other hand, if the mail subject to printing is not print mail but ordinary mail ("no" in S1020), on the other hand, the program proceeds to S1050. In S1050, the program determines whether another print process of S1060 has been executed for contents or data included in all the files attached to the subject mail. When the print process of S1060 has not yet been executed for the contents in all the attached files ("no" in S1050), then the print process of S1060 is performed. That is, an application program, corresponding to the file format of each attached file, is selected. For example, an application program, corresponding to the extension of the attached file's file name, is selected. The selected application program is started to execute on the computer 10. The application program is then instructed to perform a print process to print the contents in the corresponding attached file. For example, the application program controls the printer 18 to print the contents of the attached files. It is noted that the application program selects a printer appropriate to print the corresponding file. Accordingly, the process of S989 is not necessarily performed. During the printing process of S1060, a message included in the ordinary mail is also printed together with the attached files.

When the print process has been completed for all the attached file(s) ("yes" in S1030 or "yes" in S1050), the program determines in S1070 whether the setting conditions, set by the user of the computer 10 during the process of S380 in FIG. 8, include an instruction setting to delete each mail after the mail is processed to be printed. If the setting conditions include the setting to delete the processed mail ("yes" in S1070), then the program deletes in S1080, from the mailbox 40, the mail data that has been just printed in S1040 or S1060. Then, the program further deletes in S1090, from the mail log data storage area, the corresponding mail log data. If the setting conditions include no settings to delete processed mail data ("no" in S1070), then the mail log data of the corresponding mail data is merely converted in S1100 to indicate "print completed".

Figure 17:
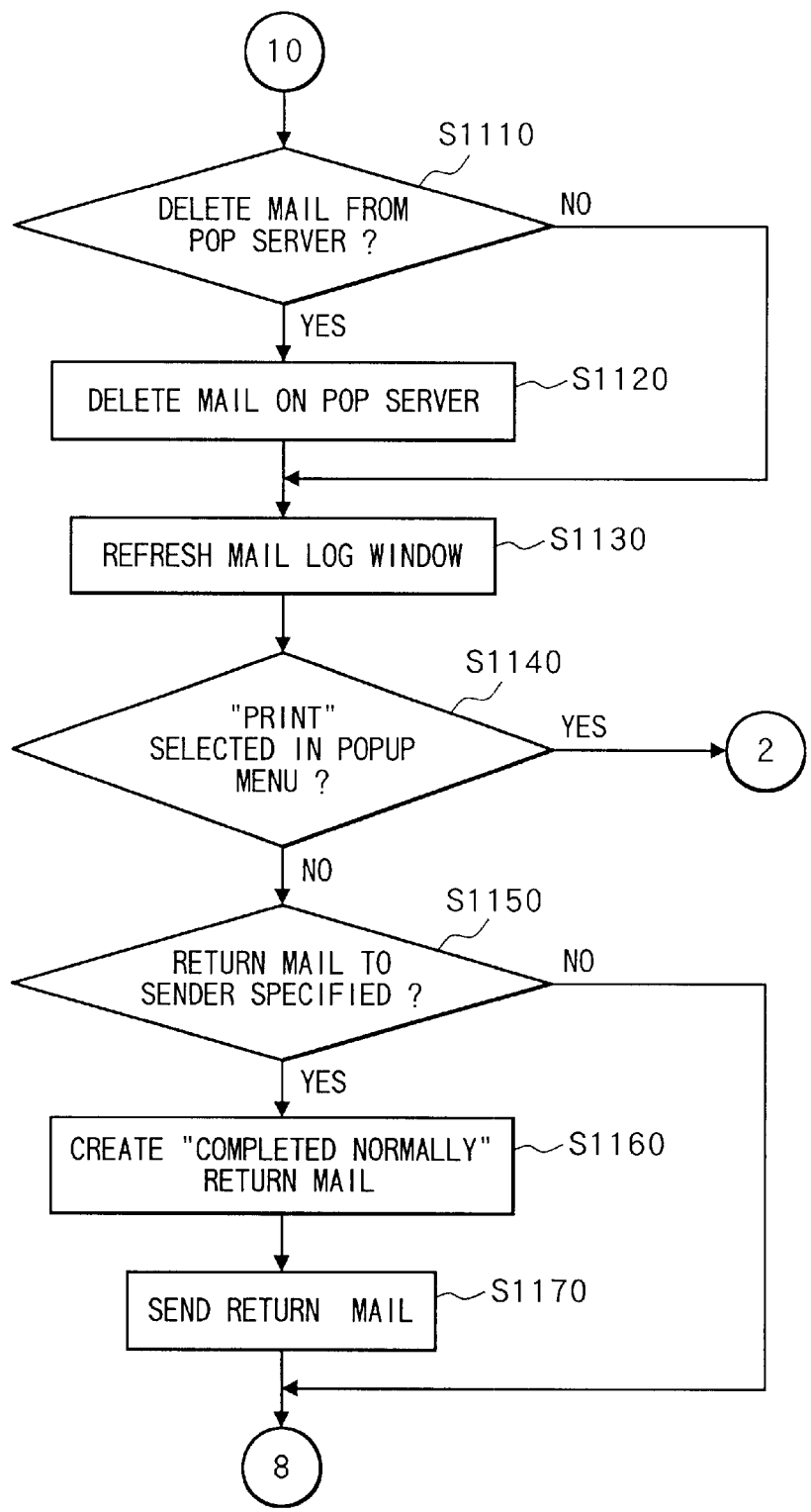
FIG. 17 is a flowchart showing part of the print mail reception utility process executed by the mail transmission/reception system.

After the process S1090 or S1100 is performed, the program proceeds to S1110 shown in FIG. 17. The program determines in S1110 whether the setting conditions, set by the user during the process of S380 in FIG. 8, include an instruction to instruct the POP server 38 to delete printcompleted mail from the mail spool 34. If the setting conditions include the instruction setting to delete the print-completed mail from the mail spool 34 ("yes" in S1110), then in S1120 the program instructs the POP server 38 to delete the mail data, which has just been printed in S1040 or S1060, from the mail spool 34. Then, the program proceeds to S1130.

If the setting conditions include no instruction to delete print-completed mail from the mail spool 34 ("no" in S1110), the program directly proceeds to S1130. In S1130, display of the mail log window 52 is renewed to reflect the change in the mail log data performed in S1090 or S1100.

Next, the program determines in S1140 whether the print process from S980–S1130 has been started because the user has selected "Print" on the popup menu 52b of FIG. 20 in S490. If the print process from S980–S1130 has been started in response to the user's selection of "Print" on the pop menu 52b ("yes" in S1140), then the process returns to S360 in FIG. 8. On the other hand, if the print process has not been started in response to the user's selection of "print" on the pop menu 52b ("no" in S1140), the program determines in S1150 whether the mail header of the mail, which has been just printed, includes an instruction setting to send a return mail to a sender that has sent the corresponding mail. If the mail header includes the instruction setting to send a return mail to a sender ("yes" in S1150), then the program creates in S1160 a set of return mail data indicating that the printing process has been performed properly, and sends in S1170 the return mail to the sender of the printed mail. When creating the return mail in S1160, the program may include, in the return mail, a message indicating that the mail has been printed at a reduced size when the reduction process of S995 has been executed prior to the printing process. Then, the program returns to S910 shown in FIG. 13.

On the other hand, if the mail header includes no instruction setting to send a return mail to sender ("no" in S1150), the process directly returns also to S910. In S910, the program again determines whether any mail is registered remaining unprocessed in the mail log data storage area.

If some mail is registered remaining unprocessed in the mail log data storage area ("no" in S910), then the print processes of S920–S1170 are executed again for the unprocessed mail.

If the print processes of S920–S1170 have been completed for all the sets of mail data registered in the mail log data storage area ("yes" in S910), then the process returns to S330 shown in FIG. 8.

As described above, in the computer system 22, when the received mail is determined to be print mail in S981 based on its mail header, the program determines in S982 what page description language is used to describe the print data in the print mail. In S983, the program selects a printer which is appropriately set to interpret and print that page description language. Then, in S1040, print data in the print mail is printed using the printer thus selected in S983. If there exists no printer appropriately set to interpret and print that page description language, on the other hand, the program selects in S983 a printer provided with a function to interpret that page description language. The program then sets the operation mode of the printer into a mode to interpret the page description language. Then, in S1040, print data in the print mail is printed using the thus selected and set printer.

Thus, the print mail is printed by a printer which can appropriately interpret the processing format of the print data included in the received print mail. Hence, the print data will not be printed erroneously. The user on the receiving end can obtain printed matter in the form desired by the user on the transmitting end.

In the above-described embodiment, if there exists no printer capable of interpreting the page description language of the print data ("no" in S985), then a message is displayed in S988 in the mail log window 52 indicating that the print mail is unprintable. However, if the print data can be converted to another page description language that can be interpreted by at least one printer provided on the receiving end, the process of S988 may be modified to convert the print data into the page description language interpretable by the at least one printer. Then, the thus converted print data is printed by that printer. If the print data cannot be converted into any other page description languages interpretable by at least one receiving end printer, the mail log window 52 will display a message indicating that the print mail is unprintable.

In the above-described embodiment, the file attributes (print information) included in the mail header include codes indicative of the page description language, with which the print data is described. However, data indicative of other various processing formats for processing and printing the print data may be included in the mail header. For example, the mail header may include data indicating whether the print data included in the attached file is representative of a single color image or a full color image. The process in S982 may be modified to determine whether the mail header includes processing format data indicating that the print data in the attached file is representative of a full color image. If the mail header includes processing format data indicating that the print data is representative of a full color image, the program selects in S983 a printer, that is set to a full color printing mode, from the printers 14, 16, and 18. Then, full color printing operation is executed at the selected printer. It is noted that if any of the printers 14, 16, and 18 are not set to the full color printing mode, but if one of the printers has function capable of printing data in full color, that printer is selected in S983 and the operation mode of the selected printer is switched into a full color printing mode. Then, full color printing operation is executed by that printer.

The process of S982 may be modified both to determine what page description language is used to describe the print data and to determine whether the print data is indicative of a full color image or a monochromatic image. The process of S983 may be modified to select a printer which is set to interpret the page description language of the print data and set to print the color-printing type of the print data. The process of S983 may be modified to set a printer, which is capable of interpreting the page description language of the print data and which is capable printing the color-printing type of the print data, to a function mode to interpret the page description language of the print data and to print the print data at the corresponding color-printing type.

In the computer system 22 at the receiving end, when it is determined in S994 based on the mail header of the received print mail that the total number of sheets to be printed becomes equal to or greater than the prescribed number of sheets, then the print data is compacted in S995 so that only one-fourth of the printing paper will be used. Accordingly, time required for printing the entire print mail is also reduced to one-fourth the time required for printing the print mail at the original state. Even if print mail to be printed into a large number of sheets is received at a receiver's unexpected time, time required for printing is automatically reduced. As a result, the printer on the receiving end will not be occupied for long periods of time printing unimportant mail that can possibly delay the printing of more important documents.

Figure 21:
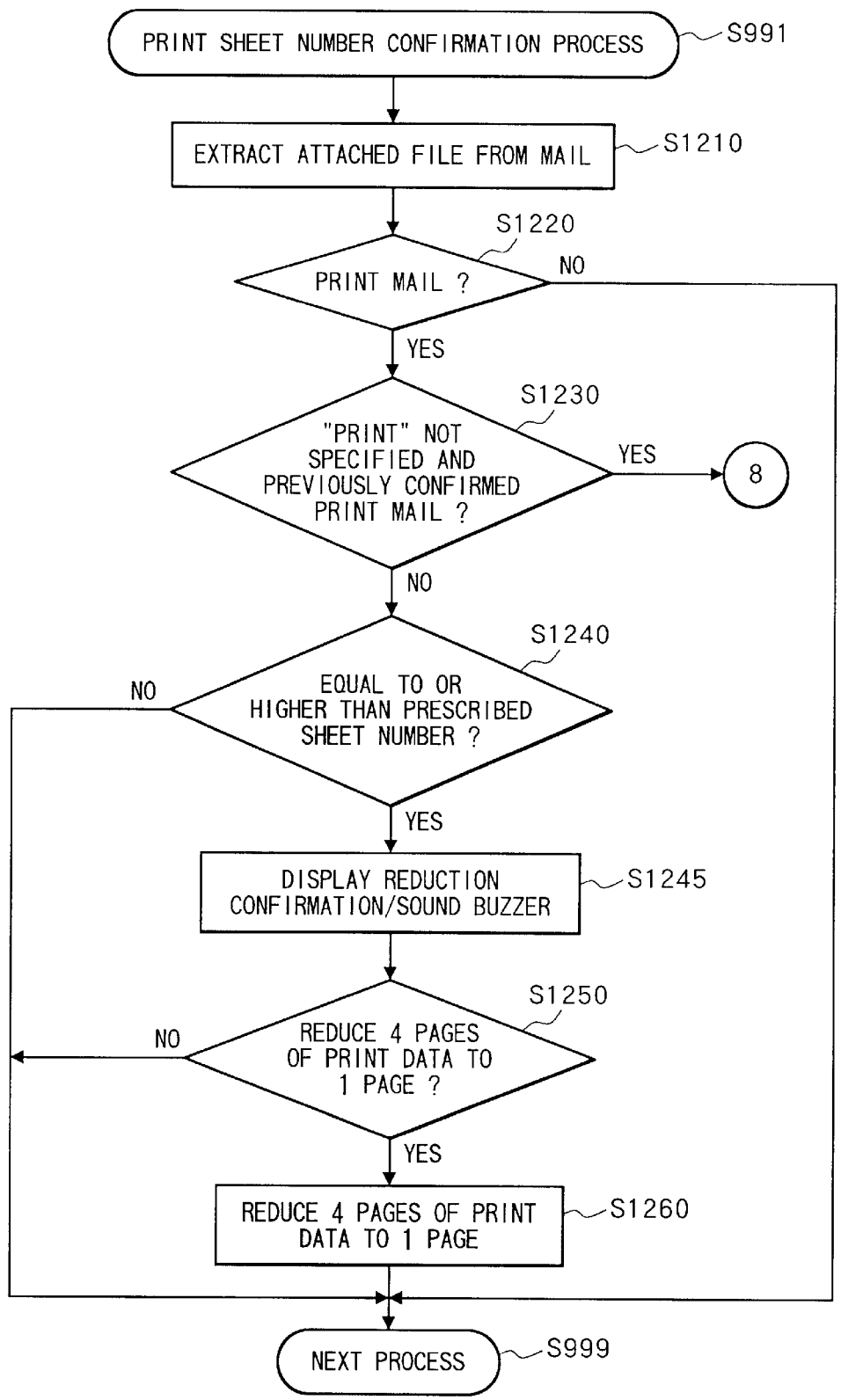
FIG. 21 is a flowchart showing another example of a print sheet number confirmation process in the print mail reception utility process.

The print sheet number confirmation process of FIG. 15 can be modified as shown in FIG. 21.

In the print sheet number confirmation process of FIG. 21, first, in S1210, all the file(s), attached to and included in the subject mail to be printed, is extracted. Next, the program determines in S1220 based on the mail header whether the subject mail is print mail, which has been created by the print mail transmission utility process 31a at the sending end. If the mail is not print mail but ordinary mail ("no" in S1220), the program directly proceeds to S999. On the other hand, if the mail is print mail ("yes" in S1220), then the program determines in S1230 whether the subject print mail is presently to be printed not in response to the user's selection of the "Print" on the popup menu 52b in S490. The program further determines whether the number of sheets, required to be printed with the subject mail, has been previously confirmed through the print sheet number confirmation process of FIG. 21. If the subject mail is presently to be printed not in response to the user's selection of the "Print" and if the number of sheets, required to be printed with the subject mail, has been previously confirmed through the confirmation process of FIG. 21 ("yes" in S1230), then the process returns to S910.

On the other hand, if the subject mail is presently to be printed in response to the user's selection of the "Print" or if the sheet number required to be printed with the subject mail has not yet been confirmed through the confirmation process of FIG. 21 ("No" in S1230), then, the program checks in S1240 the file attributes in the mail header and determines whether the total number of sheets, required to be printed with the subject mail, is equal to or higher than the prescribed print sheet number in the same manner as in the process of S994.

If the total number of print sheets is less than the prescribed number of print sheets ("no" in S1240), then the process proceeds to S999 shown in FIG. 13. On the other hand, if the total number of sheets to be printed is equal to or greater than the prescribed number of print sheets ("yes" in S1240), then the program proceeds to S1245. In S1245, the program displays, on the display 135 provided to the personal computer 10, a reduction process confirmation message for asking the user whether he/she wishes to compact each four-pages' worth of print data in the subject print mail into one page. The program actuates a buzzer, provided to the personal computer 10, to be sounded to urge the user to input his/her confirmation. The user makes a choice by clicking on a selection with the mouse-type input device 137 whether or not to compact each four-pages' worth of data into one page. The program then determines in S1250 whether the user has indicated a desire to compact four-pages' worth of data into one page.

When the user has indicated his/her wishes to compact the print mail ("yes" in S1250), then the page description language, describing the print data included in the subject mail, is converted in S1260 in the same manner as in S995 so that each four pages' worth of print data will be compacted into one page's worth of print data. Accordingly, the compacted print data will be printed in the process of S1040 within one-fourth the time required to print the original print data.

On the other hand, if the user has indicated his/her desire not to compact the print mail ("no" in S1250), then the process directly proceeds to S999 shown in FIG. 13, and the print data included in the print mail is printed as originally received, that is, in noncompacted form.

Thus, in the modification of FIG. 21, when the number of sheets to be printed is equal to or larger than the specified number, rather than immediately printing the mail at the reduced (compacted) state, the user is first urged to confirm whether or not to compact the mail into the reduced state. The mail is compacted and then printed only when the user wishes to obtain printed matter of the reduced state.

Hence, even if the number of sheets to be printed is equal to or higher than the prescribed number of print sheets, the print data will not be compacted without the user's authorization. By thus being prompted for confirmation when print mail includes print data to be printed into sheets more than the prescribed number, the user can choose to print the mail at a normal size when, for example, the mail is important and must be printed in the same form as the mail has been transmitted. Accordingly, when mail must be printed at a normal size, it is possible to prevent the mail from being printed at the reduced size.

Various modifications can be applied to the print sheet number confirmation process of FIG. 21.

Figure 22:
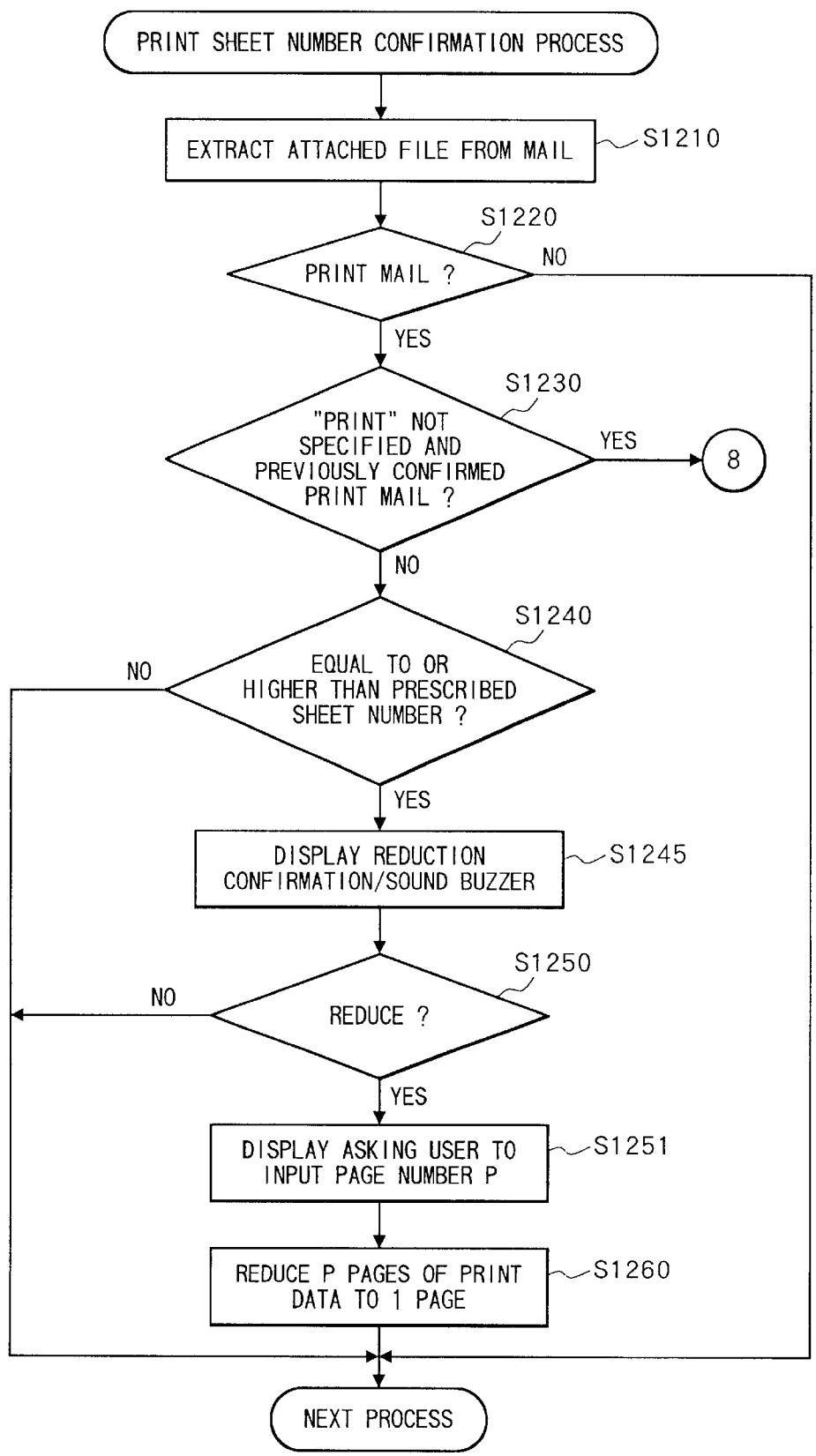
FIG. 22 is a flowchart showing still another example of a print sheet number confirmation process in the print mail reception utility process.

For example, as shown in FIG. 22, the reduction process confirmation message displayed in S1245 may be designed to ask the user whether or not he/she wishes to compact a certain number of pages' worth of print data into one page. The user can manipulate the mouse-type input device 137 to indicate his/her wishes to or not to compact the print data. The program checks in S1250 whether the user has indicated a desire to compact certain-pages' worth of data into one page. If the user indicates with his/her desire to compact the print data ("Yes" in S1250), the program displays in S1251 an additional message urging the user to input the number of pages P desired to be compacted onto one page. The user manipulates the mouse-type input device 137 or a numerical pad on the key board 136 to input the number of pages P desired to be compacted onto one page. For example, when the user wants to compact every five pages' worth of print data into one page, the user inputs the number "five". The program compacts in S1260 the print data through compacting the user's set number P of pages' worth of print data into one page. The compacted print data will be printed in S1040. On the other hand, if the program determines in S1250 that the user has indicated his/her desire not to compact the print data, or if the program determines in S1240 that the number of sheets to be printed is smaller than the prescribed number of print sheets ("No" in S1240), then the print data is printed without executing the reduction process of S1260. Accordingly, the print data is printed without increasing the number of pages to be printed onto one sheet.

Figure 23:
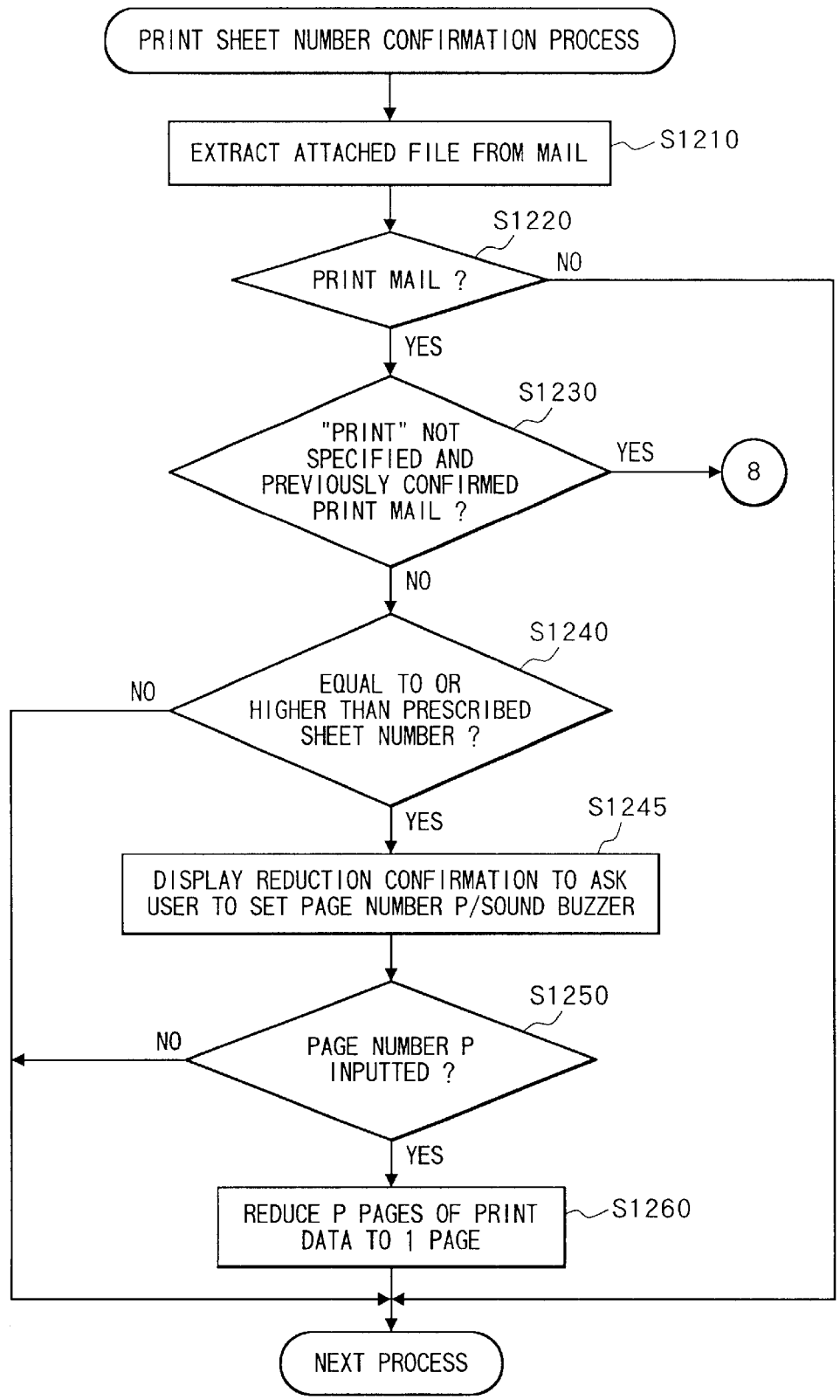
FIG. 23 is a flowchart showing another example of a print sheet number confirmation process in the print mail reception utility process.

The print sheet number confirmation process of FIG. 22 may be further modified as shown in FIG. 23. In this modification, the reduction process confirmation message displayed in S1245 is designed to urge the user to set the number of pages P desired to be printed onto one sheet. Viewing this confirmation message, the user inputs his/her desired number of pages P to be printed onto one sheet of paper. For example, when the user wants to compact every six pages' worth of print data into one page, the user inputs the number P of "six". When the program Judges in S1250 that the page number P is set ("Yes" in S1250), then the print data is compacted in S1260 so that the set number P of pages' worth of print data will be compacted into one page. The compacted print data will be printed in S1040. On the other hand, if the program determines in S1250 that the user does not set the number of pages P to be printed onto one page ("No" in S1250), or if the program determines in S1240 that the number of sheets to be printed is smaller than the prescribed number of print sheets ("No" in S1240), then the print data is printed without increasing the number of pages to be printed onto one sheet.

Figure 24:
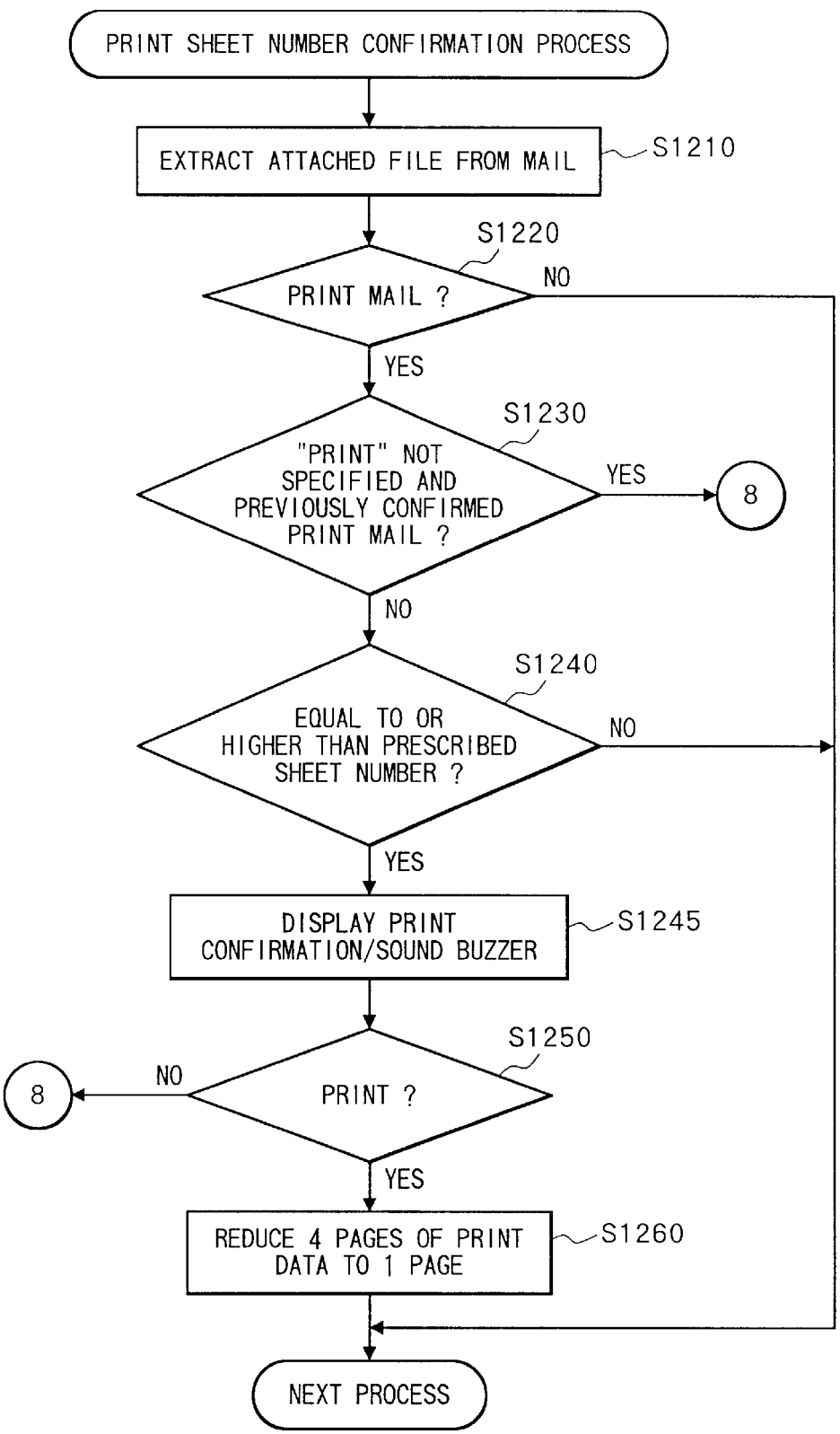
FIG. 24 is a flowchart showing still another example of a print sheet number confirmation process in the print mail reception utility process.

Or, the print sheet number confirmation process of FIG. 21 may be modified as shown in FIG. 24. In this modification, the confirmation message displayed in S1245 is designed to ask the user whether or not the user wishes to print the print data included in the subject print mail. Viewing this print confirmation message, the user manipulates the mouse-type input device 137 to input his/her desire to or not to print the print data. If the program determines in S1250 that the user has indicated a desire to print the print data, then the print data is compacted in S1260 so that every four pages' worth of print data will be compacted into one page. On the other hand, if the program determines in S1250 that the user does not wish to print the print data, the program returns to S910, thereby not printing the print data. If the program determines in S1240 that the number of sheets to be printed is smaller than the prescribed number of print pages ("No" in S1240), then the print data is printed without executing S1260 and, therefore, without increasing the number of pages to be printed onto one sheet.

Figure 25:
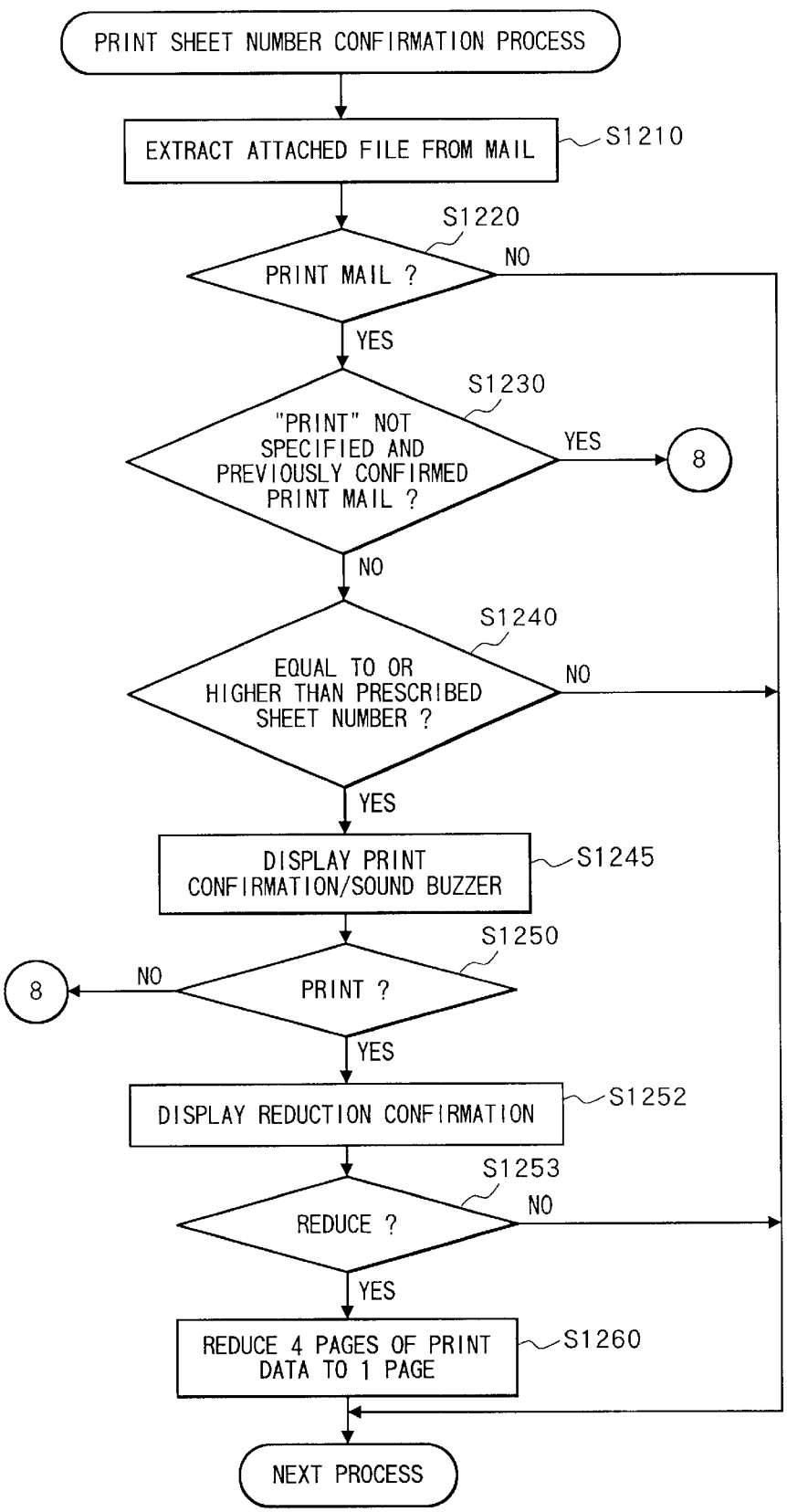
FIG. 25 is a flowchart showing another example of a print sheet number confirmation process in the print mail reception utility process.

The print sheet number confirmation process of FIG. 24 may be further modified as shown in FIG. 25. Also in this modification, the print confirmation message is displayed in S1245 to ask the user whether or not he/she wishes to print the print data included in the subject mail. When the user inputs his/her desire to print the print mail via the mouse 137 ("Yes" in S1250), the program displays in S1252 a reduction process confirmation message asking the user whether or not he/she wishes to compact every four pages' worth of print data into one page. Viewing the reduction process confirmation message, the user further manipulates the mouse-type input device 137 to input his/her desire to or not to compact the print data. If the program determines in S1253 that the user has indicated a desire to perform the compact print process ("Yes" in S1253), then the print data is compacted in S1260. If the user wishes to print the print data, but does not wish to compact the print data ("Yes" in S1250 and "No" in S1253), then the print data is not compacted in S1260. If the program determines in S1250 that the user does not wish to print the print data, the program returns to S910. If the program determines in S1240 that the number of sheets to be printed is smaller than the prescribed number of print sheets ("No" in S1240), then the print data is printed without executing S1260 and, therefore, without performing the compact process.

Figure 26:
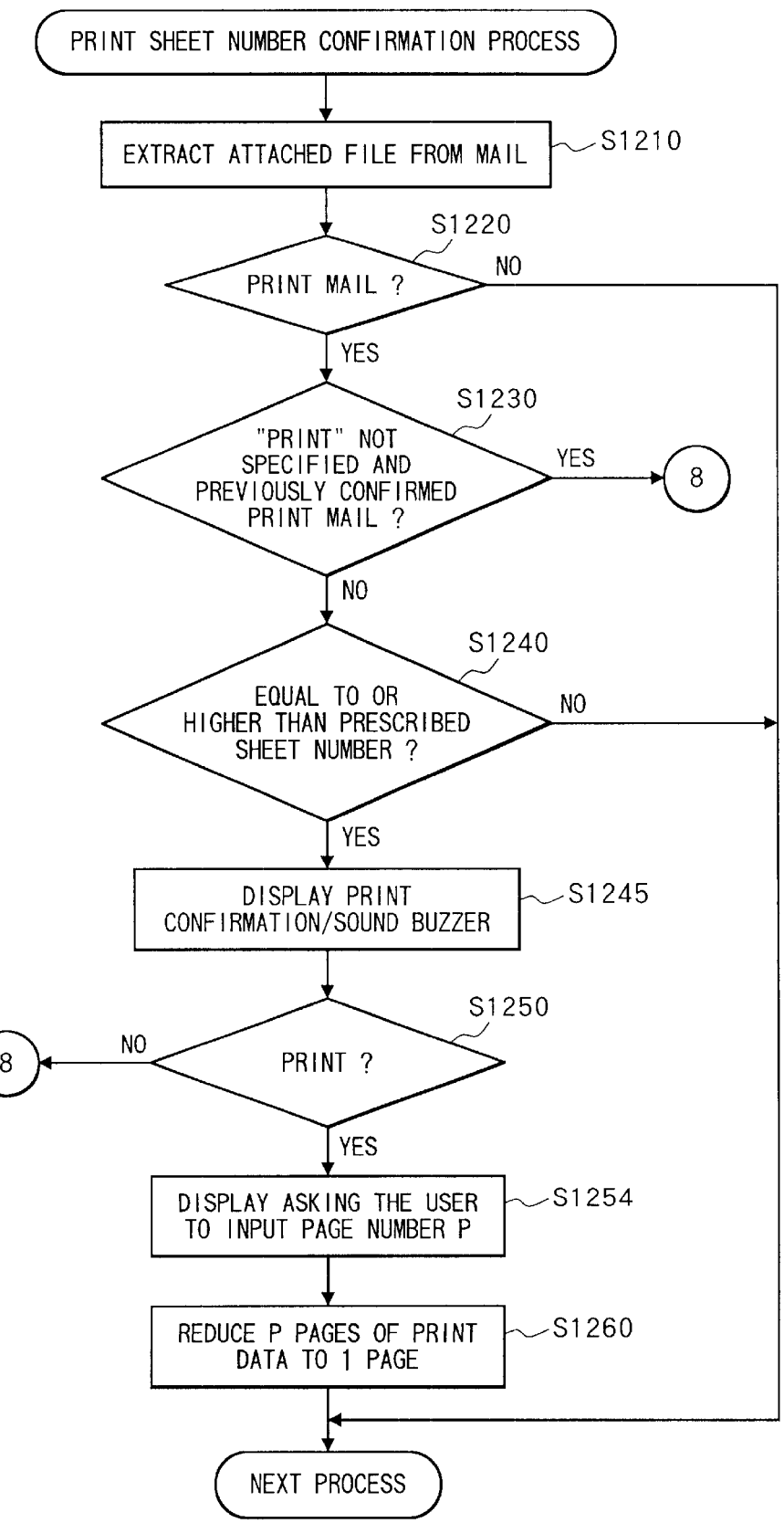
FIG. 26 is a flowchart showing still another example of a print sheet number confirmation process in the print mail reception utility process.

The print sheet number confirmation process of FIG. 25 may be further modified as shown in FIG. 26. Also in this modification, the print confirmation message is displayed in S1245 to ask the user whether or not he/she wishes to print the print data included in the subject mail. When the user inputs his/her desire to print the print mail ("Yes" in S1250), the program displays in S1254 another message requesting the user to set the number of pages P to be printed onto one sheet of paper.

The user manipulates the mouse-type input device 137 or the numerical pad on the key board 136 to input his/her desired number of pages P to be compacted into one page. When the user desires to compact every five pages' worth of print data into one page, for example, the user inputs the number P of "five". Then, the program compacts the print data in S1260 so that the user's set number of pages' worth of print data will be compacted into one sheet. If the program determines in S1250 that the user has indicated a desire not to print the print data ("No" in S1250), the program returns to S910, thereby not printing the print data. If the program determines in S1240 that the number of sheets to be printed is smaller than the prescribed number of print sheets ("No" in S1240), then the print data is printed in S1040 without executing S1260.

Figure 27:
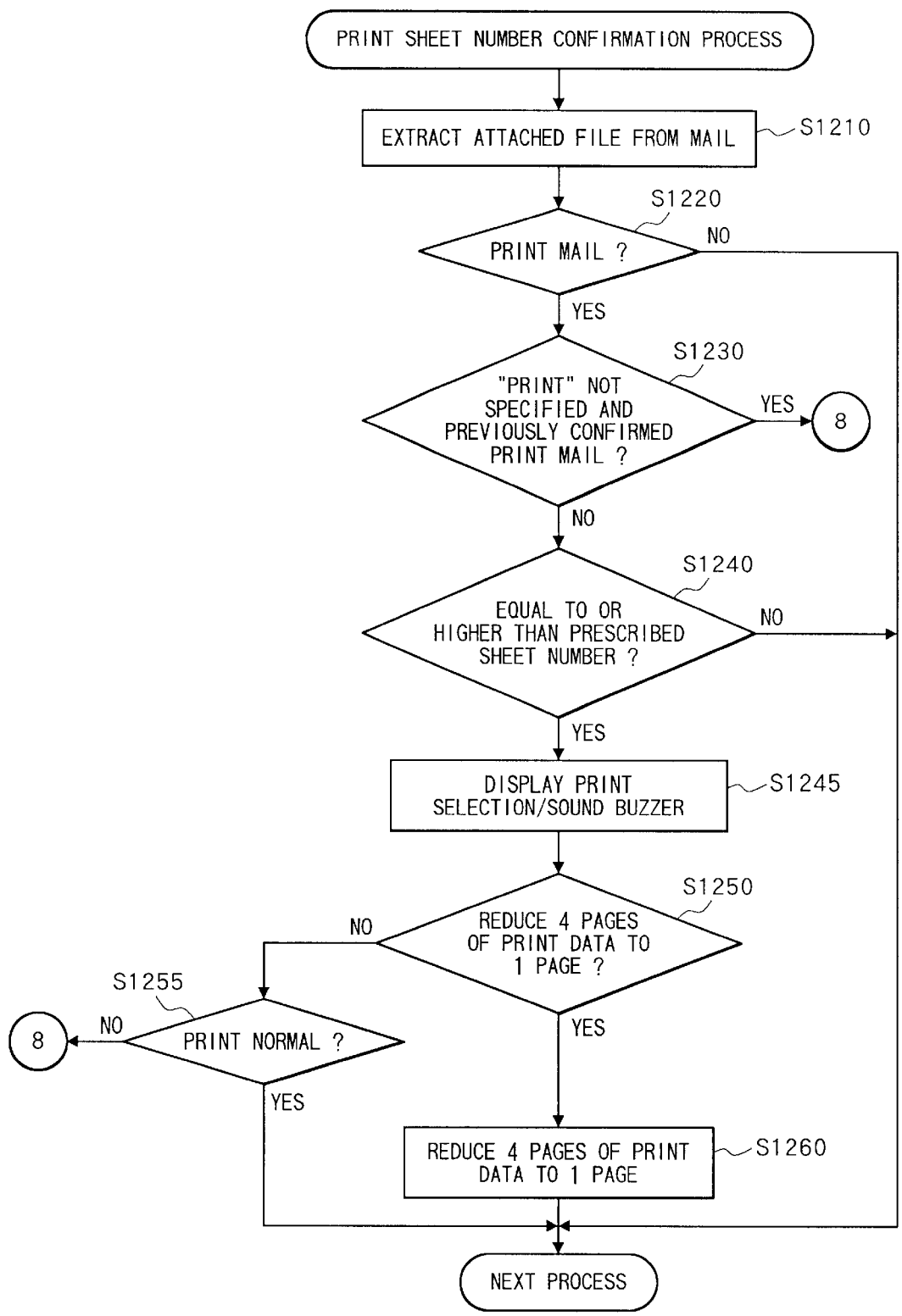
FIG. 27 is a flowchart showing another example of a print sheet number confirmation process in the print mail reception utility process.

Or, the print sheet number confirmation process of FIG. 21 may be modified as shown in FIG. 27. In this modification, the confirmation message displayed in S1245 is designed to ask the user whether he/she wishes to perform the compact printing process to compact each four pages' worth of print data into one page and then to print the compacted print data, to perform a normal printing process to print the print data without compacting the print data, or not to print the print data. The user inputs his/her desire through manipulating the mouse-type input device 137. The program judges in S1250 whether his/her input desire is to perform the compact printing process. If the user wishes to perform the compact printing process ("Yes" in S1250), the print data is compacted in S1260. If the user does not wish to perform the compact printing process, but wishes to perform the normal printing process ("No" in S1250 and "Yes" in S1255), the program proceeds to S999 without compacting the print data. If the user wishes not to print the print data ("No" in S1250 and in S1255), the program returns to S910. Thus, the program judges in S1250 and S1255 the contents of the user's inputted instruction. Based on the judged result, the program performs the compact printing process in S1260, performs the normal printing process without executing S1260, or does not print the print data.

Figure 28:
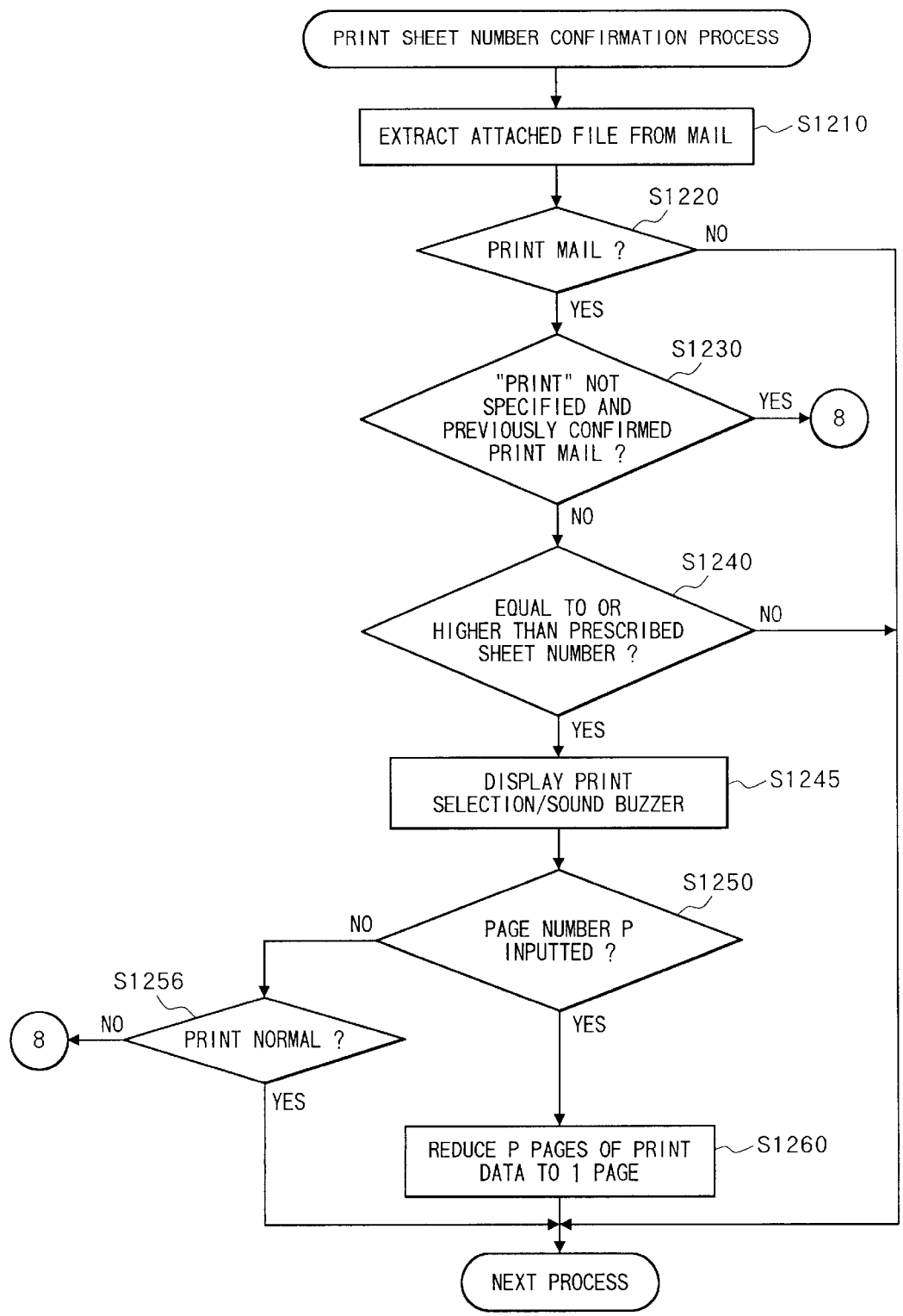
FIG. 28 is a flowchart showing still another example of a print sheet number confirmation process in the print mail reception utility process.

The print sheet number confirmation process of FIG. 27 may be modified as shown in FIG. 28. In this modification, the confirmation message displayed in S1245 is designed to ask the user to set the number of pages P desired to be compacted onto one page if he/she wishes to compact the print data. This confirmation message further asks the user, if he/she wishes not to compact the print data, whether he/she wishes to execute the normal printing process without compacting the print data or wishes not to print the print data. The user inputs the number of pages P to be compacted into one page when he/she wishes to compact the print data. The user inputs his/her desire to or not to perform the normal printing operation when he/she wishes not to compact the print data.

The program determines in S1250 whether the user has inputted his/her desired page number P. If the user inputs his/her desired page number P ("Yes" in S1250), the user's inputted number P of pages' worth of print data is compacted into one page in S1260. If the user has not inputted his/her desired page number P ("No" in S1250), on the other hand, the program determines whether the user has inputted his/her desire to perform normal printing. If the user has inputted his/her desire to perform normal printing ("Yes" in S1256), the program proceeds to S999 without performing the compacting process. If the user has inputted his/her desire not to perform normal printing ("No" in S1256), the program returns to S910. Thus, the program performs the user's desired process.

Figure 29:
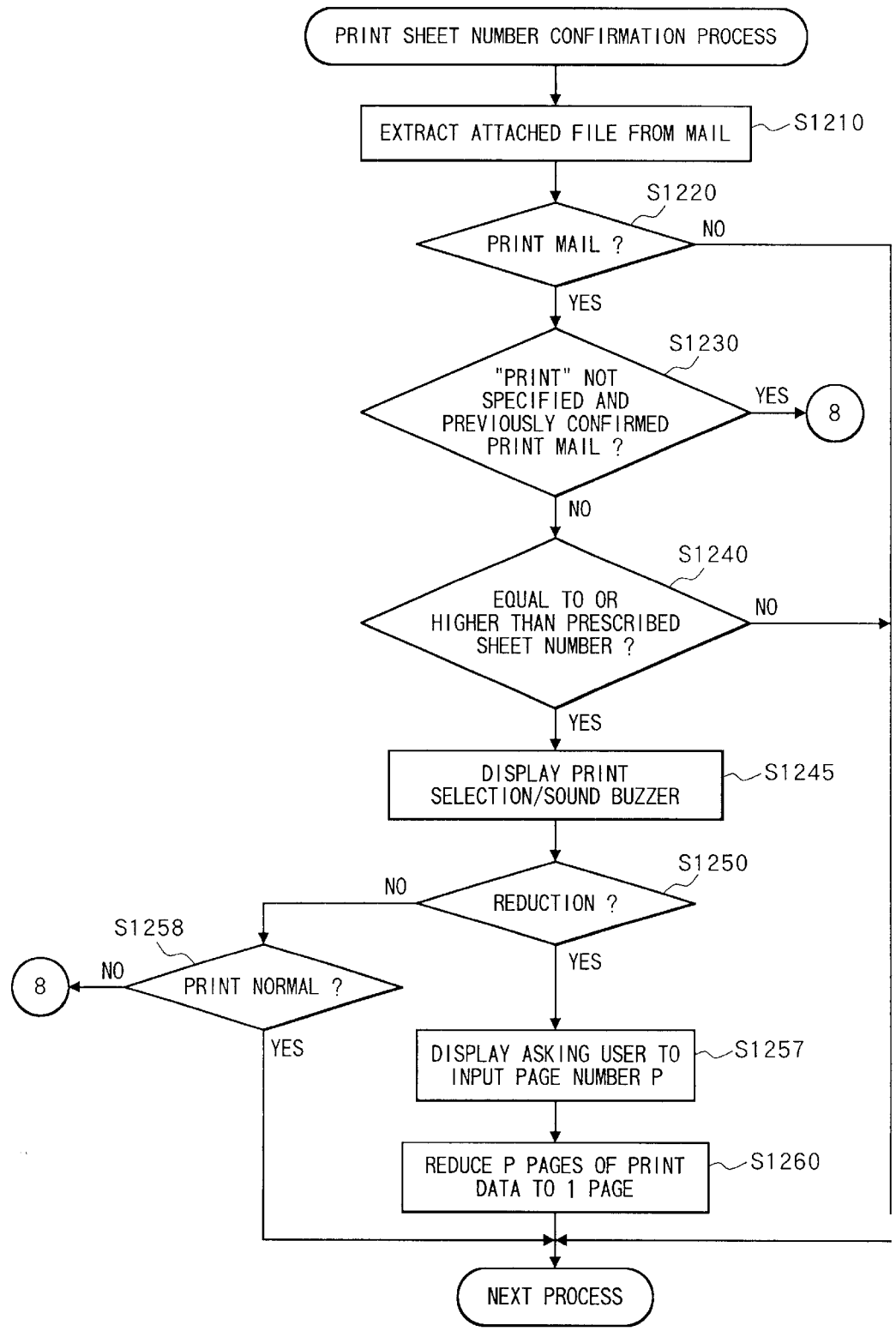
FIG. 29 is a flowchart showing still another example of a print sheet number confirmation process in the print mail reception utility process.

Or, the print sheet number confirmation process of FIG. 27 may be modified as shown in FIG. 29. Also in this modification, the confirmation message displayed in S1245 asks the user whether to perform the compact printing process, to perform the normal printing process, or not to perform any printing process. If the operator has indicated a desire to perform the compact printing process through manipulating the mouse-type input device 137 ("Yes" in S1250), the program displays another message urging the user to set the number of pages P of the print data desired to be printed onto one page of paper. The compact process is attained in S1260 to compact every P pages' worth of print data into one page according to the user's set number P. If the program determines in S1250 that the operator has indicated a desire not to perform the compact printing process ("No" in S1250), the program determines whether the user has indicated a desire to perform the normal printing or not to print the print data. If the user has indicated a desire to perform the normal printing ("Yes" in S1258), the program proceeds to S999. If the user has indicated a desire not to print the print data ("No" in S1258), the program returns to S910. Thus, the program performs the user's desired process.

According to the above-described modifications of FIGS. 21–29, the user at the receiving end can control the computer 10 not to print the print mail immediately after the print mail is received. Afterwardly, the user can further control the computer 10 to print that print mail through selecting wPrint* on the popup menu 52b in S490 of FIG. 9. In this case, the program directly proceeds to S980. Then, the program further proceeds through S981–S991 to S999. The program will proceed to S1030 directly or after performing the process of S1000. The print mail will be printed in S1030 and S1040.

Thus, the user can control the computer 10 to print the print mail that has not been printed when the print mail was first received. Hence, the contents of the print mail can be ensurely supplied to the user at the receiving end without any problems.

It is also possible to print the contents of the print mail not through the above-described processes of the print mail reception utility 31b. The contents of the print mail may be printed through executing an application program of a type capable of printing the print data included in the print mail.

In the above-described embodiment, the print data compacting process of S995 or S1260 is executed on the receiving end, that is, by the print mail reception utility process 31b. However, the print data compacting process may be performed on the transmitting end, that is, using the print mail transmission utility process 31a.

For example, as shown in FIG. 31, the processes of S994 and S995 in FIG. 15 could be inserted between processes S250 and S260 of the print mail transmission utility process. In this modification, in S994, the number of sheets required to print the print data is determined based on the file attribute data (page number data and the copy number data). When the determined sheet number is equal to or greater than the predetermined number ("Yes" in S994), the print data is compacted so that every four pages' worth of the print data will be printed onto one sheet of paper. Then, in S260, the mail body 50c (attached file) is produced based on the compacted print data. When the sheet number is smaller than the predetermined number ("No" in S994), on the other hand, the print data is not compacted. The mail body 50c is produced in S260 based on the non-compacted print data.

Or, the processes S1240–S1260 in FIG. 21 could be inserted between the processes S250 and S260. In this case, the confirmation message displayed in S1245 asks the user at the transmitting end whether or not he/she wishes his/her created print data to be printed at the receiving end in the compacted-state. Only when the user confirms compacting the print data ("Yes" in S1250), the print data is compacted in S1260. The mail body 50c is produced based on the compacted print data.

Or, the processes S994 and S995 could be performed within the printer driver process shown in FIG. 4, rather than in the print mall transmission utility process. That is, the processes S994 and S995 could be inserted between the processes S130 and S150 of the printer driver process. Or, the processes S1240–1260 could be performed within the printer driver process shown in FIG. 4, rather than in the print mail transmission utility process. The processes S1240–S1260 could be inserted between the processes S130 and S150 of the printer driver process.

By regulating the printing size on the transmitting end in this way, it is possible to prevent the receiving end to receive a large number of pages' worth of print data. As a result, the printer on the receiving computer system is not occupied for unnecessarily long amounts of time that can a possibly delay the printing of more important documents. Accordingly, mail is printed quickly, allowing the user on the receiving end to view the document right away.

In the embodiment described above, the mail header includes: information on the number of pages into which the print data has been prepared at the print mail transmission utility 31b; and information on the number of copies into which the print data is desired to be copied. Each of the print sheet number determination processes of S994 and S1240 are designed to calculate the total number of sheets required to print the print data based on the information included in the mail header.

However, the mail header may be created not to include the information on the page number or the copy number. Each of the processes of S994 and S1240 may be designed to calculate the total number of print sheets required to print the print data as described below. That is, the program may first interpret the contents of the page description language based on the print data included in the attached file read in S992 and S1210. The program then calculates the total number of pages required to print the print data. The program then compares in S994 or S1240 the calculated total page number with the predetermined sheet number.

In the embodiment described above, the compacting process compacts four pages' worth of original print data into one page. However, the compacting process need not be limited to compact four pages' worth of original data into one page. For example, the process could compact two pages' worth of original data into one page or eight pages' worth of original data into one page.

Further, the process could allow the user to select a specific ratio. For example, the user can select one of two different ratios: a first ratio, at which two pages' worth of original data is compacted into one page; and a second ratio, at which four pages' worth of original data is compacted into one page. Or, the user may be allowed to enter any desired compacting ratio in the same manner as in the modifications of FIGS. 22, 23, 26, 28, and 29.

In another possible variation, the type of the print data to be printed may be determined. For example, when the print data is image data, a large degree of compression (for example, four pages into one) is executed. When the print data is character data, a small degree of compression (for example, two pages into one) is executed.

In the embodiment and variations described above, the degree of reduction, employed in the compacting process, is displayed to the user in the confirmation screen. However, it is also possible to display printing speeds or rates, such as 2× speed, 4× speed, 8× speed, and the like. If the user selects 2× speed, the compacting process will be performed to compact every two pages' worth of data into one page. If the user selects 4× speed, on the other hand, the compacting process will be performed to compact every four pages' worth of data into one page. If the user selects 8× speed, on the other hand, the compacting process will be performed to compact every eight pages' worth of data into one page.

In the above-described embodiment, the print mail reception utility 31b is designed to consider that the cancel operation has failed not only when the print mail has been printed completely but also when printing of the print mail has been started but has not yet completed, that is, when the print mail is being printed by the print spooler. That is, when receiving the cancel mail in the middle of the printing of the corresponding print mail, the print spooler will continue printing the print mail to complete the printing. The print mail reception utility 31b sends, in S670 and S680, return mail indicating that the print mail targeted for cancellation has been printed.

However, the print mail reception utility 31b may be modified to stop printing the print mail even when the cancel mail is received in the middle of the printing operation. That is, when the print mail has already been transferred to the print spooler ("Yes" in S650), the program issues a print stop command to the print spooler so as to control the print spooler to stop printing the print mail. Thus, printing can be stopped even after the print data has been partially printed. In this case, in S670, the reply mail is preferably designed to indicate that a part of the mail has been printed.

Figure 30:
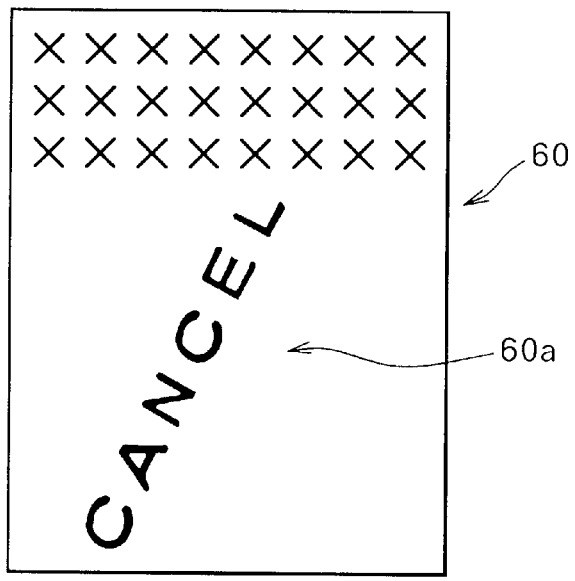
FIG. 30(a) illustrates one example of a last page obtained when printing is canceled in the middle of the printing.
FIG. 30(b) illustrates another example of a last page obtained when printing is canceled in the middle of the printing.
Figure 30:
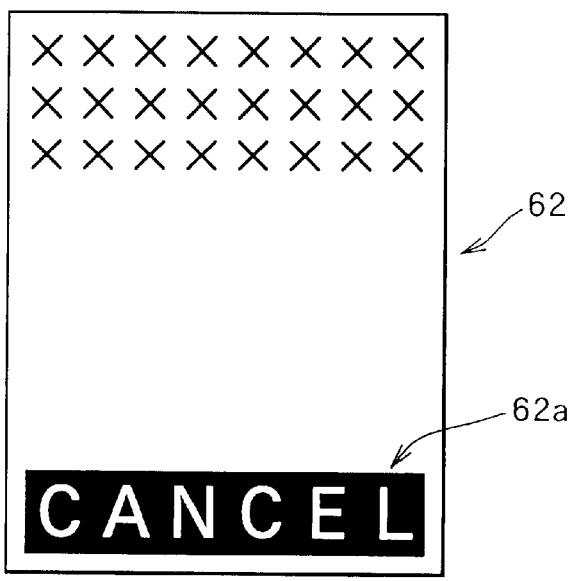

With this method, however, printing is stopped in the middle of the printing operation. Accordingly, the user on the receiving end may be confused as to why the printing is stopped in the middle of the printing. In view of this, when the printing operation is stopped in the middle of the printing, it is desirable to print a special message 60a as shown in FIG. 30(a) on a page 60 that is being printed last. For example, the special message 60a, such as "Cancel," is printed with using a different character size and a different color from the rest of the printed document. Another special message 62a may be printed on the last page 62 as shown in FIG. 30(b).

In the above-described embodiment, the printer appropriate to print the print data in print mail is set in the process of S983. If two or more printers are determined as appropriate to print the print data in S984 or S985, one appropriate printer, that is not presently being driven, is preferably selected for printing the print data.

In the above-described embodiment, the printer driver process of FIG. 4 creates print data in the same format as required to print on the transmitter's side. The print data is then included in print mail as an attached file and then is transmitted to the remote user in the process of the print mail transmission utility 31a shown in FIG. 7.

However, the print data, to be transmitted to the remote user, may be prepared to conform to the functions of the remote user's printer. For example, the print data may be created in correspondence with a type of page description language (emulation) interpretable by the remote user's printer. The print data may be created into full color data when the remote user's printer is of a full color printer. The print data may be created into monochromatic data when the remote user's printer is of a monochrome printer. The print data may be created into data suitable for an ink-jet printer when the remote user's printer is an ink-jet printer. The print data may be created into data suitable for a dot impact type printer when the remote user's printer is a dot impact type printer. The print data may be created into data suitable for a thermal transfer type printer when the remote user's printer is of a thermal transfer type. The print data may be created as suitable for the size of papers employed in the remote user's printer.

The type and/or function of the remote user's printer may be registered in the transmitter's computer in advance. For example, before creating print data, confirmation mail may be transmitted to the remote user in order to confirm the type and function of the remote user's printer. When information on the type and function of the remote user's printer is returned via return mail, data for the type and function is recorded. Or, the user may manually enter, into the computer, data of the type and function of the remote user's printer.

When desiring to transmit print mail to that remote user, when the user designates the address of the remote user, print data is automatically created in a format conforming to the type and function of the remote user's printer, and the print mail is transmitted to the remote user.

When desiring to transmit print mail to a certain remote user, if no type or function data is registered for that remote user, print data may be created using a predetermined standard default format. For example, the print data may be created through converting originallyedited data to PCL. Only character data within the originally-edited data may be converted into print data.

In the above-described embodiment, when a request to execute a print process is issued by an application program running on the computer system S, the user first selects in S130 during the printer driver process whether to print print data by the computer system 8 itself or to have the print data printed on the remote computer system 22 which is connected to the computer system 8 via the communication line.

If the user selects printing the print data on the computer system 8 in S130, then the print data is printed by the printer 6 provided to the computer system 8. Thus, the user at the transmitting side can obtain printed matter of the print data.

If the user selects printing the print data on the computer system 22 in S130, on the other hand, then the processes of S150–S170 and S210–S280 are executed to create print mail through adding, to the print data, mail header data including print information such as the printing conditions, at which the print data should be printed, and then to transmit the print mail via the communication line addressed to the personal computer 10. Similarly to ordinary mail, the print mail can be exchanged between a plurality of senders and receivers, rather than just one-to-one transmissions. The print mail can be exchanged using a packet communication system. Accordingly, the costs required to use the communication line becomes inexpensive.

The judging process of S1020 detects whether or not the received mail is print mail. In other words, the judging process of S1020 detects whether or not print information is included in the mail header of the received mail. When the received mail is print mail whose header includes the print information ("yes" in S1020), the printing process of S1040 is performed on the selected printer 14, 16, or 18 to print the print data included in the print mail according to the print information included in the mail header. Hence, the print data can be printed on the receiving end (computer system 22) in the form set on the transmitting end (computer system 8). The transmitting user's desired printed matter can therefore be easily supplied from the computer system 8 to the remote computer system 22.

The computer system 22 at the receiving end is configured to perform, at the specified regular interval, the processes of S510, S520, and S540 to check for the existence of mail that has newly arrived as addressed to the computer system 22 via the communication line. The newly-arrived mail is then processed in the processes of S991, S1030, S1040, and the like. As a result, the mail can be quickly obtained for printing on the computer system 22.

It is noted that the computer system 8 at the transmitting end is provided not only with the printer driver 30 for performing the processes including the processes of S130–S170 and the print mail transmission utility 31a for performing the processes S210–S280 but also with the print mail reception utility 31b for performing the processes including the processes of S991, S1030, and S1040. Accordingly, the computer system 8 can perform not only the above-described transmission of print mail but also reception of print mail.

Similarly, the computer system 22 at the receiving end is provided not only with the print mail reception utility 31b for achieving processes including the processes of S991, S1030, and S1040 but also with the printer driver 30 for achieving the processes including the processes of S130–S170 and the print mail transmission utility 31a for achieving the processes of S210–S280. Accordingly, the computer system 22 can perform not only the above-described reception of print mail but also transmission of print mail. Hence, transmission of print mail and reception-and-printing of the print mail can be performed bi-directionally between the two computer systems 8 and 22.

At the transmitting end, data indicative of date and time, at which print mail is desired to be printed, can be included in the mail header through the processes of S230–S250. The mail header is added to the print data (mail body) in S260, and is transmitted to the receiving end. At the receiving end, the print mail reception utility 31b detects in S960 whether the print date and time data is included in the header. When the print date and time data is included in the header, the print data included with the mail can be outputted by the printer at the indicated date and time through the process of S970.

In the above-described embodiment, the process of the print mail transmission utility 31a is actuated by the printer driver 30 when the user selects transmitting print mail. However, the processes of the print mail transmission utility 31a may be included in the printer driver 30 in its internal process.

Functions for achieving the various processes of the printer driver 30, the print mail transmission utility 31a, and the print mail reception utility 31b may be stored as computer programs that are executed on each of the personal computers 4, 10, and 12. These programs are stored on a data storage medium capable of being read by the corresponding computer.

In the above-described embodiment, the programs are stored in a ROM capable of being read by the corresponding computer. The ROM is installed in each computer 4, 10, or 12. However, the programs may be stored in a backup RAM capable of being read by the corresponding computer. The backup RAM is installed in each computer 4, 10, or 12. Or, these programs may be stored in a floppy disk, a magneto-optic disk, a CD-ROM, a hard disk, or the like. The programs are loaded into each personal computer 4, 10, or 12 and are executed as needed.

In the above-described embodiment, the Internet 28 is used as the communication line for transmitting the print mail between the computer systems 8 and 22. However, any other network systems capable of transferring electronic mail therethrough can be used for transmitting print mail between the computer systems 8 and 22.

While the invention has been described in detail with reference to the specific embodiment thereof, it would be apparent to those skilled in the art that various changes and modifications may be made therein without departing from the spirit of the invention.

What is claimed is:

1. A mail reception device capable of receiving mail from a remote mail transmission device via a communication line, the mail reception device comprising:

a printer capable of printing on a sheet of paper;

mail receiving means capable of receiving mail, including print data, at an original state, from remote mail transmission devices via a communication line;

sheet number determining means for determining a number of sheets required to print the print data at the original state, and for determining whether the determined number of the required sheets is equal to or greater than a predetermined number; and print data processing means for, when the sheet number determining means determines that the required number of sheets is equal to or greater than the predetermined number, converting the print data from the original state into a reduced state, wherein the number of pages of the print data to be printed in each sheet of paper at the reduced state is greater than the number of pages of the print data to be printed in each sheet of paper at the original state, the print data processing means supplying the processed data to the printer, thereby allowing the printer to print the print data on the reduced number of sheets, the print data processing means supplying the print data to the printer without processing the print data when the sheet number determining means determines that the number of sheets is smaller than the predetermined number.

2. A mail reception device as claimed in claim 1, further comprising:

a display device;

an input device; and reduction confirmation means for, when the sheet number determining means determines that the required number of sheets is greater than the predetermined number, controlling the display device to display a message urging an operator of the mail reception device to input confirmation via the input device as to whether the print data should be printed in the reduced state, wherein the print data processing means converts the print data into the reduced state when the operator inputs confirmation via the input device that the print data should be printed in the reduced state, and supplies the print data in the reduced state to the printer, the print data processing means supplying the print data of the original state to the printer without converting the print data into the reduced state when the operator inputs confirmation via the input device that the print data should not be printed in the reduced state or when the sheet number determining means determines that the required number of sheets is smaller than the predetermined number.

3. A mail reception device as claimed in claim 2, wherein, the reduction confirmation means further controls the display device to, when the operator inputs confirmation via the input device that the print data should be printed in the reduced state, display a message requesting the operator to set via the input device a number of pages of the print data desired to be printed on each sheet, the print data processing means converting the print data so that each sheet will be printed with the number of pages' worth of the print data set by the operator via the input device.

4. A mail reception device as claimed in claim 1, further comprising:

a display device;

an input device; and reduction confirmation means for, when the sheet number determining unit determines that the number of required sheets is equal to or greater than the predetermined number, controlling the display device to display a message requesting an operator of the mail reception device to set via the input device the number of pages of the print data desired to be printed on each sheet, wherein when some number of pages is set by the operator, the print data processing means converts the print data into the reduced state so that the operator's set number of pages' worth of the print data will be printed on each sheet of paper, and supplies the converted print data to the printer, the print data processing means supplying the print data in the original state without converting the print data when no number of pages is set by the operator or when the number of required sheets is smaller than the predetermined number.

5. A mail reception device as claimed in claim 1, further comprising:

a display device;

an input device; and print confirmation means for, when the sheet number determining means determines that the number of required sheets is equal to or greater than the predetermined number, controlling the display device to display a message urging an operator of the mail reception device to input via the input device whether or not the print data should be printed;

wherein the print data processing means converts the print data into the reduced state and supplies the converted print data to the print data when the operator inputs via the input device that the print data should be printed, the print data processing means failing to supply the print data to the printer when the operator inputs via the input device that the print data should not be printed, the print data processing means supplying the print data in the original state to the printer when the determined number of sheets is smaller than the predetermined number.

6. A mail reception device as claimed in claim 5, wherein the print confirmation means further controls the display device to, when the operator inputs confirmation via the input device that the print data should be printed, to display another message urging the operator to input via the input device whether the print data should be printed in the reduced state, and wherein the print data processing means converts the print data into the reduced state and supplies the reduced print data to the printer when the operator inputs confirmation via the input device that the print data should be printed and that the print data should be printed in the reduced state, the print data processing means supplying the print data in the original state to the printer without converting the print data when the operator inputs confirmation via the input device that the print data should be printed but when no confirmation is inputted via the input device to print the print data in the reduced state, the print data processing means failing to supply the print data to the printer when the operator Inputs confirmation via the input device that the print data should not be printed.

7. A mail reception device as claimed in claim 5, wherein the print confirmation means further controls the display device to, when the operator inputs confirmation via the input device that the print data should be printed, to display another message requesting the operator to set via the input device the number of pages of the print data desired to be printed on each sheet, and wherein the print data processing means converts the print data into the reduced state so that the operator's set number of pages' worth of print data will be printed on each sheet of paper and supplies the converted print data to the printer when the operator inputs confirmation via the input device that the print data should be printed, the print data processing means failing to supply the print data to the printer when the operator inputs confirmation via the input device that the print data should not be printed, the print data processing means supplying the print data of the original state without converting the print data when the sheet number is determined smaller than the predetermined number.

8. A mail reception device as claimed in claim 1, further comprising:

a display device;

an input device; and print confirmation means for, when the sheet number determining unit determines that the number of sheets is greater than the predetermined number, controlling the display device to display a message urging an operator of the mail reception device to input via the input device whether the print data should be printed in the reduced state or in the original state or should not be printed, wherein the print data processing means converts the print data into the reduced state and supplies the converted print data to the printer when the operator inputs via the input device that the print data should be printed in the reduced state, the print data processing means supplying the print data of the original state to the printer without converting the print data when the operator inputs via the input device that the print data should be printed in the original state, and the print data processing means failing to supply the print data to the printer when the operator inputs via the input device that the print data should not be printed.

9. A mail reception device as claimed in claim 1, further comprising:

a display device;

an input device; and print confirmation means for, when the sheet number determining unit determines that the number of required sheets is greater than the predetermined number, controlling the display device to display a message urging an operator of the mail reception device to input via the input device whether the number of pages of the print data desired to be printed on each sheet of paper is desired to be set, the print data should be printed in the original state, or the print data should not be printed, and wherein the print data processing means supplies the print data of the original state without converting the print data when the operator inputs via the input device that the print data should be printed in the original state, the print data processing means failing to supply the print data to the printer when the operator inputs via the input device that the print data should not be printed, and the print data processing means converts the print data into the reduced state so that the operator's set number of pages' worth of the print data will be printed onto each sheet of paper and supplies the converted print data to the printer when the number of pages' worth is set by the operator.

10. A mail reception system as claimed in claim 8, wherein the print confirmation means further controls the display device to, when the operator inputs confirmation via the input device that the print data should be printed in the reduced state, to display another message requesting the operator to set via the input device the number of pages of the print data desired to be printed on each sheet, and wherein the print data processing means converts the print data into the reduced state so that the operator's set number of pages' worth of the print data will be printed onto each sheet of paper and supplies the converted print data to the printer when the operator inputs confirmation via the input device that the print data should be printed in the reduced state.

11. A mail reception device as claimed in claim 1, wherein the receiving means receives the print data in an original size, and wherein the print data processing means converts, when the sheet number determining unit determines that the number of sheets is equal to or greater than the predetermined number, the print data into the reduced state through reducing a size of a print pattern represented by the print data from the original size into a reduced size, thereby increasing the number of pages of the print data capable of being printed on each sheet from the number of pages of the print data to be printed in each sheet of paper at the original size.

12. A mail transmission device capable of transmitting mail to a remote mail reception device via a communication line, the mail transmission device comprising:

sheet number determining means for determining whether a number of sheets required to print, at an original state, print data to be transmitted with mail is equal to or greater than a predetermined number; and transmission processing means for, when the sheet number determining means determines that the number of required sheets is equal to or greater than the predetermined number, converting the print mail into the reduced state so as to increase the number of pages of the print data to be printed on each sheet of paper and transmitting mail including the converted print data, the transmission processing means transmitting mail with the print data of the original state without converting the print data when the sheet number determining means determines that the number of sheets is smaller than the predetermined number.

13. A mail transmission device as claimed in claim 12, further comprising:

a display device;

an input device; and reduction process confirmation means for, when the sheet number determining means determines that the number of required sheets is equal to or greater than the predetermined number, controlling the display device to display a message urging an operator of the mail transmission device to input confirmation via the input device whether the print data should be converted into the reduced state, wherein the transmission processing means converts the print data into the reduced state so as to increase the number of pages of the print data to be printed on each sheet of paper and transmitting mail including the converted print data when the operator inputs confirmation via the input device that the print data should be converted into the reduced state, and transmits mail with the print data of the original state without converting the print data when the operator inputs confirmation via the input device that the print data should not be converted into the reduced state or when the sheet number determining means determines that the number of required sheets is smaller than the predetermined number.

14. A mail transmission device as claimed in claim 12, further comprising print data creating means for creating the print data in an original size, and wherein the transmission processing means converts, when the sheet number determining means determines that the number of required sheets is equal to or greater than the predetermined number, the print data into the reduced state through reducing a size of a print pattern represented by the print data from the original size into a reduced size, thereby increasing the number of pages of the print data capable of being printed on each sheet from the number of pages of the print data to be printed in each sheet of paper at the original size.

15. A mail reception system provided in a computer system capable of receiving mail from another computer system via a communication line, the mail reception system comprising:

a printer capable of printing on a sheet of paper and being connected to a computer system for communicating by signals with the computer system;

receiving means for receiving mail, including print data, from another computer system via a communication line;

sheet number determining means for determining a number of sheets required to print the print data at a normal state and determining whether the determined number of the required sheets is equal to or greater than a predetermined number; and print data processing means for controlling the printer to print the print data in the normal state when the sheet number determining means determines that the number of required sheets is smaller than the predetermined number, the print data processing means controlling the printer to print the print data in a reduced state when the sheet number determining means determines that the number of required sheets is equal to or greater than the predetermined number, the number of pages of the print data to be printed in each sheet of paper at the reduced state being greater than the number of pages of the print data to be printed in each sheet of paper at the normal state, thereby reducing the total number of sheets to print the print data.

16. A mail reception system as claimed in claim 15, further comprising:

a display device;

an input device; and reduced print confirmation means for, when the sheet number determining means determines that the number of required sheets is equal to or greater than the predetermined number, controlling the display device to display a message urging an operator of the mail reception system to input confirmation via the input device whether the print data should be printed in the reduced state;

wherein the print data processing means controls the printer to print the print data in the reduced state when the operator inputs confirmation via the input device that the print data should be printed in the reduced state and controls the printer to print the print data in the normal state when the operator inputs confirmation via the input device that the print data should not be printed in the reduced state or when the sheet number determining unit determines that the number of required sheets is smaller than the predetermined number.

17. A mail reception system as claimed in claim 15, wherein the receiving means receives the print data that represents a print pattern in a normal size, and wherein the print data processing means converts, when the sheet number determining means determines that the required number of sheets is equal to or greater than the predetermined number, the print data into the reduced state through reducing a size of the print pattern represented by the print data from the normal size into a reduced size, thereby increasing the number of pages of the print data capable of being printed on each sheet from the number of pages of the print data to be printed in each sheet of paper at the normal size.

18. A mail transmission system provided in a computer system capable of transmitting mail to another computer system via a communication line, the mail transmission system comprising:

sheet number determining means for determining whether a number of sheets required to print, at a normal state, print data to be transmitted with mail is equal to or greater than a predetermined number; and transmission processing means for transmitting mail including the print data after performing a reducing process onto the print data from the normal state into a reduced state to increase the number of pages of the print data to be printed on each sheet of paper when the sheet number determining means determines that the number of required sheets is equal to or greater than the predetermined number, and for transmitting the mail with the print data without performing the reducing process onto the print data when the sheet number determining means determines that the number of required sheets is smaller than the predetermined number.

19. A mail transmission system as claimed in claim 18, further comprising:

a display device;

an input device; and reduction process confirmation means for, when the sheet number determining means determines that the number of required sheets is equal to or greater than the predetermined number, controlling the display device to display a message urging an operator of the mail transmission system to input confirmation via the input device whether the print data should be subjected to the reduction process, wherein the transmission processing means transmits the mail with the print data after performing the reduction process onto the print data when the operator inputs confirmation via the input device that the print data should be subjected to the reduction process, and transmits the mail with the print data without performing the reduction process onto the print data when the operator inputs confirmation via the input device that the print data should not be subjected to the reduction process and when the sheet number determining means determines that the required number of sheets is smaller than the predetermined number.

20. A mail transmission system as claimed in claim 18, further comprising print data creating means for creating the print data that represents a print pattern in a normal size, and wherein the transmission processing means converts, when the sheet number determining means determines that the required number of sheets is equal to or greater than the predetermined number, the print data into the reduced state through reducing a size of the print pattern represented by the print data from the normal size into a reduced size, thereby increasing the number of pages of the print data capable of being printed on each sheet from the number of pages of the print data to be printed in each sheet of paper at the normal size.

21. A program storage medium capable of being read by a computer capable of receiving mail from another computer via a communication line, the program comprising:

a program of determining a number of sheets required to print print data included in received mail at a normal state and determining whether the determined number of the required sheets is greater than a predetermined number; and a program of controlling a printer to print the print data in the normal state when the number of required sheets is smaller than the predetermined number, controlling the printer to print the print data in a reduced state when the number of required sheets is equal to or greater than the predetermined number, the amount of the print data to be printed in each sheet of paper at the reduced state being greater than the amount of the print data to be printed in each sheet of paper at the normal state, thereby reducing the total number of sheets to print the print data.

22. A program storage medium as claimed in claim 21, wherein the print data included in the received mail represents a print pattern in a normal size, and wherein the controlling program converts, when the required number of sheets is equal to or greater than the predetermined number, the print data into the reduced state through reducing a size of the print pattern represented by the print data from the normal size into a reduced size, thereby increasing the number of pages of the print data capable of being printed on each sheet from the number of pages of the print data to be printed in each sheet of paper at the normal size.

23. A program storage medium capable of being read by a computer capable of transmitting mail to another computer via a communication line, the program comprising:

a program of determining whether a number of sheets required to print, at a normal state, print data to be transmitted with mail is equal to or greater than a predetermined number; and a program of transmitting mail including the print data after performing a reducing process onto the print data from the normal state into a reduced state to increase the number of pages of the print data to be printed on each required sheet of paper when the number of sheets is equal to or greater than the predetermined number, and for transmitting the mail with the print data without performing the reducing process onto the print data when the number of required sheets is smaller than the predetermined number.

24. A program storage medium as claimed in claim 20, further comprising a program of creating the print data that represents a print pattern in a normal size, and wherein the transmitting program converts, when the required number of sheets is equal to or greater than the predetermined number, the print data into the reduced state through reducing a size of the print pattern represented by the print data from the normal size into a reduced size, thereby increasing the number of pages of the print data capable of being printed on each sheet from the number of pages of the print data to be printed in each sheet of paper at the normal size.

* * * * *